United States Patent
King et al.

(10) Patent No.: US 8,620,760 B2
(45) Date of Patent: Dec. 31, 2013

(54) METHODS AND SYSTEMS FOR INITIATING APPLICATION PROCESSES BY DATA CAPTURE FROM RENDERED DOCUMENTS

(75) Inventors: Martin T. King, Vashon Island, WA (US); Dale L. Grover, Ann Arbor, MI (US); Clifford A. Kushler, Lynnwood, WA (US); James Q. Stafford-Fraser, Cambridge (GB)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 12/902,081

(22) Filed: Oct. 11, 2010

(65) Prior Publication Data

US 2011/0246333 A9    Oct. 6, 2011

Related U.S. Application Data

(63) Continuation of application No. 11/097,961, filed on Apr. 1, 2005, now abandoned, which is a continuation-in-part of application No. 11/004,637, filed on Dec. 3, 2004, now Pat. No. 7,707,039.

(60) Provisional application No. 60/559,226, filed on Apr. 1, 2004, provisional application No. 60/558,968, filed (Continued)

(51) Int. Cl.
*G06Q 30/00* (2012.01)

(52) U.S. Cl.
USPC ............... 705/26.1; 705/14.26; 455/456.1; 455/456.6; 455/461; 709/231; 709/244; 707/200; 707/200.6; 715/863; 382/305

(58) Field of Classification Search
USPC ........ 705/26.1, 14.26; 455/456.1, 456.6, 461; 709/231, 244; 707/200, 200.6; 715/863; 382/305

See application file for complete search history.

(56) References Cited

U.S. PATENT DOCUMENTS

| 3,899,687 | A | 8/1975 | Jones |
|---|---|---|---|
| 3,017,317 | A | 11/1975 | Ryan |

(Continued)

FOREIGN PATENT DOCUMENTS

| EP | 0697793 | 2/1996 |
|---|---|---|
| EP | 0887753 | 12/1998 |

(Continued)

OTHER PUBLICATIONS

Liddy, Elizabeth, "How a Search Engine Works," InfoToday.com, vol. 9, No. 5, May 2001, pp. 1-7.

(Continued)

*Primary Examiner* — Yogesh C Garg
(74) *Attorney, Agent, or Firm* — Fish & Richardson P.C.

(57) ABSTRACT

Systems, apparatus and methods for implementing transaction applications using a handheld document data capture device are described herein. The handheld device captures information from a rendered document. The captured information is processed to identify an electronic document corresponding to the rendered document. Information captured from the rendered document by the handheld capture device is used to perform a transaction. In one embodiment, a portable scanner is used to select items from a catalog. Information scanned from the catalog is used to identify the catalog, the items to be purchased, and complete an order via the Internet.

15 Claims, 16 Drawing Sheets

Related U.S. Application Data

(60) on Apr. 1, 2004, provisional application No. 60/558,867, filed on Apr. 1, 2004, provisional application No. 60/559,278, filed on Apr. 1, 2004, provisional application No. 60/559,279, filed on Apr. 1, 2004, provisional application No. 60/559,265, filed on Apr. 1, 2004, provisional application No. 60/559,277, filed on Apr. 1, 2004, provisional application No. 60/558,969, filed on Apr. 1, 2004, provisional application No. 60/558,892, filed on Apr. 1, 2004, provisional application No. 60/558,760, filed on Apr. 1, 2004, provisional application No. 60/558,717, filed on Apr. 1, 2004, provisional application No. 60/558,499, filed on Apr. 1, 2004, provisional application No. 60/558,370, filed on Apr. 1, 2004, provisional application No. 60/558,789, filed on Apr. 1, 2004, provisional application No. 60/558,791, filed on Apr. 1, 2004, provisional application No. 60/558,527, filed on Apr. 1, 2004, provisional application No. 60/559,125, filed on Apr. 2, 2004, provisional application No. 60/558,909, filed on Apr. 2, 2004, provisional application No. 60/559,033, filed on Apr. 2, 2004, provisional application No. 60/559,127, filed on Apr. 2, 2004, provisional application No. 60/559,087, filed on Apr. 2, 2004, provisional application No. 60/559,131, filed on Apr. 2, 2004, provisional application No. 60/559,766, filed on Apr. 6, 2004, provisional application No. 60/561,768, filed on Apr. 12, 2004, provisional application No. 60/563,520, filed on Apr. 19, 2004, provisional application No. 60/563,485, filed on Apr. 19, 2004, provisional application No. 60/564,688, filed on Apr. 23, 2004, provisional application No. 60/564,846, filed on Apr. 23, 2004, provisional application No. 60/571,560, filed on May 14, 2004, provisional application No. 60/571,715, filed on May 17, 2004, provisional application No. 60/589,203, filed on Jul. 19, 2004, provisional application No. 60/589,201, filed on Jul. 19, 2004, provisional application No. 60/589,202, filed on Jul. 19, 2004, provisional application No. 60/598,821, filed on Aug. 2, 2004, provisional application No. 60/602,956, filed on Aug. 18, 2004, provisional application No. 60/602,925, filed on Aug. 18, 2004, provisional application No. 60/602,947, filed on Aug. 18, 2004, provisional application No. 60/602,897, filed on Aug. 18, 2004, provisional application No. 60/602,896, filed on Aug. 18, 2004, provisional application No. 60/602,930, filed on Aug. 18, 2004, provisional application No. 60/602,898, filed on Aug. 18, 2004, provisional application No. 60/603,466, filed on Aug. 19, 2004, provisional application No. 60/603,082, filed on Aug. 19, 2004, provisional application No. 60/603,081, filed on Aug. 19, 2004, provisional application No. 60/603,498, filed on Aug. 20, 2004, provisional application No. 60/603,358, filed on Aug. 20, 2004, provisional application No. 60/604,103, filed on Aug. 23, 2004, provisional application No. 60/604,098, filed on Aug. 23, 2004, provisional application No. 60/604,100, filed on Aug. 23, 2004, provisional application No. 60/604,102, filed on Aug. 23, 2004, provisional application No. 60/605,229, filed on Aug. 27, 2004, provisional application No. 60/605,105, filed on Aug. 27, 2004, provisional application No. 60/613,243, filed on Sep. 27, 2004, provisional application No. 60/613,628, filed on Sep. 27, 2004, provisional application No. 60/613,632, filed on Sep. 27, 2004, provisional application No. 60/613,589, filed on Sep. 27, 2004, provisional application No. 60/613,242, filed on Sep. 27, 2004, provisional application No. 60/613,602, filed on Sep. 27, 2004, provisional application No. 60/613,340, filed on Sep. 27, 2004, provisional application No. 60/613,634, filed on Sep. 27, 2004, provisional application No. 60/613,461, filed on Sep. 27, 2004, provisional application No. 60/613,455, filed on Sep. 27, 2004, provisional application No. 60/613,460, filed on Sep. 27, 2004, provisional application No. 60/613,400, filed on Sep. 27, 2004, provisional application No. 60/613,456, filed on Sep. 27, 2004, provisional application No. 60/613,341, filed on Sep. 27, 2004, provisional application No. 60/613,454, filed on Sep. 27, 2004, provisional application No. 60/613,339, filed on Sep. 27, 2004, provisional application No. 60/613,633, filed on Sep. 27, 2004, provisional application No. 60/615,378, filed on Oct. 1, 2004, provisional application No. 60/615,112, filed on Oct. 1, 2004, provisional application No. 60/615,538, filed on Oct. 1, 2004, provisional application No. 60/617,122, filed on Oct. 7, 2004, provisional application No. 60/622,906, filed on Oct. 28, 2004, provisional application No. 60/633,452, filed on Dec. 6, 2004, provisional application No. 60/633,678, filed on Dec. 6, 2004, provisional application No. 60/633,786, filed on Dec. 6, 2004, provisional application No. 60/633,453, filed on Dec. 6, 2004, provisional application No. 60/634,627, filed on Dec. 9, 2004, provisional application No. 60/637,739, filed on Dec. 9, 2004, provisional application No. 60/647,684, filed on Jan. 26, 2005, provisional application No. 60/648,746, filed on Jan. 31, 2005, provisional application No. 60/653,372, filed on Feb. 15, 2005, provisional application No. 60/653,663, filed on Feb. 16, 2005, provisional application No. 60/653,669, filed on Feb. 16, 2005, provisional application No. 60/653,899, filed on Feb. 16, 2005, provisional application No. 60/653,679, filed on Feb. 16, 2005, provisional application No. 60/653,847, filed on Feb. 16, 2005, provisional application No. 60/654,379, filed on Feb. 17, 2005, provisional application No. 60/654,368, filed on Feb. 18, 2005, provisional application No. 60/654,326, filed on Feb. 18, 2005, provisional application No. 60/654,196, filed on Feb. 18, 2005, provisional application No. 60/655,279, filed on Feb. 22, 2005, provisional application No. 60/655,280, filed on Feb. 22, 2005, provisional application No. 60/655,987, filed on Feb. 22, 2005, provisional application No. 60/655,697, filed on Feb. 22, 2005, provisional application No. 60/655,281, filed on Feb. 22, 2005, provisional application No. 60/657,309, filed on Feb. 28, 2005, provisional application No. 60/566,667, filed on Apr. 30, 2004, provisional application No. 60/558,893, filed on Apr. 1, 2004.

(56) References Cited

U.S. PATENT DOCUMENTS

| | | |
|---|---|---|
| 4,065,778 A | 12/1977 | Harvey |
| 4,135,791 A | 1/1979 | Govignon |

(56) References Cited

U.S. PATENT DOCUMENTS

| | | |
|---|---|---|
| 4,358,824 A | 11/1982 | Glickman et al. |
| 4,553,261 A | 11/1985 | Froessl |
| 4,633,507 A | 12/1986 | Cannistra et al. |
| 4,903,229 A | 2/1990 | Schmidt et al. |
| 4,914,709 A | 4/1990 | Rudak |
| 4,955,693 A | 9/1990 | Bobba |
| 4,958,379 A | 9/1990 | Yamaguchi et al. |
| 5,040,229 A | 8/1991 | Lee et al. |
| 5,048,097 A | 9/1991 | Gaborski et al. |
| 5,140,644 A | 8/1992 | Kawaguchi et al. |
| 5,142,161 A | 8/1992 | Brackmann |
| 5,159,668 A | 10/1992 | Kaasila |
| 5,168,147 A | 12/1992 | Bloomberg |
| 5,201,010 A | 4/1993 | Deaton et al. |
| 5,212,739 A | 5/1993 | Johnson |
| 5,271,068 A | 12/1993 | Ueda et al. |
| 5,272,324 A | 12/1993 | Blevins |
| 5,371,348 A | 12/1994 | Kumar et al. |
| 5,444,779 A | 8/1995 | Daniele |
| 5,465,353 A | 11/1995 | Hull et al. |
| 5,500,920 A | 3/1996 | Kupiec |
| 5,517,331 A | 5/1996 | Murai et al. |
| 5,522,798 A | 6/1996 | Johnson et al. |
| 5,532,469 A | 7/1996 | Shepard et al. |
| 5,541,419 A | 7/1996 | Arackellian |
| 5,577,135 A | 11/1996 | Grajski et al. |
| 5,602,376 A | 2/1997 | Coleman et al. |
| 5,624,265 A | 4/1997 | Redford et al. |
| 5,625,711 A | 4/1997 | Nicholson et al. |
| 5,680,607 A | 10/1997 | Brueckheimer |
| 5,684,891 A | 11/1997 | Tanaka et al. |
| 5,708,825 A | 1/1998 | Sotomayor |
| 5,724,521 A | 3/1998 | Dedrick |
| 5,748,805 A | 5/1998 | Withgott et al. |
| 5,756,981 A | 5/1998 | Roustaei et al. |
| 5,757,360 A | 5/1998 | Nitta et al. |
| 5,818,612 A | 10/1998 | Segawa et al. |
| 5,818,965 A | 10/1998 | Davies |
| 5,832,528 A | 11/1998 | Kwatinetz et al. |
| 5,889,896 A | 3/1999 | Meshinsky et al. |
| 5,890,147 A | 3/1999 | Peltonen et al. |
| 5,893,095 A | 4/1999 | Jain et al. |
| 5,899,700 A | 5/1999 | Williams et al. |
| 5,913,185 A | 6/1999 | Martino et al. |
| 5,937,422 A | 8/1999 | Nelson et al. |
| 5,949,921 A | 9/1999 | Kojima et al. |
| 5,963,966 A | 10/1999 | Mitchell et al. |
| 5,982,928 A | 11/1999 | Shimada et al. |
| 5,983,171 A | 11/1999 | Yokoyama et al. |
| 5,983,295 A | 11/1999 | Cotugno |
| 6,002,491 A | 12/1999 | Li et al. |
| 6,009,420 A | 12/1999 | Fagg, III et al. |
| 6,029,141 A | 2/2000 | Bezos et al. |
| 6,033,086 A | 3/2000 | Bohn |
| 6,036,086 A | 3/2000 | Sizer, II et al. |
| 6,044,378 A | 3/2000 | Gladney |
| 6,053,413 A | 4/2000 | Swift et al. |
| 6,055,333 A | 4/2000 | Guzik et al. |
| 6,081,206 A | 6/2000 | Kielland |
| 6,081,621 A | 6/2000 | Ackner |
| 6,094,689 A | 7/2000 | Embry et al. |
| 6,095,418 A | 8/2000 | Swartz et al. |
| 6,134,532 A | 10/2000 | Lazarus et al. |
| 6,140,140 A | 10/2000 | Hopper |
| 6,145,003 A | 11/2000 | Sanu et al. |
| 6,154,737 A | 11/2000 | Inaba et al. |
| 6,157,465 A | 12/2000 | Suda et al. |
| 6,178,261 B1 | 1/2001 | Williams et al. |
| 6,178,263 B1 | 1/2001 | Fan et al. |
| 6,201,903 B1 | 3/2001 | Wolff et al. |
| 6,212,299 B1 | 4/2001 | Yuge |
| 6,226,631 B1 | 5/2001 | Evans |
| 6,229,137 B1 | 5/2001 | Bohn |
| 6,265,844 B1 | 7/2001 | Wakefield |
| 6,292,274 B1 | 9/2001 | Bohn |
| 6,310,988 B1 | 10/2001 | Flores et al. |
| 6,314,406 B1 | 11/2001 | O'Hagan et al. |
| 6,330,976 B1 | 12/2001 | Dymetman et al. |
| 6,341,290 B1 | 1/2002 | Lombardo et al. |
| 6,342,901 B1 | 1/2002 | Adler et al. |
| 6,345,104 B1 | 2/2002 | Rhoads |
| 6,349,308 B1 | 2/2002 | Whang et al. |
| 6,360,949 B1 | 3/2002 | Shepard et al. |
| 6,360,951 B1 | 3/2002 | Swinehart |
| 6,409,401 B1 | 6/2002 | Petteruti et al. |
| 6,427,032 B1 | 7/2002 | Irons et al. |
| 6,429,899 B1 | 8/2002 | Nio et al. |
| 6,459,823 B2 | 10/2002 | Altunbasak et al. |
| 6,466,336 B1 | 10/2002 | Sturgeon et al. |
| 6,490,553 B2 | 12/2002 | Van Thong et al. |
| 6,493,707 B1 | 12/2002 | Dey et al. |
| 6,520,407 B1 | 2/2003 | Nieswand et al. |
| 6,537,324 B1 | 3/2003 | Tabata et al. |
| 6,597,812 B1 | 7/2003 | Fallon et al. |
| 6,611,598 B1 | 8/2003 | Hayosh |
| 6,616,038 B1 | 9/2003 | Olschafskie et al. |
| 6,616,047 B2 | 9/2003 | Catan |
| 6,640,145 B2 | 10/2003 | Hoffberg et al. |
| 6,641,037 B2 | 11/2003 | Williams |
| 6,643,696 B2 | 11/2003 | Davis et al. |
| 6,650,442 B1 | 11/2003 | Chiu |
| 6,675,356 B1 | 1/2004 | Adler et al. |
| 6,678,075 B1 | 1/2004 | Tsai et al. |
| 6,678,687 B2 | 1/2004 | Watanabe et al. |
| 6,691,107 B1 | 2/2004 | Dockter et al. |
| 6,714,677 B1 | 3/2004 | Stearns et al. |
| 6,738,519 B1 | 5/2004 | Nishiwaki |
| 6,741,871 B1 | 5/2004 | Silverbrook et al. |
| 6,745,937 B2 | 6/2004 | Walsh et al. |
| 6,748,306 B2 | 6/2004 | Lipowicz |
| 6,757,783 B2 | 6/2004 | Koh |
| 6,771,283 B2 | 8/2004 | Carro |
| 6,775,422 B1 | 8/2004 | Altman |
| 6,783,071 B2 | 8/2004 | Levine et al. |
| 6,785,421 B1 | 8/2004 | Gindele et al. |
| 6,801,658 B2 | 10/2004 | Morita et al. |
| 6,801,907 B1 | 10/2004 | Zagami |
| 6,812,961 B1 * | 11/2004 | Parulski et al. ............ 348/231.2 |
| 6,820,237 B1 | 11/2004 | Abu-Hakima et al. |
| 6,823,075 B2 | 11/2004 | Perry |
| 6,845,913 B2 | 1/2005 | Madding et al. |
| 6,850,252 B1 | 2/2005 | Hoffberg |
| 6,862,046 B2 | 3/2005 | Ko |
| 6,877,001 B2 | 4/2005 | Wolf et al. |
| 6,880,124 B1 | 4/2005 | Moore |
| 6,892,264 B2 | 5/2005 | Lamb |
| 6,917,722 B1 | 7/2005 | Bloomfield |
| 6,917,724 B2 | 7/2005 | Seder et al. |
| 6,922,725 B2 | 7/2005 | Lamming et al. |
| 6,925,182 B1 | 8/2005 | Epstein |
| 6,952,281 B1 | 10/2005 | Irons et al. |
| 6,957,384 B2 | 10/2005 | Jeffery et al. |
| 6,978,297 B1 | 12/2005 | Piersol |
| 6,985,169 B1 | 1/2006 | Deng et al. |
| 6,990,548 B1 | 1/2006 | Kaylor |
| 6,991,158 B2 | 1/2006 | Munte |
| 6,992,655 B2 | 1/2006 | Ericson et al. |
| 7,001,681 B2 | 2/2006 | Wood |
| 7,006,881 B1 | 2/2006 | Hoffberg et al. |
| 7,010,616 B2 | 3/2006 | Carlson et al. |
| 7,020,663 B2 | 3/2006 | Hay et al. |
| 7,023,536 B2 | 4/2006 | Zhang et al. |
| 7,038,846 B2 | 5/2006 | Mandella |
| 7,047,491 B2 | 5/2006 | Schubert et al. |
| 7,058,223 B2 | 6/2006 | Cox |
| 7,062,437 B2 | 6/2006 | Kovales et al. |
| 7,069,272 B2 | 6/2006 | Snyder |
| 7,085,755 B2 | 8/2006 | Bluhm et al. |
| 7,088,440 B2 | 8/2006 | Buermann et al. |
| 7,089,330 B1 | 8/2006 | Mason |
| 7,093,759 B2 | 8/2006 | Walsh |
| 7,110,100 B2 | 9/2006 | Buermann et al. |
| 7,111,787 B2 | 9/2006 | Ehrhart |
| 7,113,270 B2 | 9/2006 | Buermann et al. |

(56) References Cited

U.S. PATENT DOCUMENTS

| | | |
|---|---|---|
| 7,117,374 B2 | 10/2006 | Hill et al. |
| 7,131,061 B2 | 10/2006 | MacLean et al. |
| 7,133,862 B2 | 11/2006 | Hubert et al. |
| 7,139,445 B2 | 11/2006 | Pilu et al. |
| 7,161,664 B2 | 1/2007 | Buermann et al. |
| 7,165,268 B1 | 1/2007 | Moore et al. |
| 7,167,586 B2 | 1/2007 | Braun et al. |
| 7,174,332 B2 | 2/2007 | Baxter et al. |
| 7,181,761 B2 | 2/2007 | Davis et al. |
| 7,185,275 B2 | 2/2007 | Roberts et al. |
| 7,188,307 B2 | 3/2007 | Ohsawa |
| 7,190,480 B2 | 3/2007 | Sturgeon et al. |
| 7,197,716 B2 | 3/2007 | Newell et al. |
| 7,203,158 B2 | 4/2007 | Oshima et al. |
| 7,203,384 B2 | 4/2007 | Carl |
| 7,216,121 B2 | 5/2007 | Bachman et al. |
| 7,216,224 B2 | 5/2007 | Lapstun et al. |
| 7,224,480 B2 | 5/2007 | Tanaka et al. |
| 7,225,979 B2 | 6/2007 | Silverbrook et al. |
| 7,234,645 B2 | 6/2007 | Silverbrook et al. |
| 7,239,747 B2 | 7/2007 | Bresler et al. |
| 7,242,492 B2 | 7/2007 | Currans et al. |
| 7,260,534 B2 | 8/2007 | Gandhi et al. |
| 7,262,798 B2 | 8/2007 | Stavely et al. |
| 7,268,956 B2 | 9/2007 | Mandella |
| 7,283,992 B2 | 10/2007 | Liu et al. |
| 7,284,192 B2 | 10/2007 | Kashi et al. |
| 7,289,806 B2 | 10/2007 | Morris et al. |
| 7,295,101 B2 | 11/2007 | Ward et al. |
| 7,327,883 B2 | 2/2008 | Polonowski |
| 7,331,523 B2 | 2/2008 | Meier et al. |
| 7,339,467 B2 | 3/2008 | Lamb |
| 7,349,552 B2 | 3/2008 | Levy et al. |
| 7,353,199 B1 | 4/2008 | DiStefano, III |
| 7,362,902 B1 | 4/2008 | Baker et al. |
| 7,376,581 B2 | 5/2008 | DeRose et al. |
| 7,383,263 B2 | 6/2008 | Goger |
| 7,392,287 B2 | 6/2008 | Ratcliff, III |
| 7,392,475 B1 | 6/2008 | Leban et al. |
| 7,404,520 B2 | 7/2008 | Vesuna |
| 7,409,434 B2 | 8/2008 | Lamming et al. |
| 7,412,158 B2 | 8/2008 | Kakkori |
| 7,415,670 B2 | 8/2008 | Hull et al. |
| 7,421,155 B2 | 9/2008 | King et al. |
| 7,424,543 B2 | 9/2008 | Rice, III |
| 7,426,486 B2 | 9/2008 | Treibach-Heck et al. |
| 7,433,068 B2 | 10/2008 | Stevens et al. |
| 7,433,893 B2 | 10/2008 | Lowry |
| 7,437,023 B2 | 10/2008 | King et al. |
| 7,474,809 B2 | 1/2009 | Carl et al. |
| 7,487,112 B2 | 2/2009 | Barnes, Jr. |
| 7,493,487 B2 | 2/2009 | Phillips et al. |
| 7,496,638 B2 | 2/2009 | Philyaw |
| 7,505,785 B2 | 3/2009 | Callaghan et al. |
| 7,505,956 B2 | 3/2009 | Ibbotson |
| 7,512,254 B2 | 3/2009 | Vollkommer et al. |
| 7,523,067 B1 | 4/2009 | Nakajima |
| 7,533,040 B2 | 5/2009 | Perkowski |
| 7,536,547 B2 | 5/2009 | Van Den Tillaart |
| 7,552,075 B1 | 6/2009 | Walsh |
| 7,552,381 B2 | 6/2009 | Barrus |
| 7,561,312 B1 | 7/2009 | Proudfoot et al. |
| 7,574,407 B2 | 8/2009 | Carro et al. |
| 7,587,412 B2 | 9/2009 | Weyl et al. |
| 7,591,597 B2 | 9/2009 | Pasqualini et al. |
| 7,593,605 B2 | 9/2009 | King et al. |
| 7,596,269 B2 | 9/2009 | King et al. |
| 7,599,580 B2 | 10/2009 | King et al. |
| 7,599,844 B2 | 10/2009 | King et al. |
| 7,606,741 B2 | 10/2009 | King et al. |
| 7,613,634 B2 | 11/2009 | Siegel et al. |
| 7,616,840 B2 | 11/2009 | Erol et al. |
| 7,634,407 B2 | 12/2009 | Chelba et al. |
| 7,634,468 B2 | 12/2009 | Stephan |
| 7,646,921 B2 | 1/2010 | Vincent et al. |
| 7,650,035 B2 | 1/2010 | Vincent et al. |
| 7,660,813 B2 | 2/2010 | Milic-Frayling et al. |
| 7,664,734 B2 | 2/2010 | Lawrence et al. |
| 7,672,543 B2 | 3/2010 | Hull et al. |
| 7,680,067 B2 | 3/2010 | Prasad et al. |
| 7,689,712 B2 | 3/2010 | Lee et al. |
| 7,689,832 B2 | 3/2010 | Talmor et al. |
| 7,697,758 B2 | 4/2010 | Vincent et al. |
| 7,698,344 B2 | 4/2010 | Sareen et al. |
| 7,702,624 B2 | 4/2010 | King et al. |
| 7,706,611 B2 | 4/2010 | King et al. |
| 7,707,039 B2 | 4/2010 | King et al. |
| 7,710,598 B2 | 5/2010 | Harrison, Jr. |
| 7,729,515 B2 | 6/2010 | Mandella et al. |
| 7,742,953 B2 | 6/2010 | King et al. |
| 7,761,451 B2 | 7/2010 | Cunningham |
| 7,779,002 B1 | 8/2010 | Gomes et al. |
| 7,783,617 B2 | 8/2010 | Lu et al. |
| 7,788,248 B2 | 8/2010 | Forstall et al. |
| 7,796,116 B2 | 9/2010 | Salsman et al. |
| 7,812,860 B2 | 10/2010 | King et al. |
| 7,818,215 B2 | 10/2010 | King et al. |
| 7,826,641 B2 | 11/2010 | Mandella et al. |
| 7,831,912 B2 | 11/2010 | King et al. |
| 7,872,669 B2 | 1/2011 | Darrell et al. |
| 7,894,670 B2 | 2/2011 | King et al. |
| 7,941,433 B2 | 5/2011 | Benson |
| 7,949,191 B1 | 5/2011 | Ramkumar et al. |
| 7,961,909 B2 | 6/2011 | Mandella et al. |
| 8,082,258 B2 | 12/2011 | Kumar et al. |
| 8,111,927 B2 | 2/2012 | Vincent et al. |
| 8,146,156 B2 | 3/2012 | King et al. |
| 2001/0034237 A1 | 10/2001 | Garahi |
| 2001/0055411 A1 | 12/2001 | Black |
| 2002/0012065 A1 | 1/2002 | Watanabe |
| 2002/0022993 A1 | 2/2002 | Miller et al. |
| 2002/0023957 A1 | 2/2002 | Michaelis et al. |
| 2002/0049781 A1 | 4/2002 | Bengtson |
| 2002/0054059 A1 | 5/2002 | Schneiderman |
| 2002/0055919 A1 | 5/2002 | Mikheev |
| 2002/0067308 A1 | 6/2002 | Robertson |
| 2002/0073000 A1 | 6/2002 | Sage |
| 2002/0091671 A1 | 7/2002 | Prokoph |
| 2002/0091928 A1 | 7/2002 | Bouchard et al. |
| 2002/0111960 A1 | 8/2002 | Irons et al. |
| 2002/0125411 A1 | 9/2002 | Christy |
| 2002/0138476 A1 | 9/2002 | Suwa et al. |
| 2002/0154817 A1 | 10/2002 | Katsuyama et al. |
| 2002/0169509 A1 | 11/2002 | Huang et al. |
| 2002/0191847 A1 | 12/2002 | Newman et al. |
| 2002/0199198 A1 | 12/2002 | Stonedahl |
| 2003/0004991 A1 | 1/2003 | Keskar et al. |
| 2003/0019939 A1 | 1/2003 | Sellen |
| 2003/0039411 A1 | 2/2003 | Nada |
| 2003/0043042 A1 | 3/2003 | Moores, Jr. et al. |
| 2003/0093400 A1 | 5/2003 | Santosuosso |
| 2003/0093545 A1 | 5/2003 | Liu et al. |
| 2003/0149678 A1 | 8/2003 | Cook |
| 2003/0160975 A1 | 8/2003 | Skurdal et al. |
| 2003/0171910 A1 | 9/2003 | Abir |
| 2003/0173405 A1 | 9/2003 | Wilz, Sr. et al. |
| 2003/0182399 A1 | 9/2003 | Silber |
| 2003/0187751 A1 | 10/2003 | Watson et al. |
| 2003/0195851 A1 | 10/2003 | Ong |
| 2003/0212527 A1 | 11/2003 | Moore et al. |
| 2003/0220835 A1 | 11/2003 | Barnes, Jr. |
| 2003/0223637 A1 | 12/2003 | Simske et al. |
| 2003/0225547 A1 | 12/2003 | Paradies |
| 2004/0001217 A1 | 1/2004 | Wu |
| 2004/0006509 A1 | 1/2004 | Mannik et al. |
| 2004/0006740 A1 | 1/2004 | Krohn et al. |
| 2004/0015437 A1 | 1/2004 | Choi et al. |
| 2004/0023200 A1 | 2/2004 | Blume |
| 2004/0028295 A1 | 2/2004 | Allen et al. |
| 2004/0044627 A1 | 3/2004 | Russell et al. |
| 2004/0068483 A1 | 4/2004 | Sakurai et al. |
| 2004/0080795 A1 | 4/2004 | Bean et al. |
| 2004/0098165 A1 | 5/2004 | Butikofer |
| 2004/0139106 A1 | 7/2004 | Bachman et al. |

(56) References Cited

U.S. PATENT DOCUMENTS

| | | |
|---|---|---|
| 2004/0139107 A1 | 7/2004 | Bachman et al. |
| 2004/0139400 A1 | 7/2004 | Allam et al. |
| 2004/0181671 A1 | 9/2004 | Brundage et al. |
| 2004/0181688 A1 | 9/2004 | Wittkotter |
| 2004/0186766 A1 | 9/2004 | Fellenstein et al. |
| 2004/0189691 A1 | 9/2004 | Jojic et al. |
| 2004/0193488 A1 | 9/2004 | Khoo et al. |
| 2004/0204953 A1 | 10/2004 | Muir et al. |
| 2004/0205041 A1 | 10/2004 | Erol et al. |
| 2004/0205534 A1 | 10/2004 | Koelle |
| 2004/0236791 A1* | 11/2004 | Kinjo ........................ 707/104.1 |
| 2004/0250201 A1 | 12/2004 | Caspi |
| 2004/0254795 A1 | 12/2004 | Fujii et al. |
| 2004/0258274 A1 | 12/2004 | Brundage et al. |
| 2004/0268237 A1 | 12/2004 | Jones et al. |
| 2005/0022114 A1 | 1/2005 | Shanahan et al. |
| 2005/0033713 A1 | 2/2005 | Bala et al. |
| 2005/0091578 A1 | 4/2005 | Madan et al. |
| 2005/0097335 A1 | 5/2005 | Shenoy et al. |
| 2005/0108001 A1 | 5/2005 | Aarskog |
| 2005/0108195 A1 | 5/2005 | Yalovsky et al. |
| 2005/0132281 A1 | 6/2005 | Pan et al. |
| 2005/0136949 A1 | 6/2005 | Barnes, Jr. |
| 2005/0139649 A1 | 6/2005 | Metcalf et al. |
| 2005/0154760 A1 | 7/2005 | Bhakta et al. |
| 2005/0168437 A1 | 8/2005 | Carl et al. |
| 2005/0205671 A1 | 9/2005 | Gelsomini et al. |
| 2005/0214730 A1 | 9/2005 | Rines |
| 2005/0220359 A1 | 10/2005 | Sun et al. |
| 2005/0222801 A1 | 10/2005 | Wulff et al. |
| 2005/0231746 A1 | 10/2005 | Parry et al. |
| 2005/0243386 A1 | 11/2005 | Sheng |
| 2005/0251448 A1 | 11/2005 | Gropper |
| 2005/0262058 A1 | 11/2005 | Chandrasekar et al. |
| 2005/0270358 A1 | 12/2005 | Kuchen et al. |
| 2005/0278314 A1 | 12/2005 | Buchheit |
| 2005/0288954 A1 | 12/2005 | McCarthy et al. |
| 2005/0289054 A1 | 12/2005 | Silverbrook et al. |
| 2006/0011728 A1 | 1/2006 | Frantz et al. |
| 2006/0023945 A1 | 2/2006 | King et al. |
| 2006/0036462 A1 | 2/2006 | King et al. |
| 2006/0041484 A1 | 2/2006 | King et al. |
| 2006/0041538 A1 | 2/2006 | King et al. |
| 2006/0041590 A1 | 2/2006 | King et al. |
| 2006/0041605 A1 | 2/2006 | King et al. |
| 2006/0045374 A1 | 3/2006 | Kim et al. |
| 2006/0048046 A1 | 3/2006 | Joshi et al. |
| 2006/0053097 A1 | 3/2006 | King et al. |
| 2006/0075327 A1 | 4/2006 | Sriver |
| 2006/0081714 A1 | 4/2006 | King et al. |
| 2006/0085477 A1 | 4/2006 | Phillips et al. |
| 2006/0098900 A1 | 5/2006 | King et al. |
| 2006/0101285 A1 | 5/2006 | Chen et al. |
| 2006/0103893 A1 | 5/2006 | Azimi et al. |
| 2006/0104515 A1 | 5/2006 | King et al. |
| 2006/0119900 A1 | 6/2006 | King et al. |
| 2006/0122983 A1 | 6/2006 | King et al. |
| 2006/0136629 A1 | 6/2006 | King et al. |
| 2006/0138219 A1 | 6/2006 | Brzezniak et al. |
| 2006/0146169 A1 | 7/2006 | Segman |
| 2006/0173859 A1 | 8/2006 | Kim et al. |
| 2006/0195695 A1 | 8/2006 | Keys |
| 2006/0200780 A1 | 9/2006 | Iwema et al. |
| 2006/0224895 A1 | 10/2006 | Mayer |
| 2006/0239579 A1 | 10/2006 | Ritter |
| 2006/0256371 A1 | 11/2006 | King et al. |
| 2006/0259783 A1 | 11/2006 | Work et al. |
| 2006/0266839 A1 | 11/2006 | Yavid et al. |
| 2006/0283952 A1 | 12/2006 | Wang |
| 2007/0009245 A1 | 1/2007 | Ito |
| 2007/0050712 A1 | 3/2007 | Hull et al. |
| 2007/0173266 A1 | 7/2007 | Barnes, Jr. |
| 2007/0194119 A1 | 8/2007 | Vinogradov et al. |
| 2007/0219940 A1 | 9/2007 | Mueller et al. |
| 2007/0228306 A1 | 10/2007 | Gannon et al. |
| 2007/0233806 A1 | 10/2007 | Asadi |
| 2007/0238076 A1 | 10/2007 | Burstein et al. |
| 2007/0279711 A1 | 12/2007 | King et al. |
| 2007/0300142 A1 | 12/2007 | King et al. |
| 2008/0023550 A1 | 1/2008 | Yu et al. |
| 2008/0046417 A1 | 2/2008 | Jeffery et al. |
| 2008/0063276 A1 | 3/2008 | Vincent et al. |
| 2008/0072134 A1 | 3/2008 | Balakrishnan et al. |
| 2008/0082903 A1 | 4/2008 | McCurdy et al. |
| 2008/0091954 A1 | 4/2008 | Morris et al. |
| 2008/0093460 A1 | 4/2008 | Frantz et al. |
| 2008/0126415 A1 | 5/2008 | Chaudhury et al. |
| 2008/0137971 A1 | 6/2008 | King et al. |
| 2008/0141117 A1 | 6/2008 | King et al. |
| 2008/0170674 A1 | 7/2008 | Ozden et al. |
| 2008/0172365 A1 | 7/2008 | Ozden et al. |
| 2008/0177825 A1 | 7/2008 | Dubinko et al. |
| 2008/0195664 A1 | 8/2008 | Maharajh et al. |
| 2008/0222166 A1 | 9/2008 | Hultgren et al. |
| 2008/0235093 A1 | 9/2008 | Uland |
| 2008/0313172 A1 | 12/2008 | King et al. |
| 2009/0012806 A1 | 1/2009 | Ricordi et al. |
| 2009/0018990 A1 | 1/2009 | Moraleda |
| 2009/0077658 A1 | 3/2009 | King et al. |
| 2009/0247219 A1 | 10/2009 | Lin et al. |
| 2010/0092095 A1 | 4/2010 | King et al. |
| 2010/0121848 A1 | 5/2010 | Yaroslavskiy et al. |
| 2010/0177970 A1 | 7/2010 | King et al. |
| 2010/0182631 A1 | 7/2010 | King et al. |
| 2010/0183246 A1 | 7/2010 | King et al. |
| 2010/0185538 A1 | 7/2010 | King et al. |
| 2010/0185620 A1 | 7/2010 | Schiller |
| 2010/0278453 A1 | 11/2010 | King et al. |
| 2010/0318797 A1 | 12/2010 | King et al. |
| 2011/0019020 A1 | 1/2011 | King et al. |
| 2011/0019919 A1 | 1/2011 | King et al. |
| 2011/0022940 A1 | 1/2011 | King et al. |
| 2011/0025842 A1 | 2/2011 | King et al. |
| 2011/0026838 A1 | 2/2011 | King et al. |
| 2011/0029443 A1 | 2/2011 | King et al. |
| 2011/0029504 A1 | 2/2011 | King et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0043652 A1 | 2/2011 | King et al. |
| 2011/0044547 A1 | 2/2011 | King et al. |
| 2011/0072012 A1 | 3/2011 | Ah-Pine et al. |
| 2011/0072395 A1 | 3/2011 | King et al. |
| 2011/0075228 A1 | 3/2011 | King et al. |
| 2011/0078585 A1 | 3/2011 | King et al. |
| 2011/0085211 A1 | 4/2011 | King et al. |
| 2011/0096174 A1 | 4/2011 | King et al. |
| 2011/0142371 A1 | 6/2011 | King et al. |
| 2011/0145068 A1 | 6/2011 | King et al. |
| 2011/0150335 A1 | 6/2011 | King et al. |
| 2011/0153653 A1 | 6/2011 | King et al. |
| 2011/0154507 A1 | 6/2011 | King et al. |
| 2011/0167075 A1 | 7/2011 | King et al. |
| 2011/0209191 A1 | 8/2011 | Shah |
| 2011/0227915 A1 | 9/2011 | Mandella et al. |
| 2011/0242617 A1 | 10/2011 | King et al. |
| 2011/0295842 A1 | 12/2011 | King et al. |
| 2011/0299125 A1 | 12/2011 | King et al. |
| 2012/0038549 A1 | 2/2012 | Mandella et al. |

FOREIGN PATENT DOCUMENTS

| | | |
|---|---|---|
| EP | 1054335 | 11/2000 |
| EP | 1087306 | 3/2001 |
| EP | 1318659 | 6/2003 |
| GB | 2 366 033 | 2/2002 |
| JP | 06-282375 | 10/1994 |
| JP | 06-289983 | 10/1994 |
| JP | 08-087378 | 4/1996 |
| JP | 10-200804 | 7/1998 |
| JP | 11-212691 | 8/1999 |
| JP | H11-213011 | 8/1999 |
| JP | 2000-123114 | 4/2000 |

(56) References Cited

FOREIGN PATENT DOCUMENTS

| | | |
|---|---|---|
| JP | 2000-195735 | 7/2000 |
| JP | 2000-215213 | 8/2000 |
| JP | 2001-345710 | 12/2001 |
| JP | 2004-500635 | 1/2004 |
| JP | 2004-050722 | 2/2004 |
| JP | 2004-102707 | 4/2004 |
| JP | 2004-110563 | 4/2004 |
| KR | 10-2000-0054268 | 9/2000 |
| KR | 10-2000-0054339 | 9/2000 |
| KR | 10-2004-0029895 | 4/2004 |
| KR | 10-2007-0051217 | 5/2007 |
| KR | 10-0741368 | 7/2007 |
| KR | 10-0761912 | 9/2007 |
| WO | 94/19766 | 9/1994 |
| WO | 98/03923 | 1/1998 |
| WO | 00/56055 | 9/2000 |
| WO | 01/03017 | 1/2001 |
| WO | 01/24051 | 4/2001 |
| WO | 01/33553 | 5/2001 |
| WO | 02/061730 | 8/2002 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | 2006/029259 | 3/2006 |
| WO | 2006/036853 | 4/2006 |
| WO | 2006/037011 | 4/2006 |
| WO | 2006/096971 | 9/2006 |
| WO | 2006/124496 | 11/2006 |
| WO | 2007/141020 | 12/2007 |
| WO | 2008/014255 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

Brin et al., "The Anatomy of a Large-Scale Hypertextual Web Search Engine," Computer Networks and ISDN Systems, Vo. 30, Issue 1-7, Apr. 1, 1998, pp. 1-22.
Bahl, et al., "Font Independent Character Recognition by Cryptanalysis," IBM Technical Disclosure Bulletin, vol. 24, No. 3, pp. 1588-1589 (Aug. 1, 1981).
Ramesh, R.S. et al., "An Automated Approach to Solve Simple Substitution Ciphers," Cryptologia, vol. 17. No. 2, pp. 202-218 (1993).
Nagy et al., "Decoding Substitution Ciphers by Means of Word Matching with Application to OCR," IEEE Transactions on Pattern Analysis and Machine Intelligence, vol. 30, No. 5, pp. 710-715 (Sep. 1, 1987).
Wood et al., "Implementing a faster string search algorithm in Ada," CM Sigada Ada Letters, vol. 8, No. 3, pp. 87-97 (Apr. 1, 1988).
Garain et al., "Compression of Scan-Digitized Indian Language Printed Text: A Soft Pattern Matching Technique," Proceedings of the 2003 ACM Symposium on Document Engineering, pp. 185-192 (Jan. 1, 2003).
King et al., U.S. Appl. No. 13/614,770, filed Sep. 13, 2012, 102 pages.
King et al., U.S. Appl. No. 13/614,473, filed Sep. 13, 2012, 120 pages.
King et al., U.S. Appl. No. 13/615,517, filed Sep. 13, 2012, 114 pages.
King et al., U.S. Appl. No. 13/186,908, filed Jul. 20, 2011, all pages.
King et al., U.S. Appl. No. 13/253,632, filed Oct. 5, 2011, all pages.
Bagley, et al., "Editing Images of Text," Communications of the ACM, vol. 37, Issue 12, pp, 63-72 (Dec. 1994).
Brickman et al., "Word Autocorrelation Redundancy Match (WARM) Technology," IBM J. Res. Develop., Nov. 1982, vol. 26, Issue 6, pp. 681-686.
Casey et al., "An Autonomous Reading Machine," IEEE Transactions on Computers, V. C-17, No. 5, pp. 492-503, May 1968.
Computer Hope, "Creating a link without an underline in HTML:," Mar. 29, 2001, pp. 1-2.
Curtain, D.P., "Image Sensors—Capturing the Photograph," 2006, pp. 1-19.
Fehrenbacher, Katie, "Quick Frucall Could Save You Pennies (or $$$)", GigaOM, Jul. 10, 2006, pp. 1-2.
Feldman, Susan, "The Answer Machine," Searcher: The Magazine for Database Professionals, Jan. 2000, vol. 8, Issue 1, p. 58.
Ghaly et al., "SAMS Teach Yourself EJB in 21 Days," Sams Publishing, 2002-2003 (pp. 1-2, 123 and 135).
Newman et al. "Camworks: A Video-Based Tool for Efficient Capture from Paper Source Documents," Proceedings of the 1999 IEEE International Conference on Multimedia Computing and Systems, vol. 2, pp. 647-653 (1999).
Sarre et al. "HyperTex—a system for the automatic generation of Hypertext Textbooks from Linear Texts," Database and Expert Systems Applications, Proceedings of the International Conference, Abstract, 1990, p. 1.
Solutions Software Corp., "Environmental Code of Federal Regulations (CFRs) including TSCA and SARA," Solution Software Corp., Enterprise, FL Abstract, Apr. 1994, pp. 1-2.
European Patent Office, European Search Report for EP Application No. 05731509 dated Apr. 23, 2009, pp. 1-7.
European Patent Office, European Search Report for EP Application No. 05732913 dated Mar. 31, 2009, pp. 1-4.
European Patent Office, European Search Report for EP Application No. 05733191 dated Apr. 23, 2009, pp. 1-5.
European Patent Office, European Search Report for EP Application No. 05733819 dated Mar. 31, 2009, pp. 1-4.
European Patent Office, European Search Report for EP Application No. 05733851 dated Sep. 2, 2009, pp. 1-5.
European Patent Office, European Search Report for EP Application No. 05733915 dated Dec. 30, 2009, pp. 1-5.
European Patent Office, European Search Report for EP Application No. 05734996 dasted Mar. 23, 2009, pp. 1-3.
European Patent Office, European Search Report for EP Application No. 05735008 dated Feb. 16, 2011, pp. 1-6.
European Patent Office, European Search Report for EP Application No. 05737714 dated Mar. 31, 2009, pp. 1-4.
European Patent Office, European Search Report for EP Application No. 05734796 dated Apr. 22, 2009, pp. 1-3.
European Patent Office, European Search Report for EP Application No. 05734947 dated Mar. 20, 2009, pp. 1-3.
European Patent Office, European Search Report for EP Application No. 05742065 dated Mar. 23, 2009, pp. 1-6.
European Patent Office, European Search Report for EP Application No. 05745611 dated Mar. 23, 2009, pp. 1-3.

(56) References Cited

OTHER PUBLICATIONS

European Patent Office, European Search Report for EP Application No. 05746428 dated Mar. 24, 2009, pp. 1-3.
European Patent Office, European Search Report for EP Application No. 05746830 dated Mar. 23, 2009, pp. 1-3.
European Patent Office, European Search Report for EP Application No. 05753019 dated Mar. 31, 2009, pp. 1-4.
European Patent Office, European Search Report for EP Application No. 05789280 dated Mar. 23, 2009, pp. 1-3.
European Patent Office, European Search Report for EP Application No. 05812073 dated Mar. 23, 2009, pp. 1-3.
European Patent Office, European Search Report for EP Application No. 07813283 dated Dec. 10, 2010, pp. 1-3.
International Bureau, International Search Report for PCT/EP2007/005038 dated Sep. 17, 2007, pp. 1-3.
International Bureau, International Search Report for PCT/EP2007/007824 dated May 25, 2009, pp. 1-6.
International Bureau, International Search Report for PCT/EP2007/008075 dated Oct. 10, 2008, pp. 1-6.
International Bureau, International Search Report for PCT/US2005/011012 dated Sep. 29, 2006, pp. 1-4.
International Bureau, International Search Report for PCT/US2005/011013 dated Oct. 19, 2007, pp. 1-4.
International Bureau, International Search Report for PCT/US2005/011014 dated May 16, 2007, pp. 1-3.
International Bureau, International Search Report for PCT/US2005/011015 dated Dec. 1, 2006, pp. 1-3.
International Bureau, International Search Report for PCT/US2005/011016 dated May 29, 2007, pp. 1-3.
International Bureau, International Search Report for PCT/US2005/011026 dated Jun. 11, 2007, pp. 1-3.
International Bureau, International Search Report for PCT/US2005/011042 dated Sep. 10, 2007, pp. 1-4.
International Bureau, International Search Report for PCT/US2005/011043 dated Sep. 20, 2007, pp. 1-3.
International Bureau, International Search Report for PCT/US2005/011084 dated Aug. 8, 2008, pp. 1-3.
International Bureau, International Search Report for PCT/US2005/011085 dated Sep. 14, 2006, pp. 1-3.
International Bureau, International Search Report for PCT/US2005/011088 dated Aug. 29, 2008, pp. 1-3.
International Bureau, International Search Report for PCT/US2005/011090 dated Sep. 27, 2006, pp. 1-4.
International Bureau, International Search Report for PCT/US2005/011533 dated Jun. 4, 2007, pp. 1-3.
International Bureau, International Search Report for PCT/US2005/011534 dated Nov. 9, 2006, pp. 1-3.
International Bureau, International Search Report for PCT/US2005/012510 dated Jan. 6, 2011, pp. 1-4.
International Bureau, International Search Report for PCT/US2005/013297 dated Aug. 14, 2007, pp. 1-3.
International Bureau, International Search Report for PCT/US2005/013586 dated Aug. 7, 2009, pp. 1-5.
International Bureau, International Search Report for PCT/US2005/017333 dated Jun. 4, 2007, pp. 1-3.
International Bureau, International Search Report for PCT/US2005/025732 dated Dec. 5, 2005, p. 1.
International Bureau, International Search Report for PCT/US2005/029536 dated Apr. 19, 2007, pp. 1-3.
International Bureau, International Search Report for PCT/US2005/029537 dated Sep 28, 2007, pp. 1-3.
International Bureau, International Search Report for PCT/US2005/029539 dated Sep. 29, 2008, pp. 1-4.
International Bureau, International Search Report for PCT/US2005/029680 dated Jul. 13, 2010, pp. 1-3.
International Bureau, International Search Report for PCT/US2005/030007 dated Mar. 11, 2008, pp. 1-6.
International Bureau, International Search Report for PCT/US2005/029534 dated May 15, 2007, pp. 1-4.
International Bureau, International Search Report for PCT/US2005/034319 dated Apr. 17, 2006, pp. 1-3.
International Bureau, International Search Report for PCT/US2005/034734 dated Apr. 4, 2006, pp. 1-3.
International Bureau, International Search Report for PCT/US2006/007108 dated Oct. 30, 2007, pp. 1-3.
International Bureau, International Search Report for PCT/US2006/018198 dated Sep. 25, 2007, pp. 1-4.
International Bureau, International Search Report for PCT/US2007/074214 dated Sep. 9, 2008, pp. 1-3.
International Bureau, International Search Report for PCT/US2010/000497 dated Sep. 27, 2010, pp. 1-5.
International Bureau, International Search Report for PCT/US2010/000498 dated Aug. 2, 2010, pp. 1-2.
International Bureau, International Search Report for PCT/US2010/000499 dated Aug. 31, 2010, pp. 1-3.
International Bureau, International Search Report for PCT/US2010/027254 dated Oct. 22, 2010, pp. 1-6.
International Bureau, International Search Report for PCT/US2010/027255 dated Nov. 16, 2010, pp. 1-5.
International Bureau, International Search Report for PCT/US2010/027256 dated Nov. 15, 2010, pp. 1-4.
International Bureau, International Search Report for PCT/US2010/028066 dated Oct. 26, 2010, pp. 1-4.
U.S. Patent Office, Non-Final Office Action for U.S. Appl. No. 11/004,637 dated Dec. 21, 2007, pp. 1-13.
U.S. Patent Office, Final Office Actiion for U.S. Appl. No. 11/004,637 dated Oct. 2, 2008, pp. 1-8.
U.S. Patent Office, Non-Final Office Action for U.S. Appl. No. 11/004,637 dated Apr. 2, 2009, pp. 1-14.
U.S. Patent Office, Notice of Allowance for U.S. Appl. No. 11/004,637 dated Dec. 11, 2009, pp. 1-4.
U.S. Patent Office, Non-Final Office Action for U.S. Appl. No. 11/096,704 dated Sep. 10, 2008, pp. 1-15.
U.S. Patent Office, Notice of Allowance for U.S. Appl. No. 11/096,704 dated Mar. 11, 2009, pp. 1-5.
U.S. Patent Office, Notice of Allowance for U.S. Appl. No. 11/096,704 dated Jun. 5, 2009, pp. 1-4.
U.S. Patent Office, Non-Final Office Action for U.S. Appl. No. 11/097,089 dated Aug. 13, 2008, pp. 1-12.
U.S. Patent Office, Final Office Action for U.S. Appl. No. 11/097,089 dated Mar. 17, 2009, pp. 1-14.
U.S. Patent Office, Non-Final Office Action for U.S. Appl. No. 11/097,089 dated Dec. 23, 2009, pp. 1-17.
U.S. Patent Office, Final Office Action for U.S. Appl. No. 11/098,089 dated Sep. 23, 2010, pp. 1-15.
U.S. Patent Office, Non-Final Office Action for U.S. Appl. No. 11/097,089 dated Apr. 7, 2011, pp. 1-15.
U.S. Patent Office, Non-Final Office Action for U.S. Appl. No. 11/097,093 dated Jul. 10, 2007, pp. 1-10.
U.S. Patent Office, Non-Final Office Action for U.S. Appl. No. 11/097,103 dated Jun. 25, 2007, pp. 1-13.
U.S. Patent Office, Non-Final Office Action for U.S. Appl. No. 11/097,103 dated Jan. 28, 2008, pp. 1-13.
U.S. Patent Office, Non-Final Office Action for U.S. Appl. No. 11/097,103 dated Dec. 31, 2008, p. 1-4.
U.S. Patent Office, Notice of Allowance for U.S. Appl. No. 11/097,103 dated May 14, 2009, pp. 1-5.
U.S. Patent Office, Final Office Action for U.S. Appl. No. 11/097,828 dated Feb. 4, 2009, pp. 1-8.
U.S. Patent Office, Notice of Allowance for U.S. Appl. No. 11/097,828 dated Feb. 5, 2010, pp. 1-9.
U.S. Patent Office, Final Office Action for U.S. Appl. No. 11/097,833 dated Jul. 7, 2009, pp. 1-9.
U.S. Patent Office, Notice of Allowance for U.S. Appl. No. 11/097,833 dated Jan. 10, 2011, pp. 1-8.
U.S. Patent Office, Non-Final Office Action for U.S. Appl. No. 11/097,835 dated Oct. 9, 2007, pp. 1-22.
U.S. Patent Office, Non-Final Office Action for U.S. Appl. No. 11/097,835 dated Feb. 19, 2009, pp. 1-11.
U.S. Patent Office, Final Office Action for U.S. Appl. No. 11/097,835 dated Dec. 29, 2009, pp. 1-12.

(56) References Cited

OTHER PUBLICATIONS

U.S. Patent Office, Notice of Allowance for U.S. Appl. No. 11/097,835 dated Sep. 1, 2010, pp. 1-13.
U.S. Patent Office, Final Office Action for U.S. Appl. No. 11/097,836 dated Jan. 6, 2009, pp. 1-27.
U.S. Patent Office, Non-Final Office Action for U.S. Appl. No. 11/097,836 dated Jul. 30, 2009, pp. 1-32.
U.S. Patent Office, Final Office Action for U.S. Appl. No. 11/097,836 dated May 13, 2010, pp. 1-13.
U.S. Patent Office, Non-Final Office Action for U.S. Appl. No. 11/097,961 dated Sep. 15, 2008, pp. 1-10.
U.S. Patent Office, Non-Final Office Action for U.S. Appl. No. 11/097,961 dated Mar. 5, 2009, pp. 1-10.
U.S. Patent Office, Final Office Action for U.S. Appl. No. 11/097,961 dated Dec. 9, 2009, pp. 1-11.
U.S. Patent Office, Non-Final Office Action for U.S. Appl. No. 11/097,961 dated Jul. 9, 2010, pp. 1-13.
U.S. Patent Office, Non-Final Office Action for U.S. Appl. No. 11/097,981 dated Jan. 16, 2009, pp. 1-13.
U.S. Patent Office, Notice of Allowance for U.S. Appl. No. 11/097,981 dated Jul. 31, 2009, pp. 1-11.
U.S. Patent Office, Final Office Action for U.S. Appl. No. 11/098,014 dated Jan. 23, 2009, pp. 1-8.
U.S. Patent Office, Non-Final Office Action for U.S. Appl. No. 11/098,014 dated Jun. 30, 2009, pp. 1-10.
U.S. Patent Office, Final Office Action for U.S. Appl. No. 11/098,014 dated Mar. 26, 2010, pp. 1-12.
U.S. Patent Office, Non-Final Office Action for U.S. Appl. No. 11/098,014 dated Nov. 3, 2010, pp. 1-8.
U.S. Patent Office, Notice of Allowance for U.S. Appl. No. 11/098,014 dated Mar. 16, 2011, pp. 1-9.
U.S. Patent Office, Non-Final Office Action for U.S. Appl. No. 11/098,016 dated Apr. 24, 2007, pp. 1-22.
U.S. Patent Office, Notice of Allowance for U.S. Appl. No. 11/098,016 dated Apr. 22, 2008, pp. 1-5.
U.S. Patent Office, Non-Final Office Action for U.S. Appl. No. 11/098,038 dated Aug. 28, 2006, pp. 1-9.
U.S. Patent Office, Final Office Action for U.S. Appl. No. 11/098,038 dated Jun. 7, 2007, pp. 1-10.
U.S. Patent Office, Notice of Allowance for U.S. Appl. No. 11/098,038 dated Mar. 11, 2009, pp. 1-6.
U.S. Patent Office, Notice of Allowance for U.S. Appl. No. 11/098,038 dated May 29, 2009, pp. 1-6.
U.S. Patent Office, Non-Final Office Action for U.S. Appl. No. 11/098,042 dated Dec. 5, 2008, pp. 1-10.
U.S. Patent Office, Notice of Allowance for U.S. Appl. No. 11/098,042 dated Apr. 13, 2009, pp. 1-8.
U.S. Patent Office, Non-Final Office Action for U.S. Appl. No. 11/098,043 dated Jul. 23, 2007, pp. 1-31.
U.S. Patent Office, Non-Final Office Action for U.S. Appl. No. 11/098,043 dated Dec. 23, 2008, pp. 1-35.
U.S. Patent Office, Final Office Action for U.S. Appl. No. 11/098,043 dated Jul. 21, 2009, pp. 1-45.
U.S. Patent Office, Non-Final Office Action for U.S. Appl. No. 11/110,353 dated Jul. 27, 2007, pp. 1-9.
U.S. Patent Office, Final Office Action for U.S. Appl. No. 11/110,353 dated Jan. 6, 2009, pp. 1-9.
U.S. Patent Office, Non-Final Office Action for U.S. Appl. No. 11/110,353 dated Sep. 15, 2009, pp. 1-15.
U.S. Patent Office, Notice of Allowance for U.S. Appl. No. 11/110,353 dated Dec. 2, 2009, pp. 1-6.
U.S. Patent Office, Non-Final Office Action for U.S. Appl. No. 11/131,945 dated Jan. 8, 2009, pp. 1-12.
U.S. Patent Office, Notice of Allowance for U.S. Appl. No. 11/131,945 dated Oct. 30, 2009, pp. 1-4.
U.S. Patent Office, Non-Final Office Action for U.S. Appl. No. 11/185,908 dated Dec. 14, 2009 (as revised Feb. 5, 2010). pp. 1-8.
U.S. Patent Office, Final Office Action for U.S. Appl. No. 11/185,908 dated Jun. 28, 2010, pp. 1-20.
U.S. Patent Office, Non-Final Office Action for U.S. Appl. No. 11/208,408 dated Oct. 7, 2008, pp. 1-25.
U.S. Patent Office, Final Office Action for U.S. Appl. No. 11/208,408 dated May 11, 2009, pp. 1-23.
U.S. Patent Office, Non-Final Office Action for U.S. Appl. No. 11/208,408 dated Apr. 23, 2010, pp. 1-10.
U.S. Patent Office, Non-Final Office Action for U.S. Appl. No. 11/208,457 dated Oct. 9, 2007, pp. 1-18.
U.S. Patent Office, Non-Final Office Action for U.S. Appl. No. 11/208,458 dated Mar. 21, 2007, pp. 1-12.
U.S. Patent Office, Notice of Allowance for U.S. Appl. No. 11/208,458 dated Jun. 2, 2008, pp. 1-16.
U.S. Patent Office, Non-Final Office Action for U.S. Appl. No. 11/208,461 dated Sep. 29, 2009, pp. 1-11.
U.S. Patent Office, Non-Final Office Action for U.S. Appl. No. 11/208,461 dated Nov. 3, 2010, pp. 1-7.
U.S. Patent Office, Notice of Allowance for U.S. Appl. No. 11/208,461 dated Mar. 15, 2011, pp. 1-10.
U.S. Patent Office, Non-Final Office Action for U.S. Appl. No. 11/209,333 dated Apr. 29, 2010, pp. 1-12.
U.S. Patent Office, Notice of Allowance for U.S. Appl. No. 11/210,260 dated Jan. 13, 2010, pp. 1-8.
U.S. Patent Office, Notice of Allowance for U.S. Appl. No. 11/236,330 dated Dec. 2, 2009, pp. 1-7.
U.S. Patent Office, Notice of Allowance for U.S. Appl. No. 11/236,330 dated Jun. 22, 2010, pp. 1-4.
U.S. Patent Office, Non-Final Office Action for U.S. Appl. No. 11/236,440 dated Jan. 22, 2009, pp. 1-16.
U.S. Patent Office, Final Office Action for U.S. Appl. No. 11/236,440 dated Jul. 22, 2009, pp. 1-26.
U.S. Patent Office, Non-Final Action for U.S. Appl. No. 11/365,983 dated Jan. 26, 2010, pp. 1-36.
U.S. Patent Office, Final Office Action for U.S. Appl. No. 11/365,983 dated Sep. 14, 2010, pp. 1-34.
U.S. Patent Office, Non-Final Office Action for U.S. Appl. No. 11/547,835 dated Dec. 29, 2010, pp. 1-16.
U.S. Patent Office, Non-Final Office Action for U.S. Appl. No. 11/672,014 dated May 6, 2010, pp. 1-7.
U.S. Patent Office, Notice of Allowance for U.S. Appl. No. 11/672,014 dated Feb. 28, 2011, pp. 1-7.
U.S. Patent Office, Non-Final Office Action for U.S. Appl. No. 11/758,866 dated Jun. 14, 2010, pp. 1-39.
U.S. Patent Office, Non-Final Office Action for U.S. Appl. No. 11/972,562 dated Apr. 21, 2010, pp. 1-11.
U.S. Patent Office, Non-Final Office Action for U.S. Appl. No. 12/538,731 dated Jun. 28, 2010, pp. 1-6.
U.S. Patent Office, Notice of Allowance for U.S. Appl. No. 12/538,731 dated Oct. 18, 2010, pp. 1-5.
U.S. Patent Office, Non-Final Office Action for U.S. Appl. No. 12/541,891 dated Dec. 9. 2010, pp. 1-7.
U.S. Patent Office, Non-Final Office Action for U.S. Appl. No. 12/542,816 dated Jun. 18, 2010, pp. 1-12.
U.S. Patent Office, Notice of Allowance for U.S. Appl. No. 12/542,816 dated Jan. 3, 2011, pp. 1-7.
U.S. Patent Office, Notice of Allowance for U.S. Appl. No. 12/542,816 dated Apr. 27, 2011, pp. 1-5.
U.S. Patent Office, Non-Final Office Action for U.S. Appl. No. 12/721,456 dated Mar. 1, 2011, pp. 1-9.
U.S. Patent Office, Non-Final Office Action for U.S. Appl. No. 12/887,473 dated Feb. 4, 2011, pp. 1-12.
U.S. Patent Office, Non-Final Office Action for U.S. Appl. No. 12/889,321 dated Mar. 31, 2011, pp. 1-23.
U.S. Patent Office, Non-Final Office Action for U.S. Appl. No. 12/904,064 dated Mar. 30, 2011, pp. 1-12.
King et al., U.S. Appl. No. 11/432,731, filed May 11, 2006 all pages.
King et al., U.S. Appl. No. 11/933,204, filed Oct. 31, 2007, all pages.
King et al., U.S. Appl. No. 11/952,885, filed Dec. 7, 2007, all pages.
King et al., U.S. Appl. No. 12/517,352, filed Jun. 2, 2009, all pages.
King et al., U.S. Appl. No. 12/517,541, filed Jun. 3, 2009, all pages.
King et al., U.S. Appl. No. 12/884,139, filed Sep. 16, 2010, all pages.

* cited by examiner

METHODS AND SYSTEMS FOR INITIATING APPLICATION PROCESSES BY DATA CAPTURE FROM RENDERED DOCUMENTS

CROSS-REFERENCE TO RELATED APPLICATIONS

This application is a continuation of U.S. patent application Ser. No. 11/097,961 filed Apr. 1, 2005 now abandoned, which is a Continuation-In-Part of U.S. patent application Ser. No. 11/004,637 filed on Dec. 3, 2004 now U.S. Pat. No. 7,707,309, which is hereby incorporated by reference in its entirety.

This application is related to, and incorporates by reference in their entirety, the following U.S. Patent Applications, filed concurrently herewith: U.S. patent application Ser. No. 11/097,093, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, entitled CONTENT ACCESS WITH HANDHELD DOCUMENT DATA CAPTURE DEVICES, U.S. patent application Ser. No. 11/098,014, entitled SEARCH ENGINES AND SYSTEMS WITH HANDHELD DOCUMENT DATA CAPTURE DEVICES, U.S. patent application Ser. No. 11/097,103, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/098,043, entitled SEARCHING AND ACCESSING DOCUMENTS ON PRIVATE NETWORKS FOR USE WITH CAPTURES FROM RENDERED DOCUMENTS U.S. patent application Ser. No. 11/097,981, entitled INFORMATION GATHERING SYSTEM AND METHOD, U.S. patent application Ser. No. 11/097,089, entitled DOCUMENT ENHANCEMENT SYSTEM AND METHOD, U.S. patent application Ser. No. 11/097,835, entitled PUBLISHING TECHNIQUES FOR ADDING VALUE TO A RENDERED DOCUMENT U.S. patent application Ser. No. 11/098,016, entitled ARCHIVE OF TEXT CAPTURES FROM RENDERED DOCUMENTS, U.S. patent application Ser. No. 11/097,828, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, entitled AGGREGATE ANALYSIS OF TEXT CAPTURES PERFORMED BY MULTIPLE USERS FROM RENDERED DOCUMENTS, U.S. patent application Ser. No. 11/097,836, entitled ESTABLISHING AN INTERACTIVE ENVIRONMENT FOR RENDERED DOCUMENTS, U.S. patent application Ser. No. 11/098,042, entitled DATA CAPTURE FROM RENDERED DOCUMENTS USING HANDHELD DEVICE, and U.S. patent application Ser. No. 11/096,704, entitled CAPTURING TEXT FROM RENDERED DOCUMENTS USING SUPPLEMENTAL INFORMATION.

This application claims priority to, and incorporates by reference in their entirety, the following U.S. Provisional Patent Applications: Application No. 60/559,226 filed on Apr. 1, 2004, Application No. 60/558,893 filed on Apr. 1, 2004, Application No. 60/558,968 filed on Apr. 1, 2004, Application No. 60/558,867 filed on Apr. 1, 2004, Application No. 60/559,278 filed on Apr. 1, 2004, Application No. 60/559,279 filed on Apr. 1, 2004, Application No. 60/559,265 filed on Apr. 1, 2004, Application No. 60/559,277 filed on Apr. 1, 2004, Application No. 60/558,969 filed on Apr. 1, 2004, Application No. 60/558,892 filed on Apr. 1, 2004, Application No. 60/558,760 filed on Apr. 1, 2004, Application No. 60/558,717 filed on Apr. 1, 2004, Application No. 60/558,499 filed on Apr. 1, 2004, Application No. 60/558,370 filed on Apr. 1, 2004, Application No. 60/558,789 filed on Apr. 1, 2004, Application No. 60/558,791 filed on Apr. 1, 2004, Application No. 60/558,527 filed on Apr. 1, 2004, Application No. 60/559,125 filed on Apr. 2, 2004, Application No. 60/558,909 filed on Apr. 2, 2004, Application No. 60/559,033 filed on Apr. 2, 2004, Application No. 60/559,127 filed on Apr. 2, 2004, Application No. 60/559,087 filed on Apr. 2, 2004, Application No. 60/559,131 filed on Apr. 2, 2004, Application No. 60/559,766 filed on Apr. 6, 2004, Application No. 60/561,768 filed on Apr. 12, 2004, Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667, filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602,930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004, Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No.

60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005, and Application No. 60/657,309 filed on Feb. 28, 2005.

TECHNICAL FIELD

The described technology is directed to the field of document processing. This disclosure relates generally to methods and systems for use with handheld document data capturing devices and, more particularly, relates to portable devices having the ability to capture data, such as portable optical scanners or voice input devices.

BACKGROUND

Paper documents have an enduring appeal, as can be seen by the proliferation of paper documents in the computer age. It has never been easier to print and publish paper documents than it is today. Paper documents prevail even though electronic documents are easier to duplicate, transmit, search and edit.

Given the popularity of paper documents and the advantages of electronic documents, it would be useful to combine the benefits of both.

DETAILED DESCRIPTION

Overview

Figure 1:
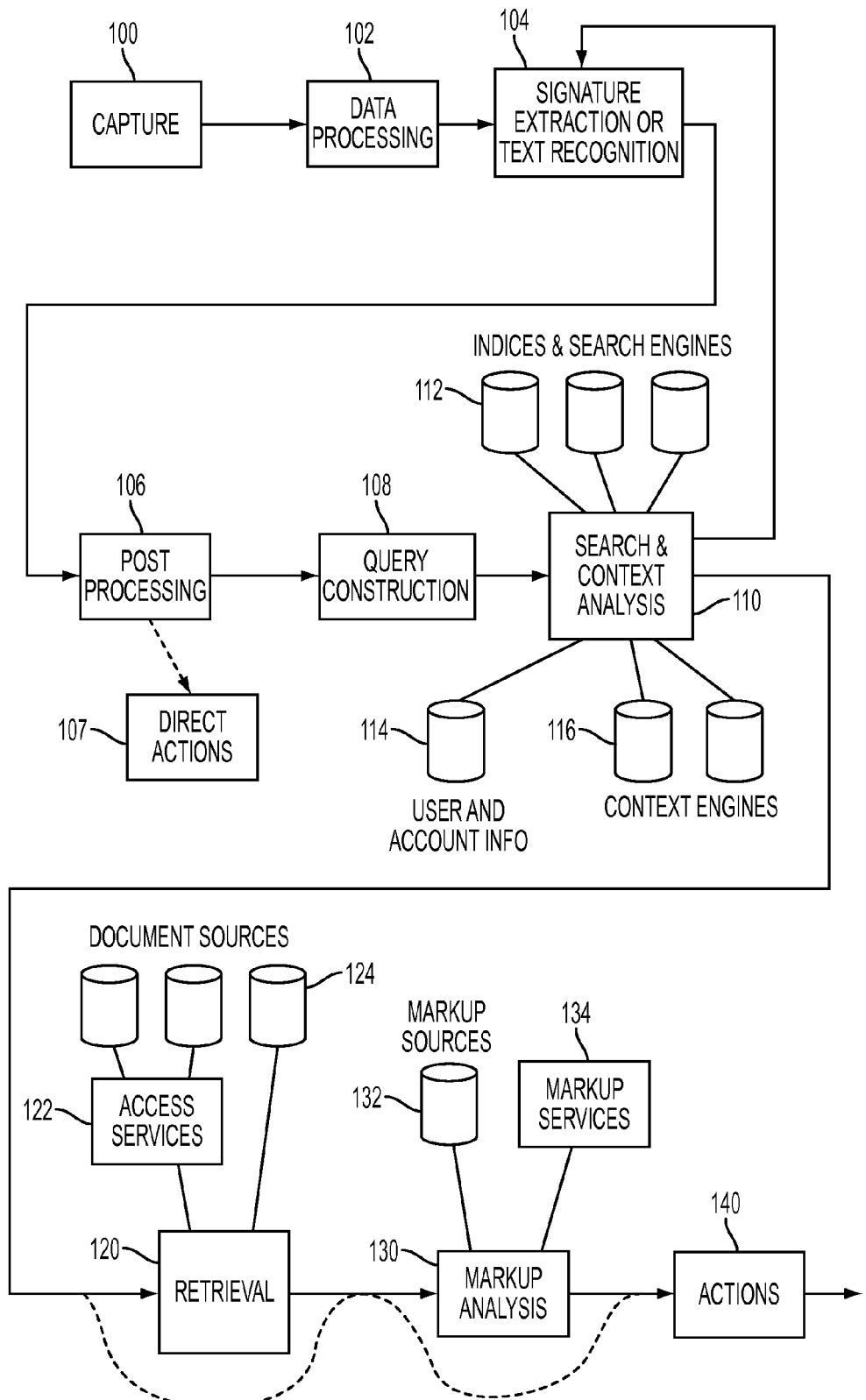
FIG. 1 is a data flow diagram that illustrates the flow of information in one embodiment of the core system.

One embodiment of a disclosed invention includes a user-friendly technique for ordering items from rendered documents (such as paper catalogs, advertisements, books, magazines, newspaper, flyers, signs and the like) using an optical capture device (such as a scanner, digital camera, cellular telephone camera, or other device capable of optically capturing at least a portion of the rendered document).

Another embodiment of a disclosed invention includes a user-friendly technique for ordering items from rendered documents (such as paper catalogs, advertisements, books, magazines, newspaper, flyers, signs and the like) using a voice capture device (such as voice recorder, cellular telephone, or other device capable of capturing at least a portion of the rendered document via voice input).

Whenever in this disclosure we refer to capturing or optically capturing data from a rendered document, it should be understood that some embodiments of this includes capturing the data by means of voice capture technology. Similarly, whenever in this disclosure we refer to an image or to image data, it should be understood that where appropriate this may be a voice image, for example a recording of the user's voice.

One embodiment of a disclosed invention is a method of placing an order for an item from a rendered document. The rendered document contains at least one human-readable indication of an orderable item. The method includes obtaining a captured fragment of the rendered document and communicating a representation of the captured fragment along with an identifier to a remote computer to order the item from a vendor via the Internet This embodiment may further include using a document or data capture context to search for an electronic version of the rendered document.

Another embodiment discloses a method of ordering an item from a rendered document, the method including establishing a document context of the rendered document; capturing a human-readable document fragment of the rendered document; and generating an order for the item. The order includes at least the document context, a representation of the document fragment and an identifier associated with a purchaser.

Part I—Introduction

1. Nature of the System

For every paper document that has an electronic counterpart, there exists a discrete amount of information in the paper document that can identify the electronic counterpart. In some embodiments, the system uses a sample of text captured from a paper document, for example using a handheld scanner, to identify and locate an electronic counterpart of the document. In most cases, the amount of text needed by the facility is very small in that a few words of text from a document can often function as an identifier for the paper document and as a link to its electronic counterpart. In addition, the system may use those few words to identify not only the document, but also a location within the document.

Thus, paper documents and their digital counterparts can be associated in many useful ways using the system discussed herein.

1.1. A Quick Overview of the Future

Once the system has associated a piece of text in a paper document with a particular digital entity has been established, the system is able to build a huge amount of functionality on that association.

It is increasingly the case that most paper documents have an electronic counterpart that is accessible on the World Wide Web or from some other online database or document corpus, or can be made accessible, such as in response to the payment of a fee or subscription. At the simplest level, then, when a user scans a few words in a paper document, the system can retrieve that electronic document or some part of it, or display it, email it to somebody, purchase it, print it or post it to a web page. As additional examples, scanning a few words of a book that a person is reading over breakfast could cause the audio-book version in the person's car to begin reading from that point when s/he starts driving to work, or scanning the serial number on a printer cartridge could begin the process of ordering a replacement.

The system implements these and many other examples of "paper/digital integration" without requiring changes to the current processes of writing, printing and publishing documents, giving such conventional rendered documents a whole new layer of digital functionality.

1.2. Terminology

A typical use of the system begins with using an optical scanner to scan text from a paper document, but it is important to note that other methods of capture from other types of document are equally applicable. The system is therefore sometimes described as scanning or capturing text from a rendered document, where those terms are defined as follows:

A rendered document is a printed document or a document shown on a display or monitor. It is a document that is perceptible to a human, whether in permanent form or on a transitory display.

Scanning or capturing is the process of systematic examination to obtain information from a rendered document. The process may involve optical capture using a scanner or camera (for example a camera in a cellphone), or it may involve reading aloud from the document into an audio capture device or typing it on a keypad or keyboard. For more examples, see Section 15.

2. Introduction to the System

This section describes some of the devices, processes and systems that constitute a system for paper/digital integration. In various embodiments, the system builds a wide variety of services and applications on this underlying core that provides the basic functionality.

2.1. The Processes

FIG. 1 is a data flow diagram that illustrates the flow of information in one embodiment of the core system. Other embodiments may not use all of the stages or elements illustrated here, while some will use many more.

Text from a rendered document is captured 100, typically in optical form by an optical scanner or audio form by a voice recorder, and this image or sound data is then processed 102, for example to remove artifacts of the capture process or to improve the signal-to-noise ratio. A recognition process 104 such as OCR, speech recognition, or autocorrelation then converts the data into a signature, comprised in some embodiments of text, text offsets, or other symbols. Alternatively, the system performs an alternate form of extracting document signature from the rendered document. The signature represents a set of possible text transcriptions in some embodiments. This process may be influenced by feedback from other stages, for example, if the search process and context analysis 110 have identified some candidate documents from which the capture may originate, thus narrowing the possible interpretations of the original capture.

A post-processing 106 stage may take the output of the recognition process and filter it or perform such other operations upon it as may be useful. Depending upon the embodiment implemented, it may be possible at this stage to deduce some direct actions 107 to be taken immediately without reference to the later stages, such as where a phrase or symbol has been captured which contains sufficient information in itself to convey the user's intent. In these cases no digital counterpart document need be referenced, or even known to the system.

Typically, however, the next stage will be to construct a query 108 or a set of queries for use in searching. Some aspects of the query construction may depend on the search process used and so cannot be performed until the next stage, but there will typically be some operations, such as the removal of obviously misrecognized or irrelevant characters, which can be performed in advance.

The query or queries are then passed to the search and context analysis stage 110. Here, the system optionally attempts to identify the document from which the original data was captured. To do so, the system typically uses search indices and search engines 112, knowledge about the user 114 and knowledge about the user's context or the context in which the capture occurred 116. Search engine 112 may employ and/or index information specifically about rendered documents, about their digital counterpart documents, and about documents that have a web (internet) presence). It may write to, as well as read from, many of these sources and, as has been mentioned, it may feed information into other stages of the process, for example by giving the recognition system 104 information about the language, font, rendering and likely next words based on its knowledge of the candidate documents.

In some circumstances the next stage will be to retrieve 120 a copy of the document or documents that have been identified. The sources of the documents 124 may be directly accessible, for example from a local filing system or database or a web server, or they may need to be contacted via some access service 122 which might enforce authentication, security or payment or may provide other services such as conversion of the document into a desired format.

Applications of the system may take advantage of the association of extra functionality or data with part or all of a document. For example, advertising applications discussed in Section 10.4 may use an association of particular advertising messages or subjects with portions of a document. This extra associated functionality or data can be thought of as one or more overlays on the document, and is referred to herein as "markup." The next stage of the process 130, then, is to identify any markup relevant to the captured data. Such markup may be provided by the user, the originator, or publisher of the document, or some other party, and may be directly accessible from some source 132 or may be generated by some service 134. In various embodiments, markup can be associated with, and apply to, a rendered document and/or the digital counterpart to a rendered document, or to groups of either or both of these documents.

Lastly, as a result of the earlier stages, some actions may be taken 140. These may be default actions such as simply recording the information found, they may be dependent on the data or document, or they may be derived from the markup analysis. Sometimes the action will simply be to pass the data to another system. In some cases the various possible actions appropriate to a capture at a specific point in a rendered document will be presented to the user as a menu on an associated display, for example on a local display 332, on a computer display 212 or a mobile phone or PDA display 216. If the user doesn't respond to the menu, the default actions can be taken.

2.2. The Components

Figure 2:
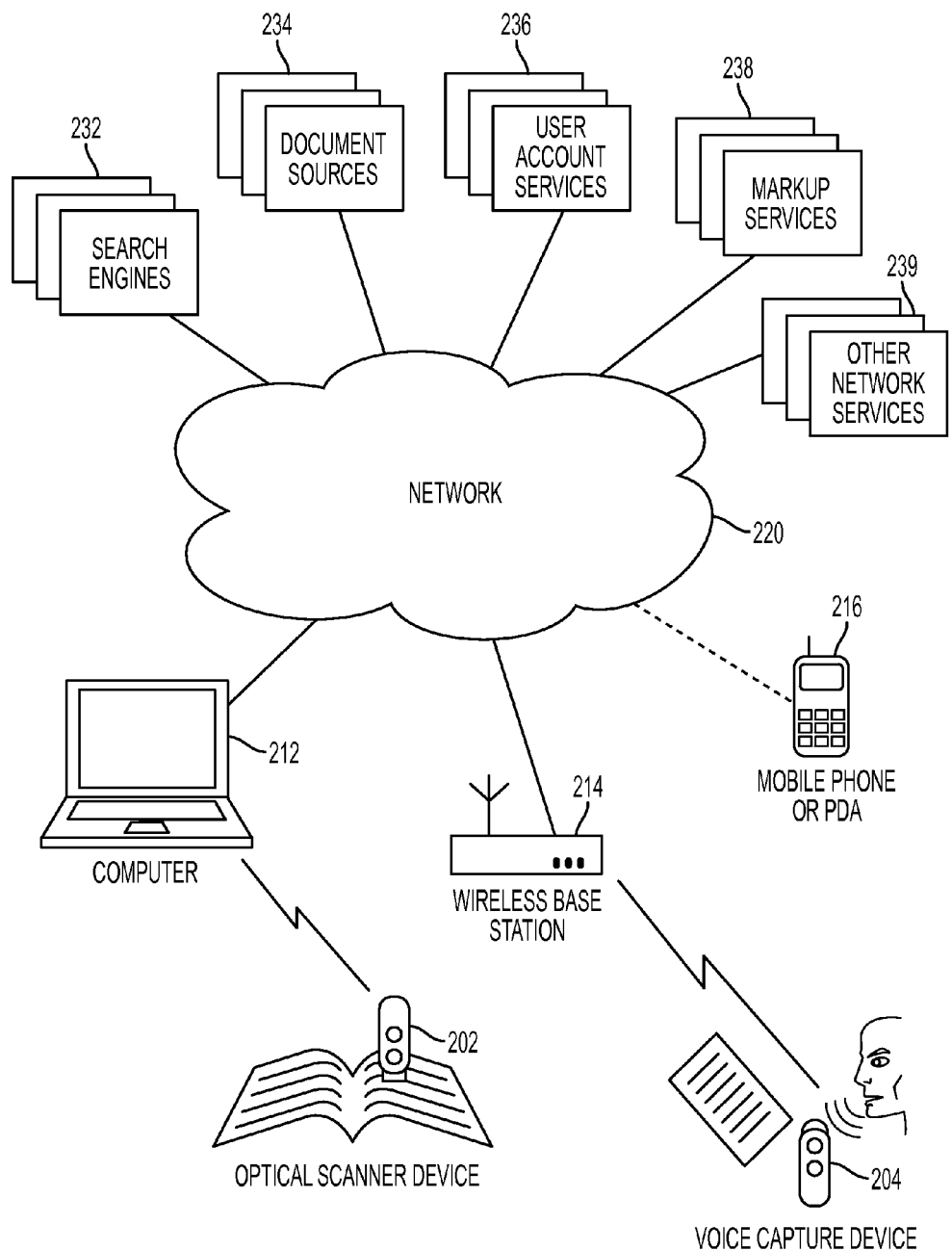
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more optical scanning capture devices 202 or voice capture devices 204. In some embodiments, the same device performs both functions. Each capture device is able to communicate with other parts of the system such as a computer 212 and a mobile station 216 (e.g., a mobile phone or PDA) using either a direct wired or wireless connection, or through the network 220, with which it can communicate using a wired or wireless connection, the latter typically involving a wireless base station 214. In some embodiments, the capture device is integrated in the mobile station, and optionally shares some of the audio and/or optical components used in the device for voice communications and picture-taking.

Computer 212 may include a memory containing computer executable instructions for processing an order from scanning devices 202 and 204. As an example, an order can include an identifier (such as a serial number of the scanning device 202/204 or an identifier that partially or uniquely identifies the user of the scanner), scanning context information (e.g., time of scan, location of scan, etc.) and/or scanned information (such as a text string) that is used to uniquely identify the document being scanned. In alternative embodiments, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above.

Regardless of the manner by which the devices are coupled to each other, they may all may be operable in accordance with well-known commercial transaction and communication protocols (e.g., Internet Protocol (IP)). In various embodiments, the functions and capabilities of scanning device 202, computer 212, and mobile station 216 may be wholly or partially integrated into one device. Thus, the terms scanning device, computer, and mobile station can refer to the same device depending upon whether the device incorporates functions or capabilities of the scanning device 202, computer 212 and mobile station 216. In addition, some or all of the functions of the search engines 232, document sources 234, user account services 236, markup services 238 and other network services 239 may be implemented on any of the devices and/or other devices not shown.

2.3. The Capture Device

As described above, the capture device may capture text using an optical scanner that captures image data from the rendered document, or using an audio recording device that captures a user's spoken reading of the text, or other methods. Some embodiments of the capture device may also capture images, graphical symbols and icons, etc., including machine readable codes such as barcodes. The device may be exceedingly simple, consisting of little more than the transducer, some storage, and a data interface, relying on other functionality residing elsewhere in the system, or it may be a more full-featured device. For illustration, this section describes a device based around an optical scanner and with a reasonable number of features.

Scanners are well known devices that capture and digitize images. An offshoot of the photocopier industry, the first scanners were relatively large devices that captured an entire document page at once. Recently, portable optical scanners have been introduced in convenient form factors, such as a pen-shaped handheld device.

In some embodiments, the portable scanner is used to scan text, graphics, or symbols from rendered documents. The portable scanner has a scanning element that captures text, symbols, graphics, etc, from rendered documents. In addition to documents that have been printed on paper, in some embodiments, rendered documents include documents that have been displayed on a screen such as a CRT monitor or LCD display.

Figure 3:
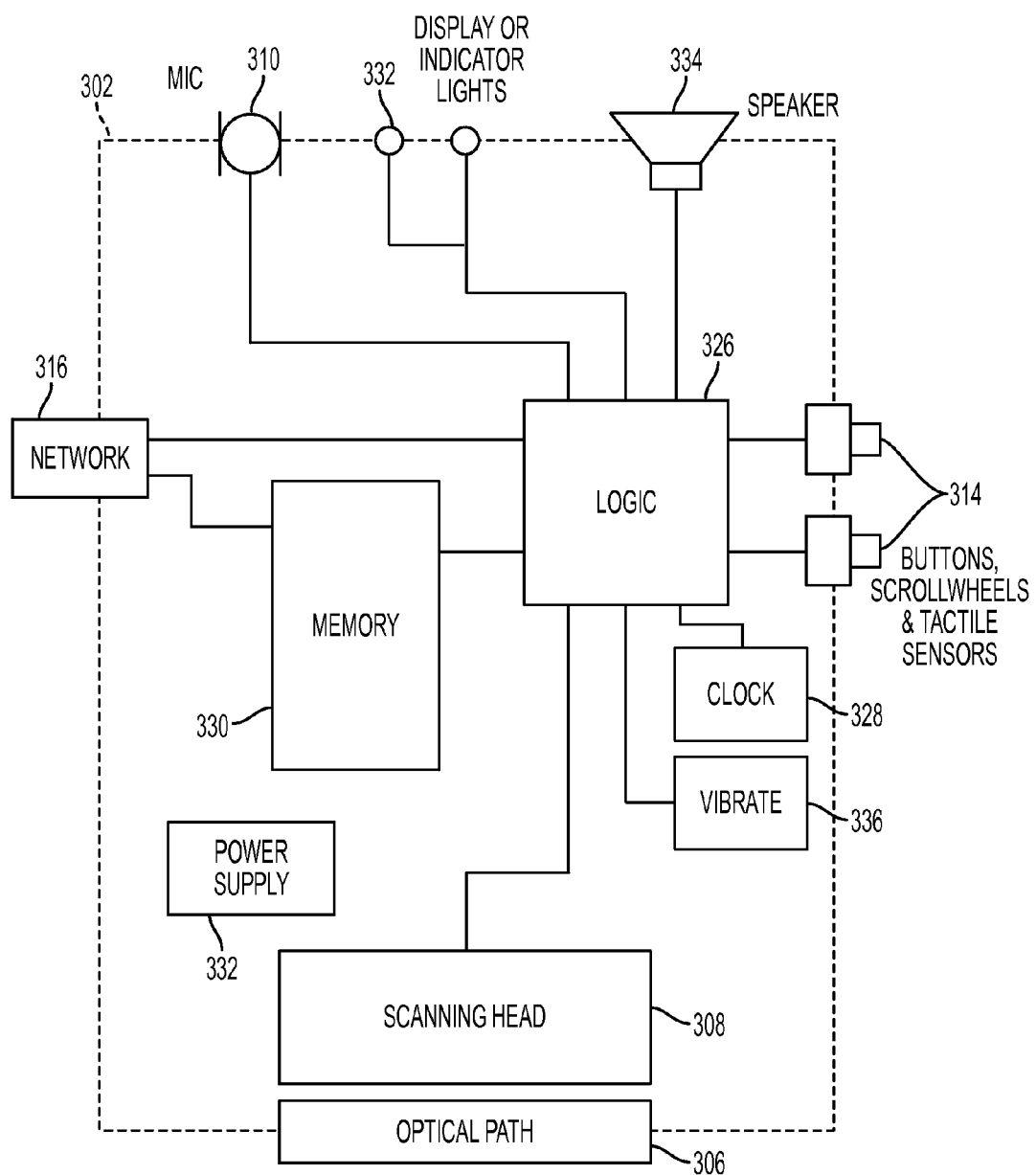
FIG. 3 is a block diagram of an embodiment of a scanner.

FIG. 3 is a block diagram of an embodiment of a scanner 302. The scanner 302 comprises an optical scanning head 308 to scan information from rendered documents and convert it to machine-compatible data, and an optical path 306, typically a lens, an aperture or an image conduit to convey the image from the rendered document to the scanning head. The scanning head 308 may incorporate a Charge-Coupled Device (CCD), a Complementary Metal Oxide Semiconductor (CMOS) imaging device, or an optical sensor of another type.

A microphone 310 and associated circuitry convert the sound of the environment (including spoken words) into machine-compatible signals, and other input facilities exist in the form of buttons, scroll-wheels or other tactile sensors such as touch-pads 314.

Feedback to the user is possible through a visual display or indicator lights 332, through a loudspeaker or other audio transducer 334 and through a vibrate module 336.

The scanner 302 comprises logic 326 to interact with the various other components, possibly processing the received signals into different formats and/or interpretations. Logic 326 may be operable to read and write data and program instructions stored in associated storage 330 such as RAM, ROM, flash, or other suitable memory. It may read a time signal from the clock unit 328. The scanner 302 also includes an interface 316 to communicate scanned information and other signals to a network and/or an associated computing device. In some embodiments, the scanner 302 may have an on-board power supply 332. In other embodiments, the scanner 302 may be powered from a tethered connection to another device, such as a Universal Serial Bus (USB) connection.

As an example of one use of scanner 302, a reader may scan some text from a newspaper article with scanner 302. The text is scanned as a bit-mapped image via the scanning head 308. Logic 326 causes the bit-mapped image to be stored in memory 330 with an associated time-stamp read from the clock unit 328. Logic 326 may also perform optical character recognition (OCR) or other post-scan processing on the bit-mapped image to convert it to text. Logic 326 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 326) to an associated computer via interface 316.

As an example of another use of scanner 302, a reader may capture some text from an article as an audio file by using microphone 310 as an acoustic capture port. Logic 326 causes audio file to be stored in memory 328. Logic 326 may also perform voice recognition or other post-scan processing on the audio file to convert it to text. As above, the reader may then upload the audio file (or text produced by post-scan processing performed by logic 326) to an associated computer via interface 316.

Part II—Overview of the Areas of the Core System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Scan/Speak/Type as Search Query

Use of the described system typically starts with a few words being captured from a rendered document using any of several methods, including those mentioned in Section 1.2 above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have scanned in these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short, Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capturing device, and/or biometric or other supplemental information (speech patterns, fingerprints, etc.).

3.4. Knowledge of Nature of Unreliability in Search Query (OCR Errors etc)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capturing device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, may be Recorded and Acted on Later

If there are likely to be delays or cost associated with communicating a query or receiving the results, this pre-loaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some embodiments, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1. Indexing

Often, the same index can be searched using either paper-originated or traditional queries, but the index may be enhanced for use in the current system in a variety of ways.

4.1.1. Knowledge about the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of scanning activity, circulation numbers provided by the publisher or other sources, etc—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by an optical scan may benefit if the index takes into account characters that are easily confused in the OCR process, or includes some knowledge of the fonts used in the document. Similarly, if the query is from speech recognition, an index based on similar-sounding phonemes may be much more efficiently searched. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some embodiments, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each filesystem, each directory, even each file on a user's hard disk. Indexes are published and subscribed to by users and by systems. It will be important, then, to construct indices that can be distributed, updated, merged and separated efficiently.

4.2. Handling the Queries

4.2.1. Knowing the Capture is from Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some embodiments of the system will route queries to the search engine by way of a dedicated gateway. Thus, the search engine knows that all queries passing through the dedicated gateway were originated from a paper document.

4.2.2. Use of Context

Section 13 below describes a variety of different factors which are external to the captured text itself, yet which can be a significant aid in identifying a document. These include such things as the history of recent scans, the longer-term reading habits of a particular user, the geographic location of a user and the users recent use of particular electronic documents. Such factors are referred to herein as "context."

Some of the context may be handled by the search engine itself, and be reflected in the search results. For example, the search engine may keep track of a users scanning history, and may also cross-reference this scanning history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup, Annotations and Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is scanned. In some cases, the functionality is not defined in the electronic document, but is stored or generated elsewhere.

This layer of added functionality is referred to herein as "markup."

5.1. Overlays, Static and Dynamic

One way to think of the markup is as an "overlay" on the document, which provides further information about—and may specify actions associated with—the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-in" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being scanned, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was scanned.

Any word, phrase, etc. may have associated markup. For example, the system may add certain items to a pop-up menu (e.g., a link to an online bookstore) whenever the user captures the word "book," or the title of a book, or a topic related to books. In some embodiments, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-supplied Content 5.3.1. User Comments and Annotations, Including Multimedia Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-reading

An important example of user-sourced markup is the annotation of paper documents as part of a proofreading, editing or reviewing process.

5.4. Third-party Content

As mentioned earlier, markup data may often be supplied by third parties, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed . . . ." The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as input from a corporate database, information from the public Internet, or statistics gathered by the local operating system.

Data sources may also be more local, and in particular may provide information about the user's context—his/her identity, location and activities. For example, the system might communicate with the user's mobile phone and offer a markup layer that gives the user the option to send a document to somebody that the user has recently spoken to on the phone.

6. Authentication, Personalization and Security

In many situations, the identity of the user will be known. Sometimes this will be an "anonymous identity," where the user is identified only by the serial number of the capture device, for example. Typically, however, it is expected that the system will have a much more detailed knowledge of the user, which can be used for personalizing the system and to allow activities and transactions to be performed in the user's name.

6.1. User History and "Life Library"

One of the simplest and yet most useful functions that the system can perform is to keep a record for a user of the text that s/he has captured and any further information related to that capture, including the details of any documents found, the location within that document and any actions taken as a result.

This stored history is beneficial for both the user and the system.

6.1.1. For the User

The user can be presented with a "Life Library," a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previously captured scans.

6.1.2. For the System

A record of a user's past captures is also useful for the system. Many aspects of the system operation can be enhanced by knowing the user's reading habits and history. The simplest example is that any scan made by a user is more likely to come from a document that the user has scanned in the recent past, and in particular if the previous scan was within the last few minutes it is very likely to be from the same document. Similarly, it is more likely that a document is being read in start-to-finish order. Thus, for English documents, it is also more likely that later scans will occur farther down in the document. Such factors can help the system establish the location of the capture in cases of ambiguity, and can also reduce the amount of text that needs to be captured.

6.2. Scanner as Payment, Identity and Authentication Device

Because the capture process generally begins with a device of some sort, typically an optical scanner or voice recorder, this device may be used as a key that identifies the user and authorizes certain actions.

6.2.1. Associate Scanner with Phone or other Account

The device may be embedded in a mobile phone or in some other way associated with a mobile phone account. For example, a scanner may be associated with a mobile phone account by inserting a SIM card associated with the account into the scanner. Similarly, the device may be embedded in a credit card or other payment card, or have the facility for such a card to be connected to it. The device may therefore be used as a payment token, and financial transactions may be initiated by the capture from the rendered document.

6.2.2. Using Scanner Input for Authentication

The scanner may also be associated with a particular user or account through the process of scanning some token, symbol or text associated with that user or account. In addition, scanner may be used for biometric identification, for example by scanning the fingerprint of the user. In the case of an audio-based capture device, the system may identify the user by matching the voice pattern of the user or by requiring the user to speak a certain password or phrase.

For example, where a user scans a quote from a book and is offered the option to buy the book from an online retailer, the user can select this option, and is then prompted to scan his/her fingerprint to confirm the transaction.

See also Sections 15.5 and 15.6.

6.2.3. Secure Scanning Device

When the capture device is used to identify and authenticate the user, and to initiate transactions on behalf of the user, it is important that communications between the device and other parts of the system are secure. It is also important to guard against such situations as another device impersonating a scanner, and so-called "man in the middle" attacks where communications between the device and other components are intercepted.

Techniques for providing such security are well understood in the art; in various embodiments, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce."

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document. Similarly, the user can be connected to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The reader's interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when scanned and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or scanning specially printed symbols. In cases where the system needed to ensure that the user was in possession of the entire document, it might prompt the user to scan particular items or phrases from particular pages, e.g. "the second line of page 46."

7.5. Documents which Expire

If the printed document is a gateway to extra materials and functionality, access to such features can also be time-limited. After the expiry date, a user may be required to pay a fee or obtain a newer version of the document to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some embodiments, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the user's screen or depositing it in their email inbox.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and scanner may be established.

8.2. Document Purchase—Copyright-owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in future. The system may retrieve and store the existing version on behalf of the user, even if the user has not requested it, thus guaranteeing its availability should the user request it in future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct a user may be granted access based on an account established by their employer, or based on their scanning of a printed copy owned by a friend who is a subscriber.

8.5. Replacing Photocopying with Scan-and-Print

The process of capturing text from a paper document, identifying an electronic original, and printing that original, or some portion of that original associated with the capture, forms an alternative to traditional photocopying with many advantages:

- the paper document need not be in the same location as the final printout, and in any case need not be there at the same time
- the wear and damage caused to documents by the photocopying process, especially to old, fragile and valuable documents, can be avoided
- the quality of the copy is typically be much higher
- records may be kept about which documents or portions of documents are the most frequently copied
- payment may be made to the copyright owner as part of the process
- unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Text Recognition Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system.

While this section focuses on OCR, many of the issues discussed map directly onto other recognition technologies, in particular speech recognition. As mentioned in Section 3.1, the process of capturing from paper may be achieved by a user reading the text aloud into a device which captures audio. Those skilled in the art will appreciate that principles discussed here with respect to images, fonts, and text fragments often also apply to audio samples, user speech models and phonemes.

9.1. Optimization for Appropriate Devices

A scanning device for use with the described system will often be small, portable, and low power. The scanning device may capture only a few words at a time, and in some implementations does not even capture a whole character at once, but rather a horizontal slice through the text, many such slices being stitched together to form a recognizable signal from which the text may be deduced. The scanning device may also have very limited processing power or storage so, while in some embodiments it may perform all of the OCR process itself, many embodiments will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

9.2. "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.3. Iterative OCR—Guess, Disambiguate, Guess . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.4. Using Knowledge of Likely Rendering

When the system has knowledge of aspects of the likely printed rendering of a document—such as the font typeface used in printing, or the layout of the page, or which sections are in italics—this too can help in the recognition process. (Section 4.1.1)

9.5. Font Caching—Determine Font on Host, Download to Client

As candidate source texts in the document corpus are identified, the font, or a rendering of it, may be downloaded to the device to help with the recognition.

9.6. Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some embodiments, the offsets between matching text tokens (i.e., the number of intervening tokens plus one) are used to characterize fragments of text.

Conventional OCR uses knowledge about fonts, letter structure and shape to attempt to determine characters in scanned text. Embodiments of the present invention are different; they employ a variety of methods that use the rendered text itself to assist in the recognition process. These embodiments use characters (or tokens) to "recognize each other." One way to refer to such self-recognition is "template matching," and is similar to "convolution." To perform such self-recognition, the system slides a copy of the text horizontally over itself and notes matching regions of the text images. Prior template matching and convolution techniques encompass a variety of related techniques. These techniques to tokenize and/or recognize characters/tokens will be collectively referred to herein as "autocorrelation," as the text is used to correlate with its own component parts when matching characters/tokens.

When autocorrelating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the scanned text. The offset number is the distance (number of tokens) to the next occurrence of the same token. If the token is unique within the text string, the offset is zero (0). The sequence of token offsets thus generated is a signature that can be used to identify the scanned text.

In some embodiments, the token offsets determined for a string of scanned tokens are compared to an index that indexes a corpus of electronic documents based upon the token offsets of their contents (Section 4.1.2). In other embodiments, the token offsets determined for a string of scanned tokens are converted to text, and compared to a more conventional index that indexes a corpus of electronic documents based upon their contents As has been noted earlier, a similar token-correlation process may be applied to speech fragments when the capture process consists of audio samples of spoken words.

9.7. Font/character "Self-recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f," etc. The OCR process is enhanced by use of this relationship to construct templates for letters that have not been scanned yet. For example, where a reader scans a short string of text from a paper document in a previously unencountered font such that the system does not have a set of image templates with which to compare the scanned images the system can leverage the probable relationship between certain characters to construct the font template library even though it has not yet encountered all of the letters in the alphabet. The system can then use the constructed font template library to recognize subsequent scanned text and to further refine the constructed font library.

9.8. Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from their Physical Printed Copies.

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Scan Context and History

In a traditional paper publication, advertisements generally consume a large amount of space relative to the text of a newspaper article, and a limited number of them can be placed around a particular article. In the described system, advertising can be associated with individual words or phrases, and can selected according to the particular interest the user has shown by capturing that text and possibly taking into account their history of past scans.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-based compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6)

10.5.2. Popularity-based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or scan history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (when Available)

Advertising and other opportunities for commercial transactions may not be presented to the user immediately at the time of text capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some embodiments, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Amazon" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Scan and Print-related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as pen scanners becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some embodiments, the entire described system, or the core of it, is provided by the OS. In some embodiments, support for the system is provided by Application Programming Interfaces (APIs) that can be used by other software packages, including those directly implementing aspects of the system.

11.2.1. Support for OCR and other Recognition Technologies

Most of the methods of capturing text from a rendered document require some recognition software to interpret the source data, typically a scanned image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Scans

If an optical scan or other capture occurs and is presented to the OS, it may have a default action to be taken under those circumstances in the event that no other subsystem claims ownership of the capture. An example of a default action is presenting the user with a choice of alternatives, or submitting the captured text to the OS's built-in search facilities.

11.2.3. OS has Default Action for Particular Documents or Document Types

If the digital source of the rendered document is found, the OS may have a standard action that it will take when that particular document, or a document of that class, is scanned. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc.

11.2.4. Interpretation of Gestures and Mapping into Standard Actions

In Section 12.1.3 the use of "gestures" is discussed, particularly in the case of optical scanning, where particular movements made with a handheld scanner might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS, thus ensuring consistent behavior. The same is desirable for scanner gestures and other scanner-related actions.

11.2.5. Set Response to Standard (and Non-standard) Iconic/Text Printed Menu Items In a similar way, certain items of text or other symbols may, when scanned, cause standard actions to occur, and the OS may provide a selection of these. An example might be that scanning the text "[print]" in any document would cause the OS to retrieve and print a copy of that document. The OS may also provide a way to register such actions and associate them with particular scans.

11.3. Support in System GUI Components for Typical Scan-initiated Activities Most software applications are based substantially on standard Graphical User Interface components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to Find Particular Text Content

A typical use of the system may be for the user to scan an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some embodiments, the system uses the application pop-up menus traditionally associated with clicking the right mouse button on some text. The system inserts extra options into such menus, and causes them to be displayed as a result of activities such as scanning a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some embodiments, the OS keeps a simple record of when any document was printed and by whom. In some embodiments, the OS takes one or more further actions that would make it better suited for use with the system. Examples include:

Saving the digital rendered version of every document printed along with information about the source from which it was printed Saving a subset of useful information about the printed version—for example, the fonts used and where the line breaks occur—which might aid future scan interpretation Saving the version of the source document associated with any printed copy Indexing the document automatically at the time of printing and storing the results for future searching

11.6. My (Printed/Scanned) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and Incorporated in its operations.

11.7. OS-level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on a PC, if the capture device is relatively dumb and is connected to it by a cable, or entirely on the device, if it is sophisticated and with significant processing power of its own. In some cases, some functionality resides in each component. Part, or indeed all, of the system's functionality may also be implemented on other devices such as mobile phones or PDAs.

The descriptions in the following sections are therefore indications of what may be desirable in certain implementations, but they are not necessarily appropriate for all and may be modified in several ways.

12.1. On the Capture Device

With all capture devices, but particularly in the case of an optical scanner, the user's attention will generally be on the device and the paper at the time of scanning. It is very desirable, then, that any input and feedback needed as part of the process of scanning do not require the user's attention to be elsewhere, for example on the screen of a computer, more than is necessary.

12.1.1. Feedback on Scanner

A handheld scanner may have a variety of ways of providing feedback to the user about particular conditions. The most obvious types are direct visual, where the scanner incorporates indicator lights or even a full display, and auditory, where the scanner can make beeps, clicks or other sounds. Important alternatives include tactile feedback, where the scanner can vibrate, buzz, or otherwise stimulate the user's sense of touch, and projected feedback, where it indicates a status by projecting onto the paper anything from a colored spot of light to a sophisticated display.

Important immediate feedback that may be provided on the device includes:
- feedback on the scanning process—user scanning too fast, at too great an angle, or drifting too high or low on a particular line
- sufficient content—enough has been scanned to be pretty certain of finding a match if one exists—important for disconnected operation
- context known—a source of the text has been located
- unique context known—one unique source of the text has been located
- availability of content—indication of whether the content is freely available to the user, or at a cost Many of the user interactions normally associated with the later stages of the system may also take place on the capture device if it has sufficient abilities, for example, to display part or all of a document.

12.1.2. Controls on Scanner

The device may provide a variety of ways for the user to provide input in addition to basic text capture. Even when the device is in close association with a host machine that has input options such as keyboards and mice, it can be disruptive for the user to switch back and forth between manipulating the scanner and using a mouse, for example.

The handheld scanner may have buttons, scroll/jog-wheels, touch-sensitive surfaces, and/or accelerometers for detecting the movement of the device. Some of these allow a richer set of interactions while still holding the scanner.

For example, in response to scanning some text, the system presents the user with a set of several possible matching documents. The user uses a scroll-wheel on the side of the scanner is to select one from the list, and clicks a button to confirm the selection.

12.1.3. Gestures

The primary reason for moving a scanner across the paper is to capture text, but some movements may be detected by the device and used to indicate other user intentions. Such movements are referred to herein as "gestures."

As an example, the user can indicate a large region of text by scanning the first few words in conventional left-to-right order, and the last few in reverse order, i.e. right to left. The user can also indicate the vertical extent of the text of interest by moving the scanner down the page over several lines. A backwards scan might indicate cancellation of the previous scan operation.

12.1.4. Online/Offline Behavior

Many aspects of the system may depend on network connectivity, either between components of the system such as a scanner and a host laptop, or with the outside world in the form of a connection to corporate databases and Internet search. This connectivity may not be present all the time, however, and so there will be occasions when part or all of the system may be considered to be "offline." It is desirable to allow the system to continue to function usefully in those circumstances.

The device may be used to capture text when it is out of contact with other parts of the system. A very simple device may simply be able to store the image or audio data associated with the capture, ideally with a timestamp indicating when it was captured. The various captures may be uploaded to the rest of the system when the device is next in contact with it, and handled then. The device may also upload other data associated with the captures, for example voice annotations associated with optical scans, or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some embodiments, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a fully connected system where live feedback is being provided to the user, the system is only able to use past captures when processing the current one. If the capture is one of a batch stored by the device when offline, however, the system will be able to take into account any data available from later captures as well as earlier ones when doing its analysis.

12.2. On a Host Device

A scanner will often communicate with some other device, such as a PC, PDA, phone or digital camera to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.

- The details of the capture may be stored in the user's history. (Section 6.1)
- The document may be retrieved from local storage or a remote location. (Section 8)
- The operating system's metadata and other records associated with the document may be updated. (Section 11.1)
- Markup associated with the document may be examined to determine the next relevant operations. (Section 5)
- A software application may be started to edit, view or otherwise operate on the document. The choice of application may depend on the source document, or on the contents of the scan, or on some other aspect of the capture. (Section 11.2.2, 11.2.3)
- The application may scroll to, highlight, move the insertion point to, or otherwise indicate the location of the capture. (Section 11.3)
- The precise bounds of the captured text may be modified, for example to select whole words, sentences or paragraphs around the captured text. (Section 11.3.2)
- The user may be given the option to copy the capture text to the clipboard or perform other standard operating system or application-specific operations upon it.
- Annotations may be associated with the document or the captured text. These may come from immediate user input, or may have been captured earlier, for example in the case of voice annotations associated with an optical scan. (Section 19.4)
- Markup may be examined to determine a set of further possible operations for the user to select

12.2.2. Contextual Pomp Menus

Sometimes the appropriate action to be taken by the system will be obvious, but sometimes it will require a choice to be made by the user. One good way to do this is through the use of "popup menus" or, in cases where the content is also being displayed on a screen, with so-called "contextual menus" that appear close to the content. (See Section 11.3.3). In some embodiments, the scanner device projects a popup menu onto the paper document. A user may select from such menus using traditional methods such as a keyboard and mouse, or by using controls on the capture device (Section 12.1.2), gestures (Section 12.1.3), or by interacting with the computer display using the scanner (Section 12.2.4). In some embodiments, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some embodiments, the system provides a real-time display of the documents or the locations found, for example in list, thumbnail-image or text-segment form, and for the number of elements in that display to reduce in number as capture continues. In some embodiments, the system displays thumbnails of all candidate documents, where the size or position of the thumbnail is dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Scanning from Screen

Some optical scanners may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. It can be inconvenient for the user to put down the scanner and start using the mouse or keyboard. Other sections have described physical controls on the scanner (Section 12.1.2) or gestures (Section 12.1.3) as methods of input which do not require this change of tool, but using the scanner on the screen itself to scan some text or symbol is an important alternative provided by the system.

In some embodiments, the optics of the scanner allow it to be used in a similar manner to a light-pen, directly sensing its position on the screen without the need for actual scanning of text, possibly with the aid of special hardware or software on the computer.

13. Context Interpretation

An important aspect of the described system is the use of other factors, beyond the simple capture of a string of text, to help identify the document in use. A capture of a modest amount of text may often identify the document uniquely, but in many situations it will identify a few candidate documents. One solution is to prompt the user to confirm the document being scanned, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context," and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two scans, it is more likely that they are from different documents.

Also useful are the user's longer-term capture history and reading habits. These can also be used to develop a model of the user's interests and associations.

13.2. User's Real-world Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently scanned are all examples of further factors which can be beneficial in the search process. The system brings the possibility of Google-type page-ranking to the world of paper.

See also Section 4.2.2 for some other implications of the use of context for search engines.

14. Data-stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the users interests and activities. This can be useful on an abstract statistical basis —"35% of users who buy this newspaper also read the latest book by that author"—but it can also allow other interactions with the individual user, as discussed below.

14.3.1. Social Networking

One example is connecting one user with others who have related interests. These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on other Aspects of the Data-stream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club.

14.5. Types of Data that may be Captured

In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group.

15. Device Features and Functions

A capture device for use with the system needs little more than a way of capturing text from a rendered version of the document. As described earlier (Section 1.2), this capture may be achieved through a variety of methods including taking a photograph of part of the document or typing some words into a mobile phone keypad. This capture may be achieved using a small hand-held optical scanner capable of recording a line or two of text at a time, or an audio capture device such as a voice-recorder into which the user is reading text from the document. The device used may be a combination of these—an optical scanner which could also record voice annotations, for example—and the capturing functionality may be built into some other device such as a mobile phone, PDA, digital camera or portable music player.

15.1. Input and Output

Many of the possibly beneficial additional input and output facilities for such a device have been described in Section 12.1. They include buttons, scroll-wheels and touch-pads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some embodiments, the device implements the majority of the system itself. In some embodiments, however, it often communicates with a PC or other computing device and with the wider world using communications facilities.

Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a scan, for example, when the scan cannot be recognized by the OCR process.

To illustrate some of the range of options available, both a rather minimal optical scanning device and then a much more full-featured one are described below. Many devices occupy a middle ground between the two.

15.3.1. The SimpleScanner—a Low-end Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The SuperScanner—a High-end Offline Example

The SuperScanner also depends on connectivity for its full operation, but it has a significant amount of on-board storage and processing which can help it make better judgments about the data captured while offline.

As it moves along the line of text, the captured pixels are stitched together and passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the scanner is a list of words and phrases with the typical frequency of their use—this may be combined with the dictionary. The scanner can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the device, as are the indices for the books the user has recently purchased from an online bookseller, or from which the user has scanned anything within the last few months. Lastly, the titles of several thousand of the most popular publications which have data available for the system are stored so that, in the absence of other information the user can scan the title and have a good idea as to whether or not captures from a particular work are likely to be retrievable in electronic form later.

During the scanning process, the system informs user that the captured data has been of sufficient quality and of a sufficient nature to make it probable that the electronic copy can be retrieved when connectivity is restored. Often the system indicates to the user that the scan is known to have been successful and that the context has been recognized in one of the on-board indices, or that the publication concerned is known to be making its data available to the system, so the later retrieval ought to be successful.

The SuperScanner docks in a cradle connected to a PC's Firewire or USB port, at which point, in addition to the upload of captured data, its various onboard indices and other databases are updated based on recent user activity and new publications. It also has the facility to connect to wireless public networks or to communicate via Bluetooth to a mobile phone and thence with the public network when such facilities are available.

15.4. Features for Optical Scanning

We now consider some of the features that may be particularly desirable in an optical scanner device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Scanners based on camera-type optics that operate at a distance from the paper may similarly be useful in some circumstances.

Some embodiments of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some embodiments, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some embodiments of the device will provide feedback to the user during the scanning process which will indicate through the use of light, sound or tactile feedback when the user is scanning too fast, too slow, too unevenly or is drifting too high or low on the scanned line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of an optical scanner, for example, the scanning head may also be able to read a fingerprint. For a voice recorder, the voice pattern of the user may be used.

15.6. Device Associations

In some embodiments, the device is able to form an association with other nearby devices to increase either its own or their functionality. In some embodiments, for example, it uses the display of a nearby PC or phone to give more detailed feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the scanning facilities of the device to scan a code or symbol displayed on a particular area of the terminal's screen and so effect a key transfer. An analogous process may be performed using audio signals picked up by a voice-recording device.

15.7. Integration with other Devices

In some embodiments, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:
- an existing peripheral such as a mouse, a stylus, a USB "webcam" camera, a Bluetooth™ headset or a remote control
- another processing/storage device, such as a PDA, an MP3 player, a voice recorder, a digital camera or a mobile phone
- other often-carried items, just for convenience—a watch, a piece of jewelry, a pen, a car key fob

15.7.1. Mobile Phone Integration

As an example of the benefits of integration, we consider the use of a modified mobile phone as the capture device.

In some embodiments, the phone hardware is not modified to support the system, such as where the text capture can be adequately done through voice recognition, where they can either be processed by the phone itself, or handled by a system at the other end of a telephone call, or stored in the phone's memory for future processing. Many modern phones have the ability to download software that could implement some parts of the system. Such voice capture is likely to be suboptimal in many situations, however, for example when there is substantial background noise, and accurate voice recognition is a difficult task at the best of times. The audio facilities may best be used to capture voice annotations.

In some embodiments, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone.

In some embodiments, the phone is modified to add dedicated capture facilities, or to provide such functionality in a clip-on adapter or a separate Bluetooth-connected peripheral in communication with the phone. Whatever the nature of the capture mechanism, the integration with a modern cellphone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Most significantly of all, they are a device that most users are already carrying.

Part III—Example Applications of the System

This section lists example uses of the system and applications that may be built on it. This list is intended to be purely illustrative and in no sense exhaustive.

16. Personal Applications

16.1. Life Library

The Life Library (see also Section 6.1.1) is a digital archive of any important documents that the subscriber wishes to save and is a set of embodiments of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his life library by scanning information from the document or by otherwise indicating to the system that the particular document is to be added to the subscriber's Life Library. The scanned information is typically text from the document but can also be a barcode or other code identifying the document. The system accepts the code and uses it to identify the source document. After the document is identified the system can store either a copy of the document in the user's Life Library or a link to a source where the document may be obtained.

One embodiment of the Life Library system can check whether the subscriber is authorized to obtain the electronic copy. For example, if a reader scans text or an identifier from a copy of an article in the New York Times (NYT) so that the article will be added to the reader's Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some embodiments, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customers credit card for the purchase. The Life Library service provider would get a percentage of the purchase price or a small fixed fee for facilitating the transaction.

The system can archive the document in the subscribers personal library and/or any other library to which the subscriber has archival privileges. For example, as a user scans text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The life library can be organized in many ways: chronologically, by topic, by level of the subscribers interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various embodiments, annotations may be inserted directly into the document or may be maintained in a separate file. For example, when a subscriber scans text from a newspaper article, the article is archived in his Life Library with the scanned text highlighted. Alternatively, the article is archived in his Life Library along with an associated annotation file (thus leaving the archived document unmodified). Embodiments of the system can keep a copy of the source document in each subscribers library, a copy in a master library that many subscribers can access, or link to a copy held by the publisher.

In some embodiments, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some embodiments, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some embodiments, the Life Library system can store excerpts from documents. For example, when a subscriber scans text from a paper document, the regions around the scanned text are excerpted and placed in the Life Library, rather than the entire document being archived in the life library. This is especially advantageous when the document is long because preserving the circumstances of the original scan prevents the subscriber from re-reading the document to find the interesting portions. Of course, a hyperlink to the entire electronic counterpart of the paper document can be included with the excerpt materials.

In some embodiments, the system also stores information about the document in the Life Library, such as author, publication title, publication date, publisher: copyright holder (or copyright holder's licensing agent), ISBN, links to public annotations of the document, readrank, etc. Some of this additional information about the document is a form of paper document metadata. Third parties may create public annotation files for access by persons other than themselves, such the general public. Linking to a third party's commentary on a document is advantageous because reading annotation files of other users enhances the subscriber's understanding of the document.

In some embodiments, the system archives materials by class. This feature allows a Life Library subscriber to quickly store electronic counterparts to an entire class of paper documents without access to each paper document. For example, when the subscriber scans some text from a copy of National Geographic magazine, the system provides the subscriber with the option to archive all back issues of the National Geographic. If the subscriber elects to, archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

A variation on, or enhancement of, the Life Library concept is the "Life Saver," where the system uses the text captured by a user to deduce more about their other activities. The scanning of a menu from a particular restaurant, a program from a particular theater performance, a timetable at a particular railway station, or an article from a local newspaper allows the system to make deductions about the user's location and social activities, and could construct an automatic diary for them, for example as a website. The user would be able to edit and modify the diary, add additional materials such as photographs and, of course, look again at the items scanned.

17. Academic Applications

Portable scanners supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of embodiments of this system. The child uses a portable scanner that communicates with other elements of the literacy acquisition system. In addition to the portable scanner, the literacy acquisition system includes a computer having a display and speakers, and a database accessible by the computer. The scanner is coupled with the computer (hardwired, short range RF, etc.). When the child sees an unknown word in the book, the child scans it with the scanner. In one embodiment, the literacy acquisition system compares the scanned text with the resources in its database to identify the word. The database includes a dictionary, thesaurus, and/or multimedia files (e.g., sound, graphics, etc.). After the word has been identified, the system uses the computer speakers to pronounce the word and its definition to the child. In another embodiment, the word and its definition are displayed by the literacy acquisition system on the computer's monitor. Multimedia files about the scanned word can also be played through the computer's monitor and speakers. For example, if a child reading "Goldilocks and the Three Bears" scanned the word "bear," the system might pronounce the word "bear" and play a short video about bears on the computer's monitor. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some embodiments, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some embodiments, the personal dictionary entries include audio files to assist with proper word pronunciation and information identifying the paper document from which the word was scanned.

In some embodiments, the system creates customized spelling and vocabulary tests for students. For example, as a student reads an assignment, the student may scan unfamiliar words with the portable scanner. The system stores a list of all the words that the student has scanned. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The same scanning device discussed for capturing text in this system can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by scanning text from student papers and submitting the scanned text to the system. For example, a teacher who wishes to verify that a quote in a student paper came from the source that the student cited can scan a portion of the quote and compare the title of the document identified by the system with the title of the document cited by the student. Likewise, the system can use scans of text from assignments submitted as the student's original work to reveal if the text was instead copied.

17.5. Enhanced Textbook

In some embodiments, capturing text from an academic textbook links students or staff to more detailed explanations, further exercises, student and staff discussions about the material, related example past exam questions, further reading on the subject, recordings of the lectures on the subject, and so forth. (See also Section 7.1.)

17.6. Language Learning

In some embodiments, the system is used to teach foreign languages. Scanning a Spanish word, for example, might cause the word to be read aloud in Spanish along with its definition in English.

The system provides immediate auditory and/or visual information to enhance the new language acquisition process.

The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information.

Reader interaction with a paper document, such as a newspaper or book, is monitored by a language skills system. The reader has a portable scanner that communicates with the language skills system. In some embodiments, the language skills system includes a computer having a display and speakers, and a database accessible by the computer. The scanner communicates with the computer (hardwired, short range RF, etc.). When the reader sees an unknown word in an article, the reader scans it with the scanner. The database includes a foreign language dictionary, thesaurus, and/or multimedia files (sound, graphics, etc.). In one embodiment, the system compares the scanned text with the resources in its database to identify the scanned word. After the word has been identified, the system uses the computer speakers to pronounce the word and its definition to the reader. In some embodiments, the word and its definition are both displayed on the computer's monitor. Multimedia files about grammar tips related to the scanned word can also be played through the computer's monitor and speakers. For example, if the words "to speak" are scanned, the system might pronounce the word "hablar," play a short audio clip that demonstrates the proper Spanish pronunciation, and display a complete list of the various conjugations of "hablar." In this way, the student learns to pronounce the written word, is visually taught the spelling of the word via the multimedia presentation, and learns how to conjugate the verb. The system can also present grammar tips about the proper usage of "hablar" along with common phrases.

In some embodiments, the user scans a word or short phrase from a rendered document in a language other than the user's native language (or some other language that the user knows reasonably well). In some embodiments, the system maintains a prioritized list of the user's "preferred" languages. The system identifies the electronic counterpart of the rendered document, and determines the location of the scan within the document. The system also identifies a second electronic counterpart of the document that has been translated into one of the user's preferred languages, and determines the location in the translated document corresponding to the location of the scan in the original document. When the corresponding location is not known precisely, the system identifies a small region (e.g., a paragraph) that includes the corresponding location of the scanned location. The corresponding translated location is then presented to the user. This provides the user with a precise translation of the particular usage at the scanned location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of scanning a short phrase in any piece of material, and could also create a bibliography suitable for insertion into a publication on the subject.

18. Commercial Applications

Obviously, commercial activities could be made out of almost any process discussed in this document, but here we concentrate on a few obvious revenue streams.

18.1. Fee-based Searching and Indexing

Conventional Internet search engines typically provide free search of electronic documents, and also make no charge to the content providers for including their content in the index. In some embodiments, the system provides for charges to users and/or payments to search engines and/or content providers in connection with the operation and use of the system.

In some embodiments, subscribers to the system's services pay a fee for searches originating from scans of paper documents. For example, a stockbroker may be reading a Wall Street Journal article about a new product offered by Company X. By scanning the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one embodiment, the system chooses a most preferred content provider based on additional context about the provider (the context being, in this case, that the content provider has paid a fee to be moved up the results list). In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the portable scanner so it provides the index (or a pointer to the index) to the service provider, which in turn searches the law firm's index when employees or clients of the law firm submit paper-scanned search terms via their portable scanners. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from the scanner users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some embodiments, the system service provider receives revenue for all purchases that the subscriber made from the content provider, either for some predetermined period of time or at any subsequent time when a purchase of an identified product is made.

18.2. Catalogs

Consumers may use the portable scanner to make purchases from paper catalogs. The subscriber scans information from the catalog that identifies the catalog. This information is text from the catalog, a bar code, or another identifier of the catalog. The subscriber scans information identifying the products that s/he wishes to purchase. The catalog mailing label may contain a customer identification number that identifies the customer to the catalog vendor. If so, the subscriber can also scan this customer identification number. The system acts as an intermediary between the subscriber and the vendor to facilitate the catalog purchase by providing the customers selection and customer identification number to the vendor.

18.3. Coupons

A consumer scans paper coupons and saves an electronic copy of the coupon in the scanner, or in a remote device such as a computer, for later retrieval and use. An advantage of electronic storage is that the consumer is freed from the burden of carrying paper coupons. A further advantage is that the electronic coupons may be retrieved from any location. In some embodiments, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

19. General Applications

19.1. Forms

The system may be used to auto-populate an electronic document that corresponds to a paper form. A user scans in some text or a barcode that uniquely identifies the paper form. The scanner communicates the identity of the form and information identifying the user to a nearby computer. The nearby computer has an Internet connection. The nearby computer can access a first database of forms and a second database having information about the user of the scanner (such as a service providers subscriber information database). The nearby computer accesses an electronic version of the paper form from the first database and auto-populates the fields of the form from the users information obtained from the second database. The nearby computer then emails the completed form to the intended recipient. Alternatively, the computer could print the completed form on a nearby printer.

Rather than access an external database, in some embodiments, the system has a portable scanner that contains the users information, such as in an identity module, SIM, or security card. The scanner provides information identifying the form to the nearby PC. The nearby PC accesses the electronic form and queries the scanner for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and scans various parts of the document, the system will make the appropriate annotations or edits to an electronic counterpart of the paper document. For example, if the editor scans a portion of text and makes the "new paragraph" control gesture with the scanner, a computer in communication with the scanner would insert a "new paragraph" break at the location of the scanned text in the electronic copy of the document.

19.4. Voice Annotation

A user can make voice annotations to a document by scanning a portion of text from the document and then making a voice recording that is associated with the scanned text. In some embodiments, the scanner has a microphone to record the user's verbal annotations. After the verbal annotations are recorded, the system identifies the document from which the text was scanned, locates the scanned text within the document, and attaches the voice annotation at that point. In some embodiments, the system converts the speech to text and attaches the annotation as a textual comment.

In some embodiments, the system keeps annotations separate from the document, with only a reference to the annotation kept with the document. The annotations then become an annotation markup layer to the document for a specific subscriber or group of users.

In some embodiments, for each capture and associated annotation, the system identifies the document, opens it using a software package, scrolls to the location of the scan and plays the voice annotation. The user can then interact with a document while referring to voice annotations, suggested changes or other comments recorded either by themselves or by somebody else.

19.5. Help in Text

The described system can be used to enhance paper documents with electronic help menus. In some embodiments, a markup layer associated with a paper document contains help menu information for the document. For example, when a user scans text from a certain portion of the document, the system checks the markup associated with the document and presents a help menu to the user. The help menu is presented on a display on the scanner or on an associated nearby display.

19.6. Use with Displays

In some situations, it is advantageous to be able to scan information from a television, computer monitor, or other similar display. In some embodiments, the portable scanner is used to scan information from computer monitors and televisions. In some embodiments, the portable optical scanner has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session IDs

One use of the direct scanning of displays is the association of devices as described in Section 15.6. For example, in some embodiments, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber scans in the session ID displayed on the kiosk; by scanning the session ID, the user tells the system that he wishes to temporarily associate the kiosk with his scanner for the delivery of content resulting from scans of printed documents or from the kiosk screen itself. The scanner may communicate the Session ID and other information authenticating the scanner (such as a serial number, account number, or other identifying information) directly to the system. For example, the scanner can communicate directly (where "directly" means without passing the message through the kiosk) with the system by sending the session initiation message through the user's cell phone (which is paired with the user's scanner via Bluetooth™). Alternatively, the scanner can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a scanner during the period (or session) in which the device is associated with the scanner. This feature is useful to prevent others from using a public kiosk before another person's session has ended. As an example of this concept related to use of a computer at an Internet café, the user scans a barcode on a monitor of a PC which s/he desires to use; in response, the system sends a session ID to the monitor that it displays; the user initiates the session by scanning the session ID from the monitor (or entering it via a keypad or touch screen or microphone on the portable scanner); and the system associates in its databases the session ID with the serial number (or other identifier that uniquely identifies the user's scanner) of his/her scanner so another scanner cannot scan the session ID and use the monitor during his/her session. The scanner is in communication (through wireless link such as Bluetooth™, a hardwired link such as a docking station, etc.) with a PC associated with the monitor or is in direct (i.e., w/o going through the PC) communication with the system via another means such as a cellular phone, etc.

Part IV—System Details

One embodiment of a disclosed invention includes a user-friendly technique for ordering items from rendered documents (such as paper catalogs, advertisements, books, magazines, newspaper, flyers, signs and the like) using an optical capture device (such as a scanner, digital camera, cellular telephone camera, or other device capable of optically capturing at least a portion of the rendered document).

Another embodiment of a disclosed invention includes a user-friendly technique for ordering items from rendered documents (such as paper catalogs, advertisements, books, magazines, newspaper, flyers, signs and the like) using a voice capture device (such as voice recorder, cellular telephone, or other device capable of capturing at least a portion of the rendered document via voice input).

Whenever in this disclosure we refer to capturing or optically capturing data from a rendered document, it should be understood that some embodiments of this includes capturing the data by means of voice capture technology. Similarly, whenever in this disclosure we refer to an image or to image data, it should be understood that where appropriate this may be a voice image, for example a recording of the user's voice.

One embodiment of a disclosed invention is a method of placing an order for an item from a rendered document. The rendered document contains at least one human-readable indication of an orderable item. The method includes obtaining a captured fragment of the rendered document and communicating a representation of the captured fragment along with an identifier to a remote computer to order the item from a vendor via the Internet This embodiment may further include using a document or data capture context to search for an electronic version of the rendered document.

Another embodiment discloses a method of ordering an item from a rendered document, the method including establishing a document context of the rendered document; capturing a human-readable document fragment of the rendered document; and generating an order for the item. The order includes at least the document context, a representation of the document fragment and an identifier associated with a purchaser.

Figure 4:
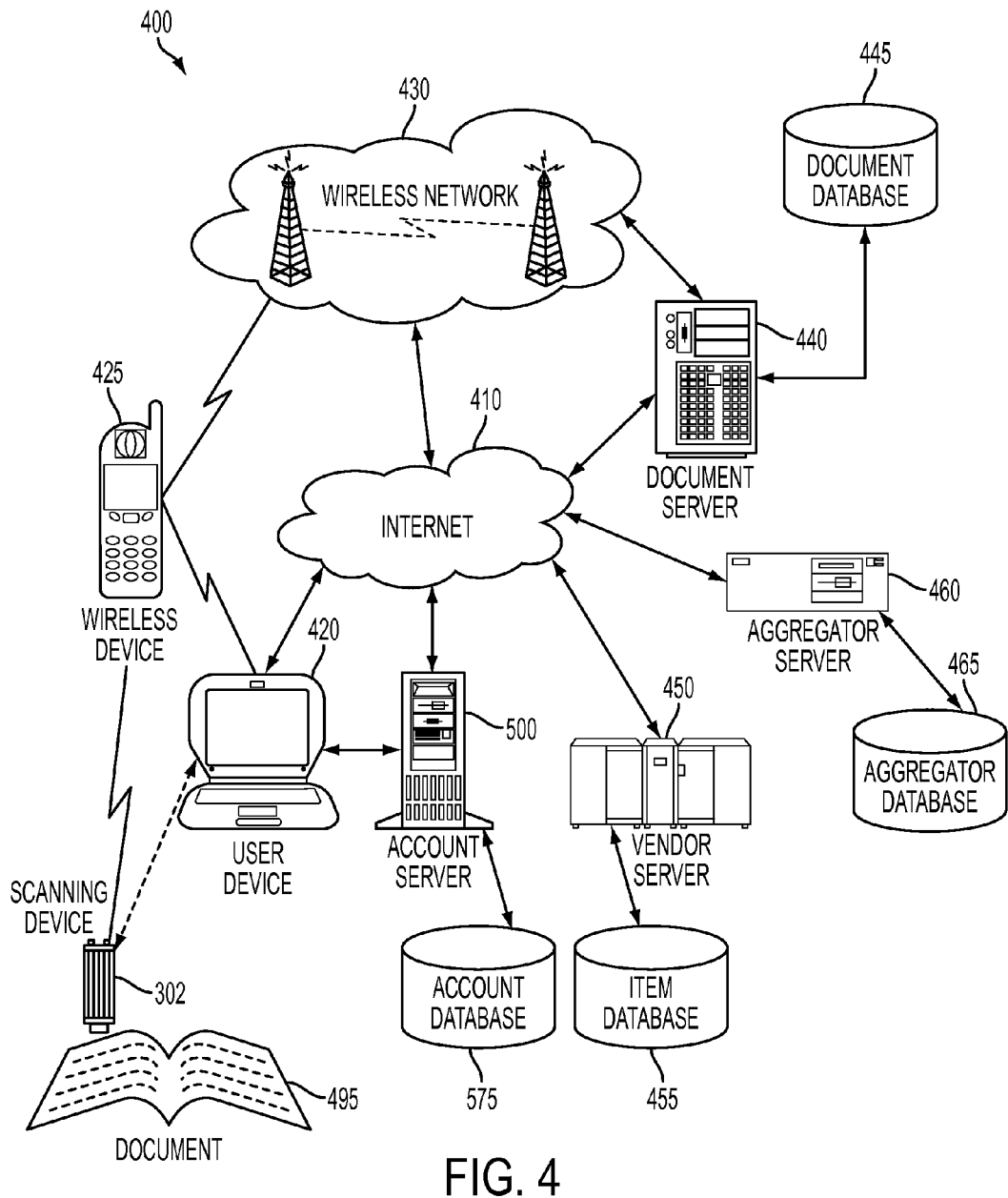
FIG. 4 illustrates a system view of an example operating environment suitable for use to practice the present invention, in accordance with one embodiment.

FIG. 4, is a system and operating environment according to the teachings of the present invention. As illustrated, example operating environment 400 includes a scanning device 302 (operative to graphically capture a portion of document 495), user device 420, wireless device 425, account server 500 (having an account database 575), document server 440 (having a document database 445), vendor server 450 (having an item database 455), aggregator server 460 (having an aggregator database 465), all interconnected via a network such as the Internet 410 or wireless network 430. Many of the devices in the environment are computers. One embodiment of a computer server has a memory containing computer executable instructions for processing an order request from a document capture device, the order request including an identifier, document context information, and a captured indication of an orderable item; identifying the orderable item from the captured indication and the document context; requesting fulfillment of the order request according to order fulfillment data associated with the identifier (e.g., user account data); and a processor to execute the computer executable instructions. In some embodiments, operating environment 400 may include more or less components. The devices of operating environment 400 may comprise a number of components.

Regardless of the manner in which the devices are coupled to each other, scanning device 302, user device 420, wireless device 425, account server 500, document server 440, vendor server 450 and aggregator server 460 may be operable in accordance with well-known commercial transaction and communication protocols. In some embodiments, the functions and capabilities of scanning device 302, user device 420 and wireless device 425 may be wholly or partially integrated into one device. Thus, the terms scanning device, user device and wireless device, could refer to the same device depending upon whether the device incorporates functions or capabilities of the scanning device 302, user device 420 and wireless device 425 roles.

Additionally, in various embodiments, user device 420 and account server 500 may be wholly or partially integrated. Thus, the terms user device and account server, as used herein, shall be interpreted with the meaning of an appropriately equipped device, operating in accordance with either a user device or an account server role.

Figure 5:
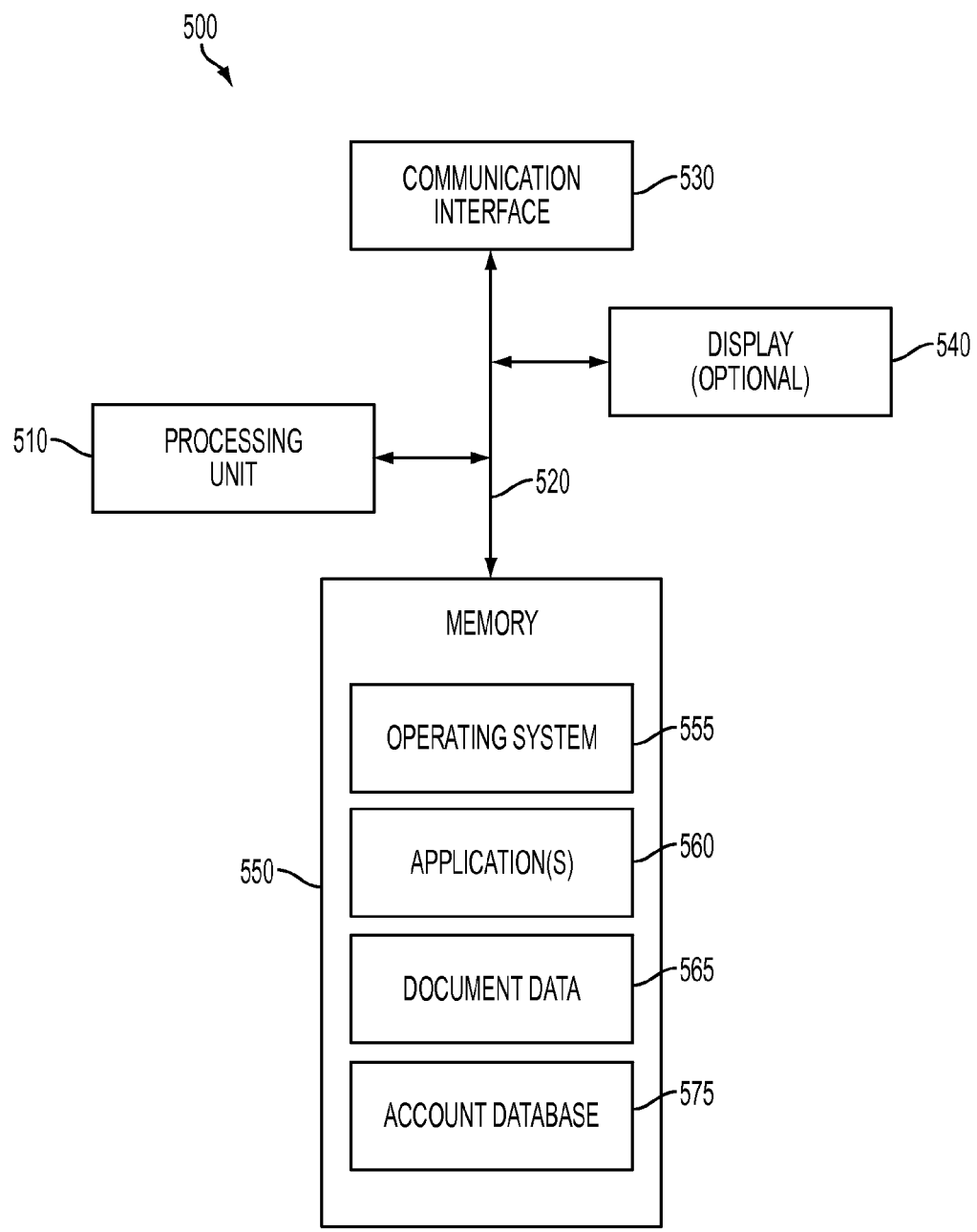
FIG. 5 illustrates an architectural view of a device suitable for use as an account server, in accordance with one embodiment.

FIG. 5 illustrates an exemplary account server 500 suitable for use in an embodiment of the present invention. In alternative embodiments, the account server 500 may include many more components (or fewer) than those shown in FIG. 5. However, it is not necessary that all of these generally conventional computing components be shown in order to disclose an enabling embodiment for practicing the present invention. As shown in FIG. 5, the account server 500 includes a communications interface 530, which, in some embodiments of the present invention, may be a Network Interface Controller ("NIC"). The inter-device communications of the communications interface 530 may be designed to support a local area network, wide area network, personal area network, telephone network, power line network, serial bus or wireless (e.g., Bluetooth™, IEEE 802.11 or 802.16 and the like) connection. Such a communications interface 530 would also include the necessary circuitry, driver(s) and/or transceiver for such a connection and would be constructed for use with the appropriate transmission protocols for such connections.

The account server 500 also includes a processing unit 510, an optional display 540 and a memory 550, all interconnected along with the communications interface 530 via a bus 520. The memory 550 typically comprises RAM, ROM and a permanent mass storage device, such as a disk drive, flash RAM or the like. The memory 550 stores an operating system 555, one or more applications 560, document data 565 and an account database 575. In some embodiments, bus 520 may be a hierarchy of bridged buses. For ease of understanding, operating system 555, one or more applications 560, document data and an account database 575 are illustrated as separate software components; however in some embodiments they may be comprised of multiple software components, implemented in hardware, or may be subparts of one or more integrated software components.

In some embodiments, the account database 575 contains account information for users of scanner devices 302. The account server 500 uses the account database 575 to correlate operations of a particular scanning device 302 with its associated account information stored in the account database 575.

It will be appreciated that the software components may be loaded from a computer readable medium into memory 550 of the account server 500 using a mechanism (not shown) associated with the computer readable medium such as a floppy, tape, DVD (Digital Versatile Disk)/CD (Compact Disk)-ROM drive, flash RAM or communications interface 530. In some embodiments, the loading may be performed during the manufacturing of device 500, or in the field. In some embodiments, the software components may be downloaded from one or more networked servers.

In various embodiments, the communications interface 530 may facilitate the connection of remote devices to the account server 500. For example, remote devices can include devices for reading and/or writing in machine-readable media, digital cameras, printers and the like. Various user input mechanisms may also be coupled to the account server 500, such as, for example, keyboards, keypads, touch-pads, mice and the like (not shown).

In some embodiments, a computer, such as account server 500 or user device 420, includes a memory containing computer executable instructions for processing an order request from a document capture device 302. The computer has a processor coupled to the memory operative to execute the computer executable instructions. The order request includes an identifier, document context information, and a captured indication of an orderable item. The computer identifies the orderable item from the captured indication of the orderable item and the document context. Then the computer requests fulfillment of the order in accordance with fulfillment data associated with the identifier.

In some embodiments, the scanning device 302 initiates an item ordering (purchase) transaction involving the account server 500 by scanning a portion of a rendered document 495.

Figure 6:
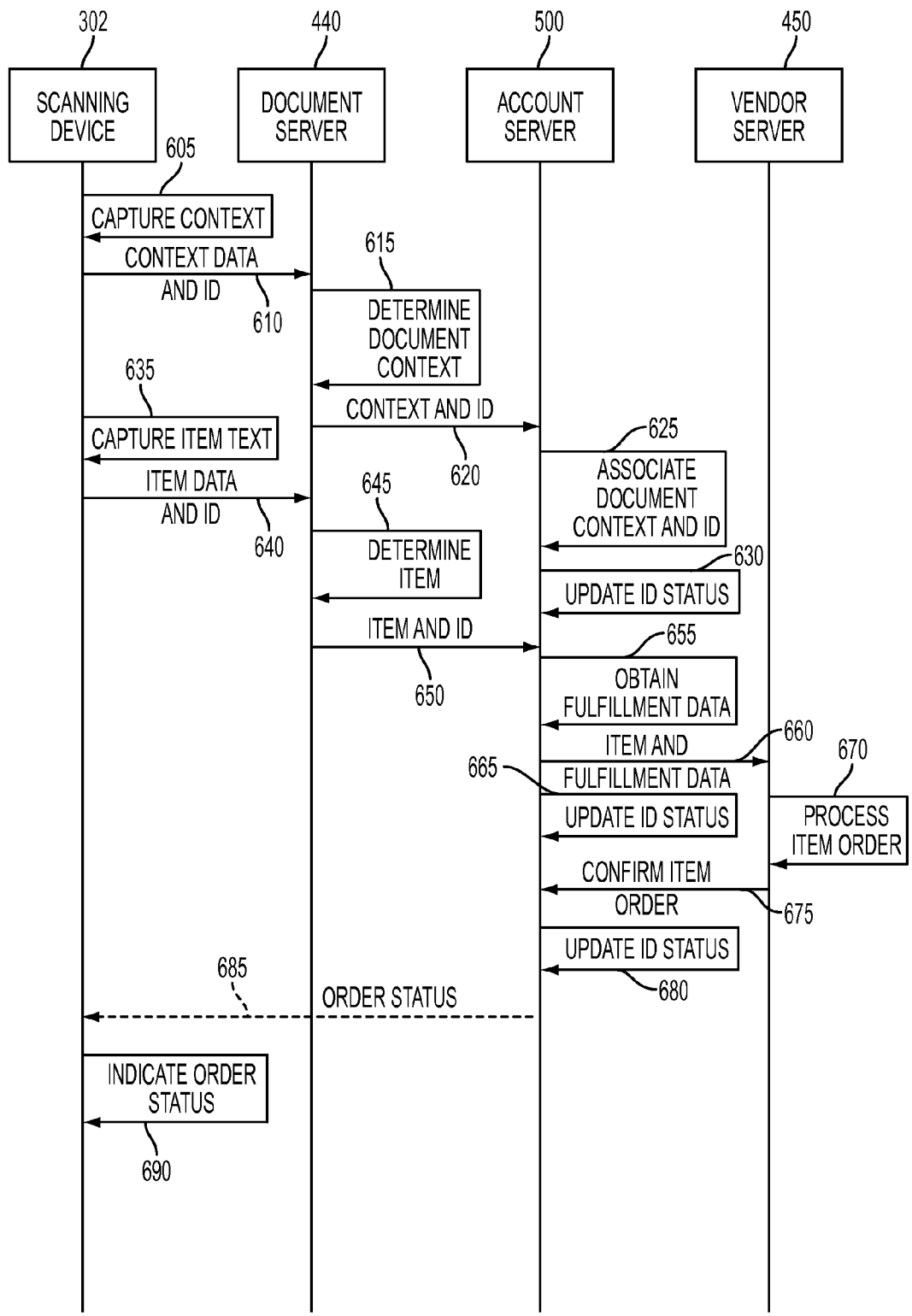
FIG. 6 illustrates an overview of the protocol and methods for the various devices to interact with the scanning device for ordering an item, in accordance with one embodiment.

FIG. 6 shows the flow of communications between a scanning device 302, account server 500 and a vendor server 450 during an item ordering transaction according to the device and system parameters of FIGS. 3-5. In the embodiment shown, scanned information is sent from the scanning device 302 to begin an item ordering transaction. The specific communications between the devices are described in more detail below.

In FIG. 6, the order transaction begins with a capture of a portion of a rendered document 495 to set a context 605. While some portion of the rendered document that is used to purchase an item includes human-readable information, in some embodiments, additional contextual information may be captured using machine-readable information such as barcode (1D, 2D, and/or multi-colored) information. Such barcode or other machine-readable information may also contain checksum information to verify captured human-readable portions of the rendered document. The context data (processed though an image processing routine in some embodiments) is sent 610 along with a device identifier (e.g., an identifier typically stored in the handheld device's memory 330 such as an ESN, network address, etc.) to the document server 440. The document server 440 processes the context data to determine 615 a document identifier.

A document identifier comprises information identifying an electronic counterpart of the rendered document that corresponds to the captured context data supplied by the scanning device 302. For example, if the scanning device 302 scans a magazine page, the document server 440 determines, from the scan, which issue of the magazine the scan came from and the location within the magazine where the scan occurred. If sufficient information was scanned, and no ambiguity exists, it may be possible to also identify an item to be ordered from the context scan. However, in some embodiments one or more additional scans are used to reduce ambiguity. Accordingly, if a context scan produces an ambiguous search result (more than one result matches the scan), then when item text is captured 635, the additional item data may be used by the document server 440 to remove further ambiguity.

After determining a document context 615, the document server 440 sends 620 the document context and the device identifier to the account server 500. The account server 500 associates 625 the document context with an account identified by the device identifier. The identifier's account status is updated 630 to indicate that the scanning device 302 is now "in" a particular document context.

Meanwhile, the scanning device 302 has captured 635 item text (or symbols) and sent 640 item data and device identifier to the document server 440. The document server 440 determines 645 which item has been scanned using the item data and the determined document context. The document server then forwards 650 the item information and the device identifier to the account server 500.

The account server 500 then begins the order request for the vendor server 450. Fulfillment data (e.g., payment and delivery data such as billing information and a delivery address) specific to the device identifier is obtained 655 from an associated account. The item information and the fulfillment data are then sent 660 to a vendor server 450 and the account server 500 updates 665 the status of the account associated with the device identifier. Meanwhile, the vendor server 450 processes 670 the item order and sends 675 an order confirmation to the account server 500. The account server 500 updates 680 the status of the account associated with the device identifier to indicate that the order was confirmed. Fulfillment data may include anything necessary to complete a transaction, including: a user identifier, customer identifier, a capture device identifier, a catalog identifier, a vendor identifier, an aggregation identifier, an account identifier and a payment method identifier.

A user of the scanning device 302 may optionally receive an order status update by the account server 500 communicating 685 the current status of the order to the scanning device 302 (or a related device, such as user device 420) to cause the scanning device 302 to indicate 690 a current order status. In one alternative embodiment, the user may access the order status by remotely accessing the account server 500 to view the order status without an indication on the scanning device 302.

In various embodiments, the communications described above and shown in FIG. 6 are merely one exemplary set of communications between the scanning device 302, document server 440, account server 500 and vendor server 450. Other communications, both more and fewer, may be employed in other embodiments. For example, in one alternative embodiment, the order process includes delivering a prepared electronic order to an account associated with the scanning device identifier at the account server 500 (and/or a separate e-mail address account). Such an embodiment would allow a user to review the electronic order before transmitting it to a vendor for fulfillment.

Similarly, while the order transactions are shown as occurring in a particular succession, they may occur in other sequences. Furthermore, there may be delays between steps (i.e., a step may not be performed immediately after the step which preceded it), especially when scanning device 302 is temporarily unable to communicate with the other elements of system 400. Asynchronous ("online/offline" or "delayed", see Section 17.3) communication allows use of some of the disclosed innovations even when the handheld devices are not connected to a network. In one "asynchronous" example, a user may capture a document fragment as a document context and may also capture a document fragment including a desired item, but not transmit the captured document fragments until a later point in time, perhaps when the communication link between scanner 302 and user device 420 is restored.

Various types of well-known communication and financial transaction protocols may be employed without limiting the scope of the disclosed inventions. In some embodiments, the order transaction communications are performed over connections using a HyperText Transfer Protocol ("HTTP") connection in communication with one or more Common Gateway Interface ("CGI") or other HTTP-accessible applications. In other embodiments, different transmission protocols and/or connections for order transactions may be employed. Some well-known financial transaction protocols are Financial Information Exchange Markup Language (FIXML), Open Financial Exchange (OFX), and VISA's™ Secure Electronic Transaction (SET).

In general, an order transaction contains the information necessary to identify the item being ordered and, optionally, the fulfillment information that allows a vendor to fulfill the order. This may be accomplished by a variety of different transaction models in accordance with various embodiments. In some embodiments, various types of identifiers (such a device identifier) may be used to distinguish transactions, devices and/or users. The type of transaction and related communications used during the transaction may determine the choice of the type of identifier used. The generation of the identifiers may follow industry standard practices, however, they should typically provide sufficient identification for billing and order fulfillment. One method for generating identifiers is to take a user name of the consumer and append a random number (e.g., "jim5435873934"). Another method is to generate a Globally Unique Identifier ("GUID"), using well-known algorithms. The location of identifier generation may be at any of a variety of devices in the operating environment 400, such as account server 500, scanning device 302, user device 420, wireless device 425 and the like. The appropriate identifier may be generated on demand or may be predetermined and associated with a particular device, as in device identifier 270.

Figure 7:
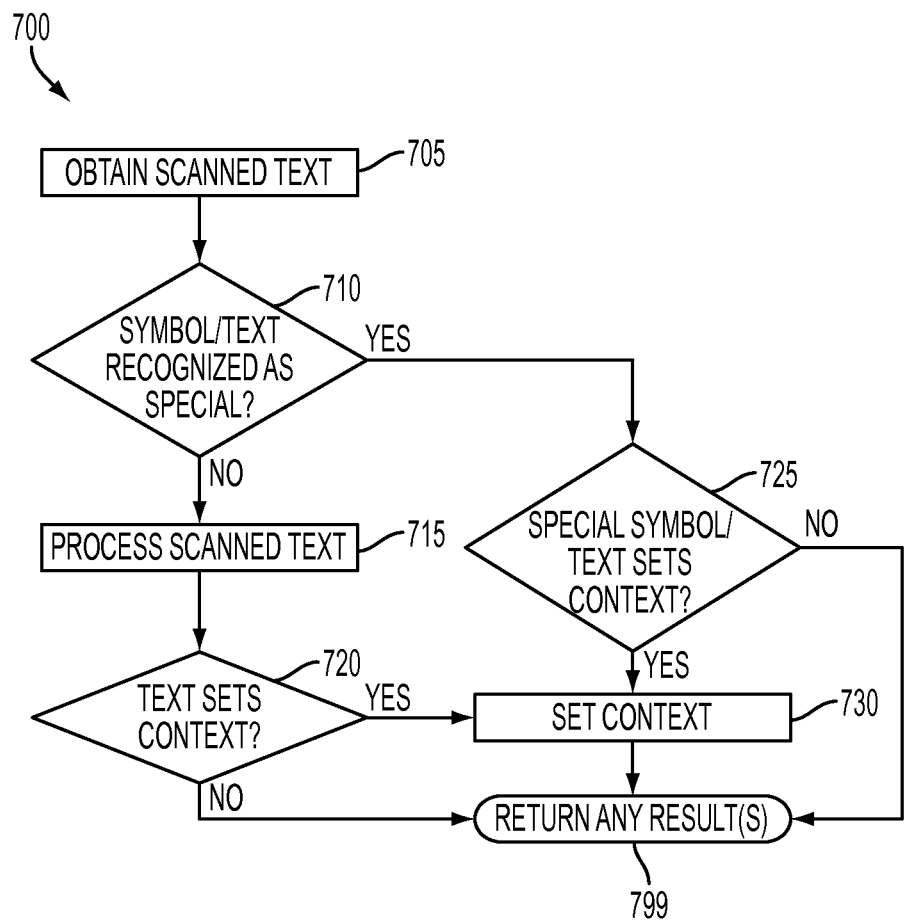
FIG. 7 illustrates the operational flow of relevant aspects of a process at the document server for determining a document context, in accordance with one embodiment.

FIG. 7 illustrates a process within the document server 440 for determining a context of the context scan from a scanning device 302 in accordance with the above-described communications between a scanning device 302, document server 440, account server 500 and a vendor server 450. The context determination process 700 begins at block 705 where captured text (or a representation thereof) is obtained. In decision block 710 a determination is made whether the scanned text (or symbol) is recognized as special (e.g., a template match indicated that a special context setting symbol, or specially arranged text, such as an ISBN number has been captured). If in decision block 710 it is determined that a special symbol or special text was scanned, then in decision block 725 a determination is made whether the special symbol and/or text has set a document context. If so, processing continues to block 730 where the document context is set. If, however, the special symbol and/or text do not set a context, processing ends at block 799, returning any found results from the text processing.

If, however, in decision block 710 no special symbol or text was recognized, processing continues to block 715 where the scanned text is processed. Next, in decision block 720 a determination is made whether the processed scanned text provides sufficient information to set a document context. If so, processing continues to block 730 where the document context is set. After which processing ends at block 799, returning the document context results. If however, no context was found in decision block 720, processing ends at block 799, returning any other results.

Figure 8:
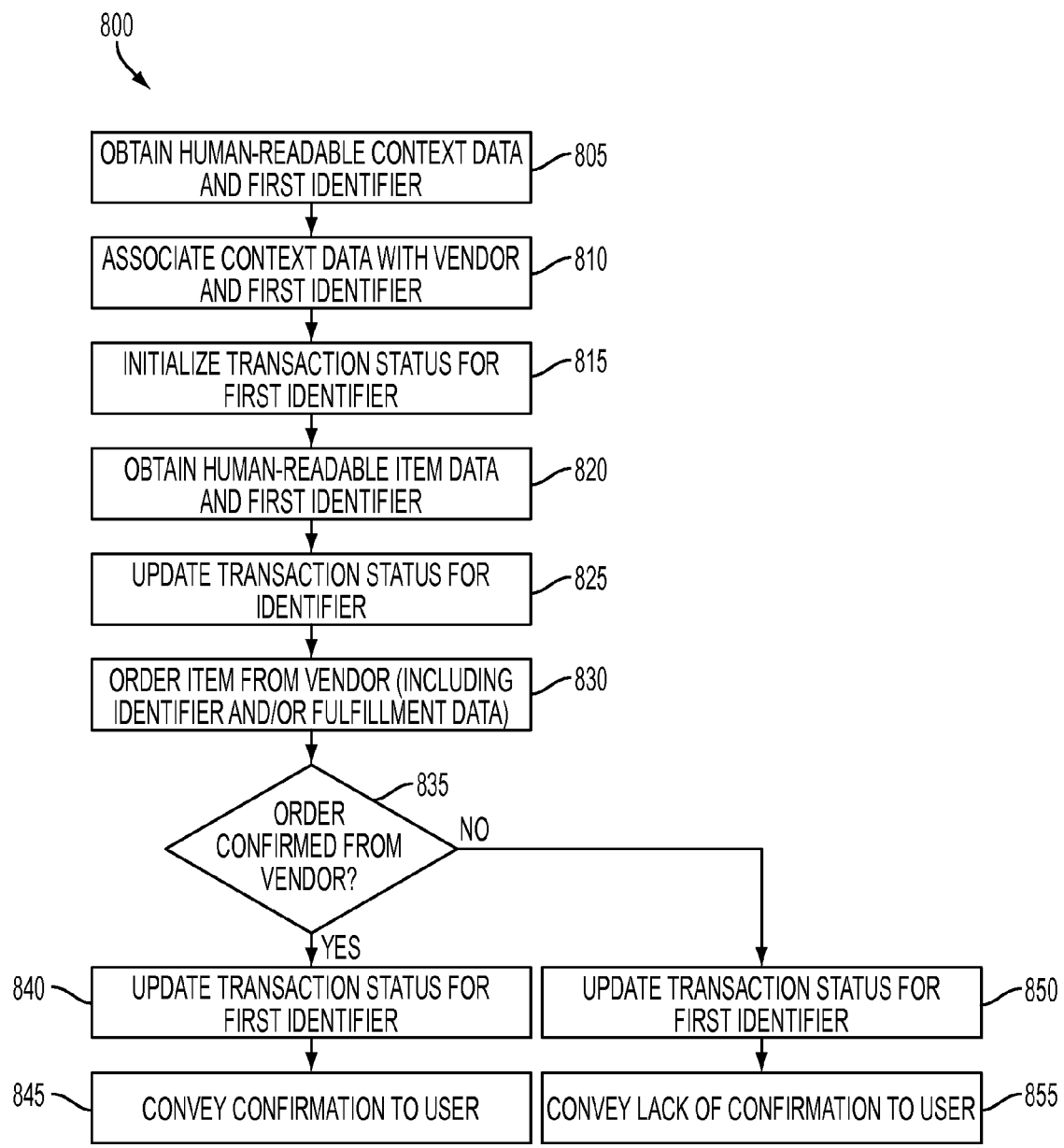
FIG. 8 illustrates the operational flow of relevant aspects of a process at the account server for an item order, in accordance with one embodiment.

FIG. 8 illustrates a process within the account server 500 for ordering an item from a vendor server 450 in accordance with the above-described communications between scanning device 302 and vendor server 450. The item ordering process 800 begins at block 805 where human-readable (as opposed to machine readable, such as from a barcode) context data is obtained, along with a first (transaction or user or device) identifier. Next, the context data and first identifier are associated with a vendor in block 810. The determination of a document context may provide an indication of where to obtain an electronic counterpart of a document, and hence may also give an indication of a vendor equipped to respond to an electronic transaction. In some embodiments a single vendor may be located, in block 810, while in alternative embodiments, multiple vendors may be located, and may utilize further selections to determine which vendor (and associated vender server 450) to use for an item order transaction.

A transaction status for the first identifier (e.g., in an associated account in account database 575) is updated in block 815 to indicate that at least one vendor is associated with an item order transaction. Next, in block 820 a human-readable indication of item data is obtained along with the first identifier. The transaction status for the first identifier is further updated in block 825 to indicate the item associated with the item order transaction. Furthermore, in embodiments with multiple vendors, providing the item data allows further refinement of the vendor selection process, e.g., by comparing prices, availability and other order fulfillment information.

In block 830, the item identified by the item data is ordered from a vendor. The order comprises at least an identifier (possibly, but not necessarily, the first identical transaction/user/device identifier noted above) and fulfillment information. In one exemplary embodiment, fulfillment information may already be resident at a vendor server 450, and accordingly the provision of an identifier may in and of itself provide sufficient information to enable the vendor to fulfill the order.

In decision block 835 a determination is made whether the vendor confirmed the item order. If so, processing proceeds to block 840, where the transaction status of the first identifier is updated to reflect a confirmed order for the item. In block 845, the item order confirmation is conveyed to a user. If, however, in decision block 835 a determination is made that the vendor did not confirm the item order, processing proceeds to block 850, where the transaction status of the first identifier is updated to reflect a failure to confirm the order for the item. In block 855, failure of the vendor to confirm the item order is conveyed to a user. Of course, reporting transaction status to the user is optional under some embodiments of the disclosed innovations.

Figure 9:
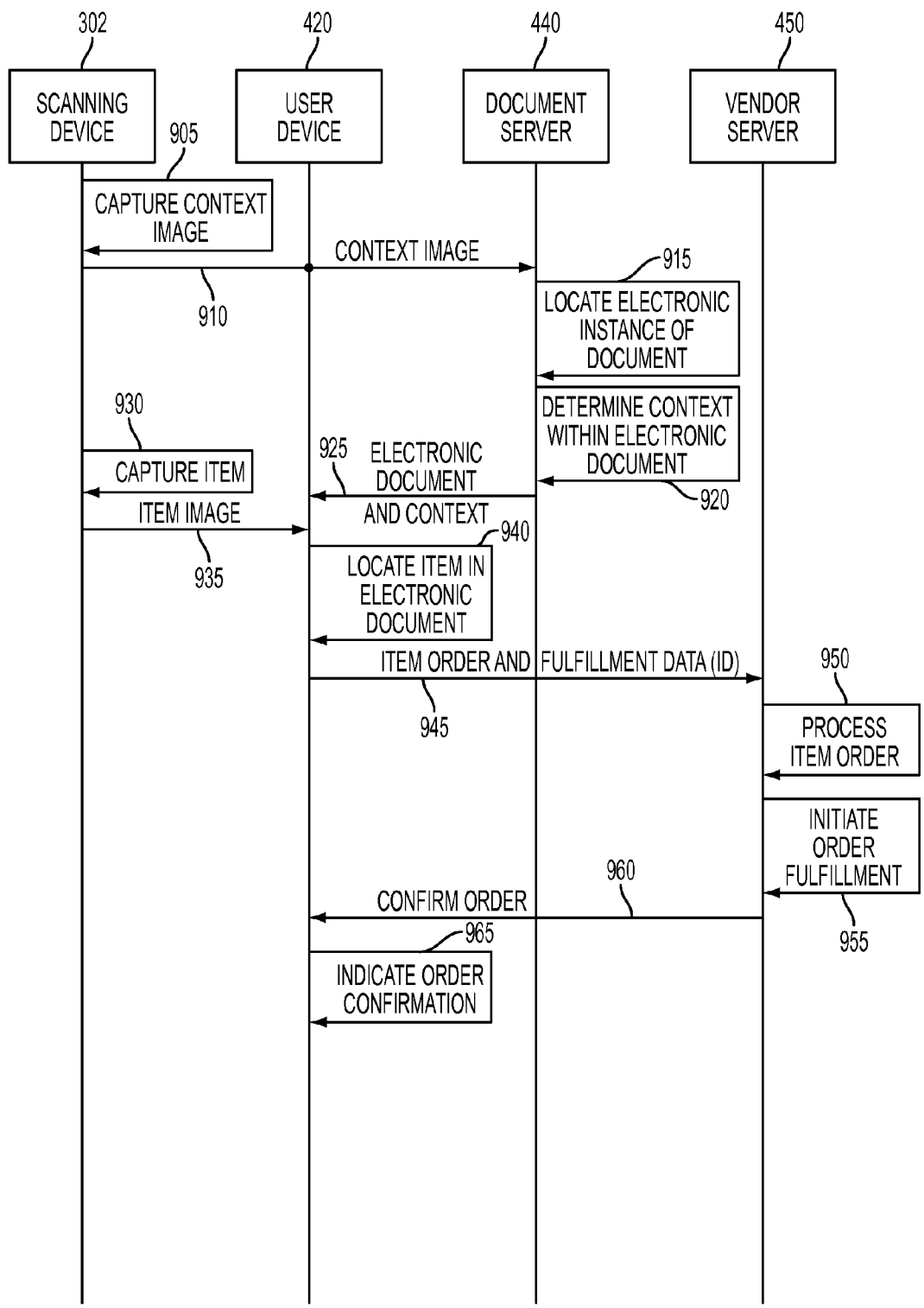
FIG. 9 illustrates an overview of the protocol and methods for the various devices to interact with the scanning device for ordering an item, in accordance with an alternative embodiment.
Figure 10:
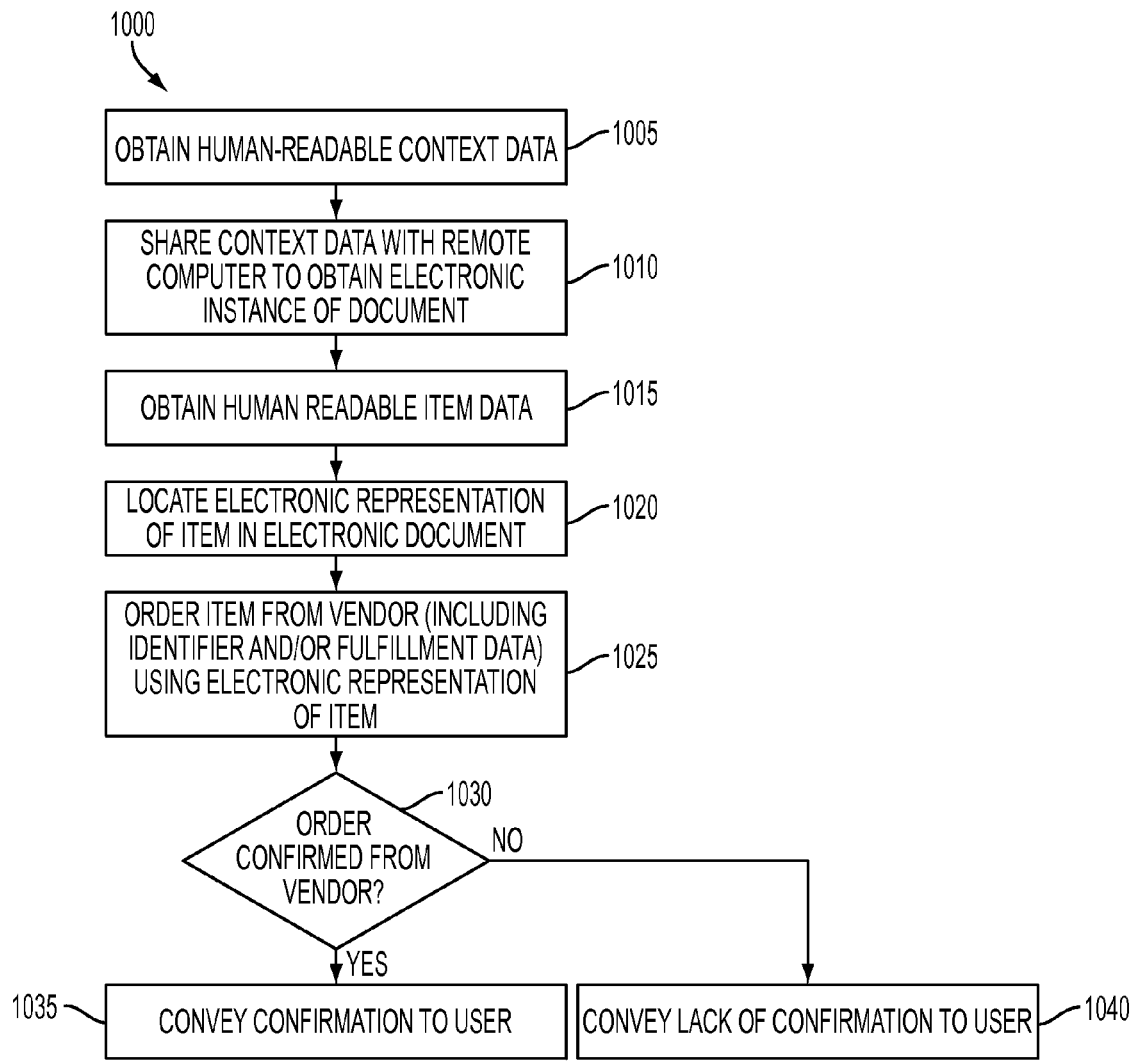
FIG. 10 illustrates the operational flow of relevant aspects of a process at the user device for an item order, in accordance with one embodiment

The embodiment illustrated in FIGS. 6-8 is one of a myriad of possible item ordering systems and methods employed by embodiments of the present invention. FIGS. 9-10 illustrate an alternative embodiment where a first identifier is not resident within the scanning device 302, rather, such an identifier is provided by an associated user device 420. FIGS. 9-10 additionally illustrate that various devices within the operating environment may, in different embodiments, reallocate processing of portions of item ordering transactions.

Accordingly, FIG. 9 illustrates a similar item ordering transaction to the one shown in FIG. 6, however between a scanning device 302, user device 420, document server 440 and vendor server 450. In FIG. 9, in like manner, the item ordering transaction begins with the scanning device 302 optically capturing 905 a portion of a rendered document for context data. The context data is sent 910 as an image to the document server 440 via the user device 420. Note that an identifier between the scanning device 302 and user device 420 is not necessary, as the scanning device and user device 420 may be closely coupled such that the user device 420 will know which scanning device provided the context image. The document server 440 locates 915 an electronic counterpart of the rendered document from which the context image was captured. A number of different methods may be employed when locating 915 electronic documents in various embodiments as discussed elsewhere in this document. Next, the document server 440 determines 920 the context of/or within the located electronic document that was indicated by the context image. In one embodiment, the context corresponds to a region or location within the electronic document, while in other embodiments the context is the whole document. Next, the electronic document and determined context are returned 925 to the user device 420.

Meanwhile, the scanning device 302 is used to capture 930 an image (or portion of an image) of the desired item. The item image is sent 935 to the user device 420. Once the user device 420 is in possession of both the item image and the electronic counterpart of the rendered document (and the identified context), the user device 420 locates 940 the item within the electronic document. In one example, the user may wish to purchase a shirt from an Eddie Bauer™ catalog that he has received in the mail. The user could scan text or a symbol (such as a special symbol representing the action "Purchase Now") from the Eddie Bauer™ catalog with the scanning device 302. The text or symbol is then transmitted to the document server 440 via the user device 420 (which perhaps is a personal computer in this example). The document server 440 uses the scanned information to locate an electronic version of the Eddie Bauer™ catalog and determine the context of the scanned text or symbol within the catalog. The user could further identify the item he wishes to purchase by scanning at least a portion of the picture of the shirt from the catalog and sending it to the user device 420. The user device 420 may then match the scanned portion of the picture to its corresponding picture in the electronic version of the catalog to identify the shirt that the user wishes to purchase. Finally, the user device 420 may complete the electronic transaction with vendor server 450. The vendor ships the shirt to the purchaser and, in a few days, the shirt arrives at the purchaser's house. Of course, the item location and other functions that this example discusses as residing in the user device 420 could reside in document server 440 or even in vendor server 450 such that many variations of the described transaction are possible but still within the scope of the disclosed inventions.

While, in alternative embodiments, conventional forms of OCR and/or image matching may be employed to locate an item within the electronic document, the inclusion of context information allows more efficient and less ambiguous matching techniques to be employed by narrowing the domain in which to search for an item corresponding to the item image.

Upon locating the item within the electronic document, the user device 420 sends 945 an item order with fulfillment data (such as payment and delivery information, or an identifier to a preexisting account) to a vendor server 450. The vendor server 450 processes 950 the item order and initiates order fulfillment 955. Order fulfillment may involve any delivery of the item specified in the item order according to the fulfillment data. The vendor server 450 also confirms 960 the item order to the user device 420. The user device 420 (or possibly wireless device 425) may then indicate the order confirmation 965 on an associated display (or other output device).

The communications described above and shown in FIG. 9 are merely one exemplary set of communications between the scanning device 302, user device 420, document server 440 and the vendor server 450. Other communications, both more and fewer, may be employed in various embodiments. Note, however, that unlike the communications shown in FIG. 6, no account server 500 is required for such communications. Of course, some embodiments may employ an account server 500 in conjunction with the communications shown in FIG. 9.

FIG. 10 illustrates a process within the user device 420 for an order transaction in accordance with the teachings of FIG. 9. The order transaction process 1000 begins at block 1005 where human-readable context data is obtained. In block 1010, the context data is shared with a remote computer to locate an electronic document corresponding to the context data. Additionally, in block 1015, human-readable item data is obtained. The item data is used to find an electronic representation of the item in the located electronic document in block 1020. Next, in block 1025, the item is ordered from a vendor (e.g., via a vendor server 450, or in some embodiments via an aggregator server 460 that may interface with a plurality of vendors and/or vendor servers 450). In decision block 1030, a determination is made whether the vendor has confirmed the order for the item. If so, processing proceeds to block 1035, where the order confirmation is conveyed to a user. On the other hand, if no order confirmation is forthcoming from the vendor, a lack of confirmation is conveyed to the user in block 1040.

Figure 11:
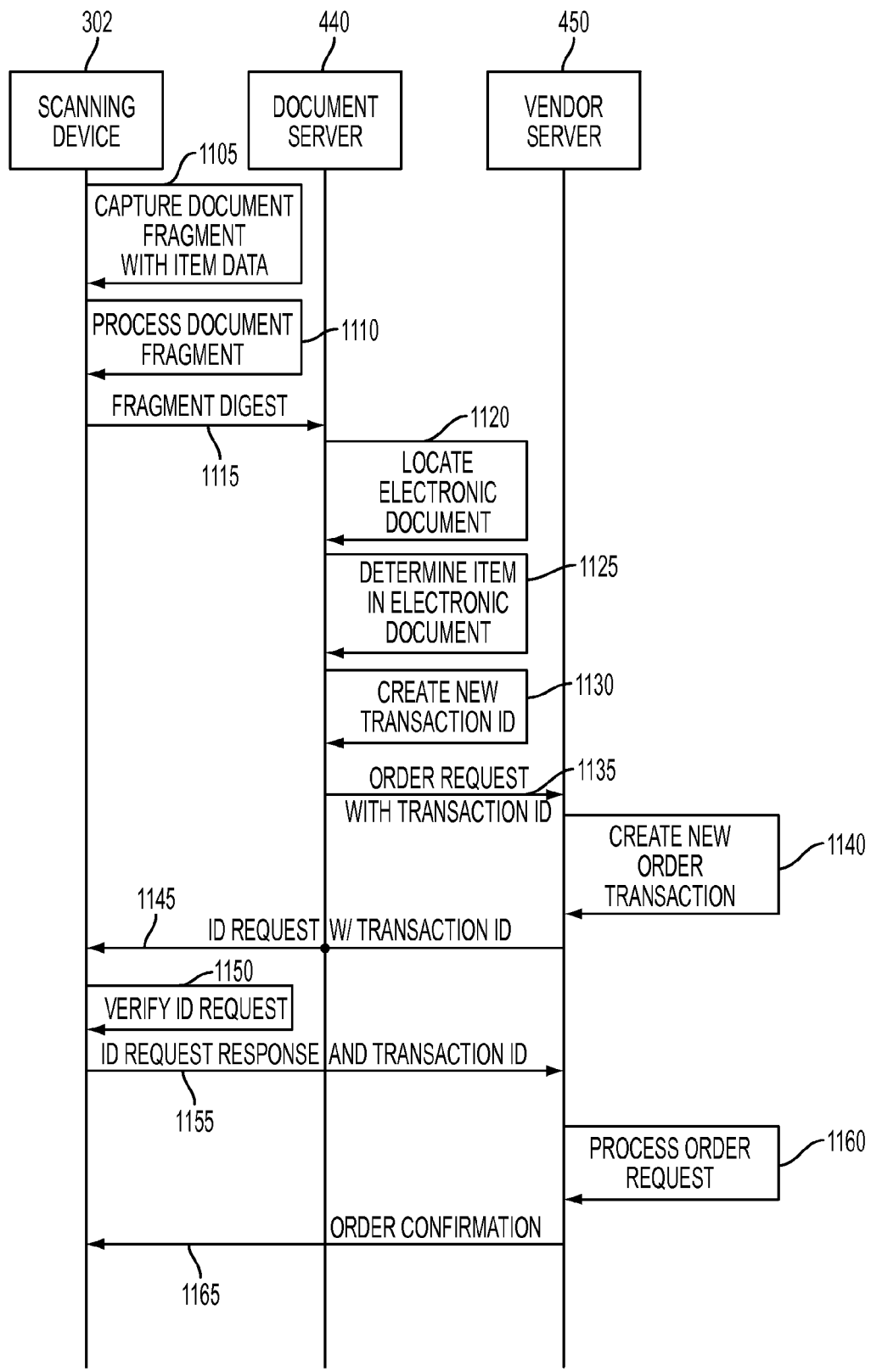
FIG. 11 illustrates an overview of the protocol and methods for the various devices to interact with the scanning device for ordering an item, in accordance with an alternative embodiment.
Figure 12:
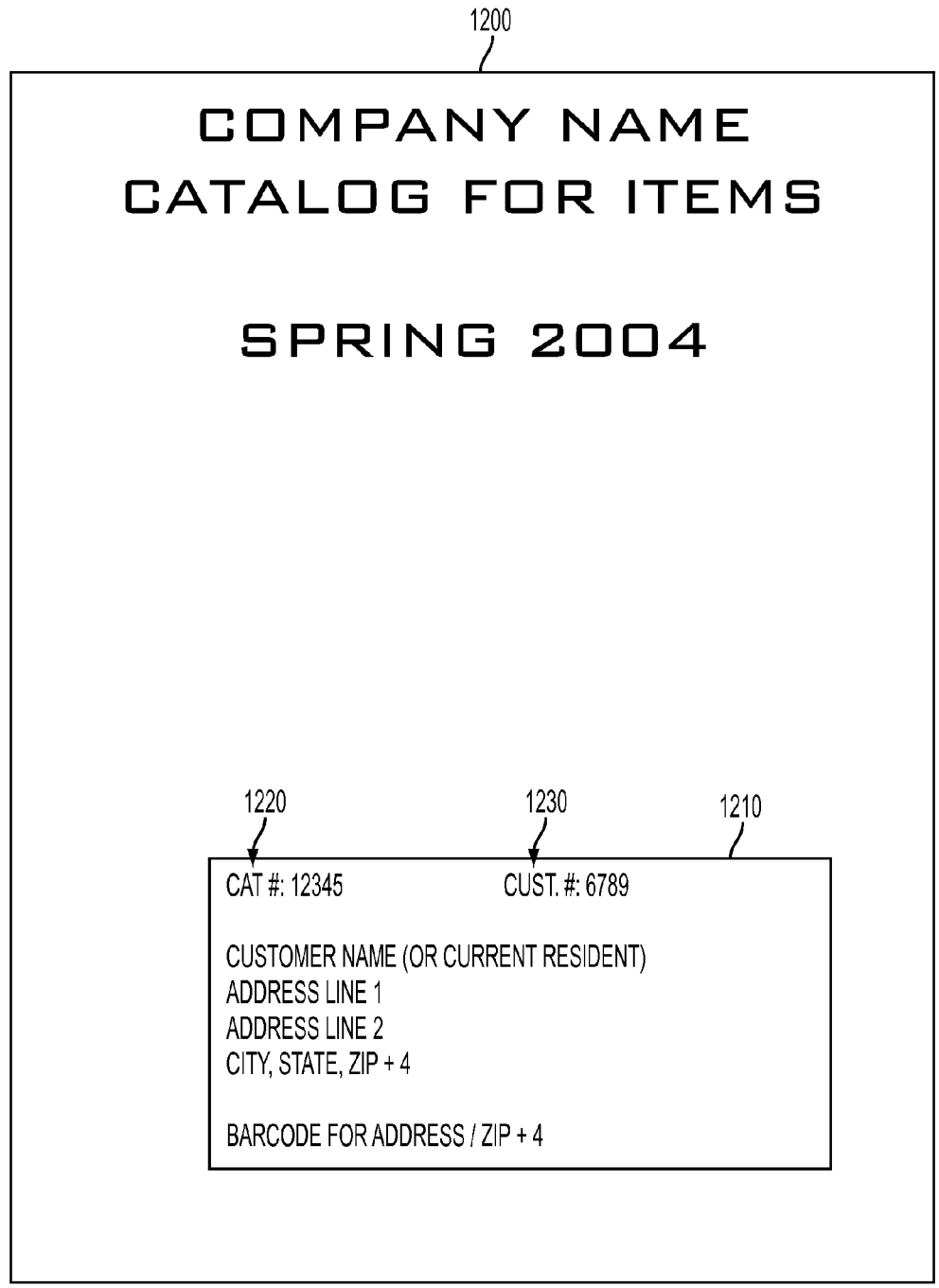
FIG. 12 illustrates an exemplary catalog cover, in accordance with one embodiment.

FIGS. 11-12 illustrate an alternative embodiment to the disclosures of FIGS. 6-10. In FIGS. 11-12, a document server 440 is allocated as the primary processing system, including having an awareness of a particular scanning device coupled for item ordering via the document server. FIGS. 11-12 additionally illustrate that a vendor server may query a scanning device 302 as one form of authentication for item order transactions.

Accordingly, FIG. 11 illustrates an item ordering transaction between a scanning device 302, document server 440 and vendor server 450. In FIG. 11, the item ordering transaction begins with the scanning device 302 capturing 1105 a portion of a rendered document 495 for item data (and possibly context data at the same time). The item data is processed 1110 by the scanning device 302 to generate a fragment digest as a key to locate an electronic counterpart of the rendered document 495. Many different types of digest generation may be employed by various embodiments. Alternatively, conventional OCR techniques may be employed to convert an optical representation of the document fragment to a text string or other representation of the document fragment.

The fragment digest is sent 1115 to the document server 440. The document server then locates 1120 an electronic counterpart of the rendered document using the fragment digest as a key and/or search term(s). The document server 440 next determines 1125 the item (or items), contained within the document fragment, in the located electronic counterpart of the rendered document. The document server 440 creates 1130 a new transaction identifier (an identifier for identifying the transaction to the scanning device 302 and/or vendor server 450). Next, an order request is sent 1135 with the transaction identifier to the vendor server 450; where a new order transaction is created 1140. The vendor server 450 then sends 1145 an identifier request to the scanning device 302 (possibly via the document server 440) along with the transaction identifier.

The identifier request is verified 1150 at the scanning device 302. In one exemplary embodiment, verification at the scanning device 302 comprises determining a cryptographic key with which to secure communications with the vendor server 450. In some embodiments, verification 1150 may comprise other forms of authentication (e.g., biometrics data such as a fingerprint scan) to ensure that the identifier request is appropriate.

The scanning device 302 communicates 1155 an identifier request response back to the vendor server 450, including the transaction identifier. In various embodiments, the communication 1155 is across an encrypted (or otherwise secured) communications channel. Additionally, the identifier request response 1155 may comprise fulfillment information if the vendor server 450 does not already possess fulfillment information for an identifier of the scanning device 302. Upon receipt of the identifier request response, the vendor server 450 processes 1160 the order request and returns 1165 a confirmation of the order to the scanning device 302.

By having the vendor server 450 request an identifier from the scanning device 302, the above-described embodiment allows users to scan an item for purchase, but still know which vendor will be used to fulfill the order, and gives them an approval mechanism (the identifier request verification) before completing an order with a vendor. Many variations for ordering an item may be employed without departing from the spirit or scope of the present invention.

The communications described above and shown in FIG. 11 are merely one exemplary set of communications between the scanning device 302, document server 440 and the vendor server 450. Other communications, both more and fewer, may be employed in various embodiments. Alternative embodiments may employ additional devices in conjunction with the communications shown in FIG. 11.

Figure 13:
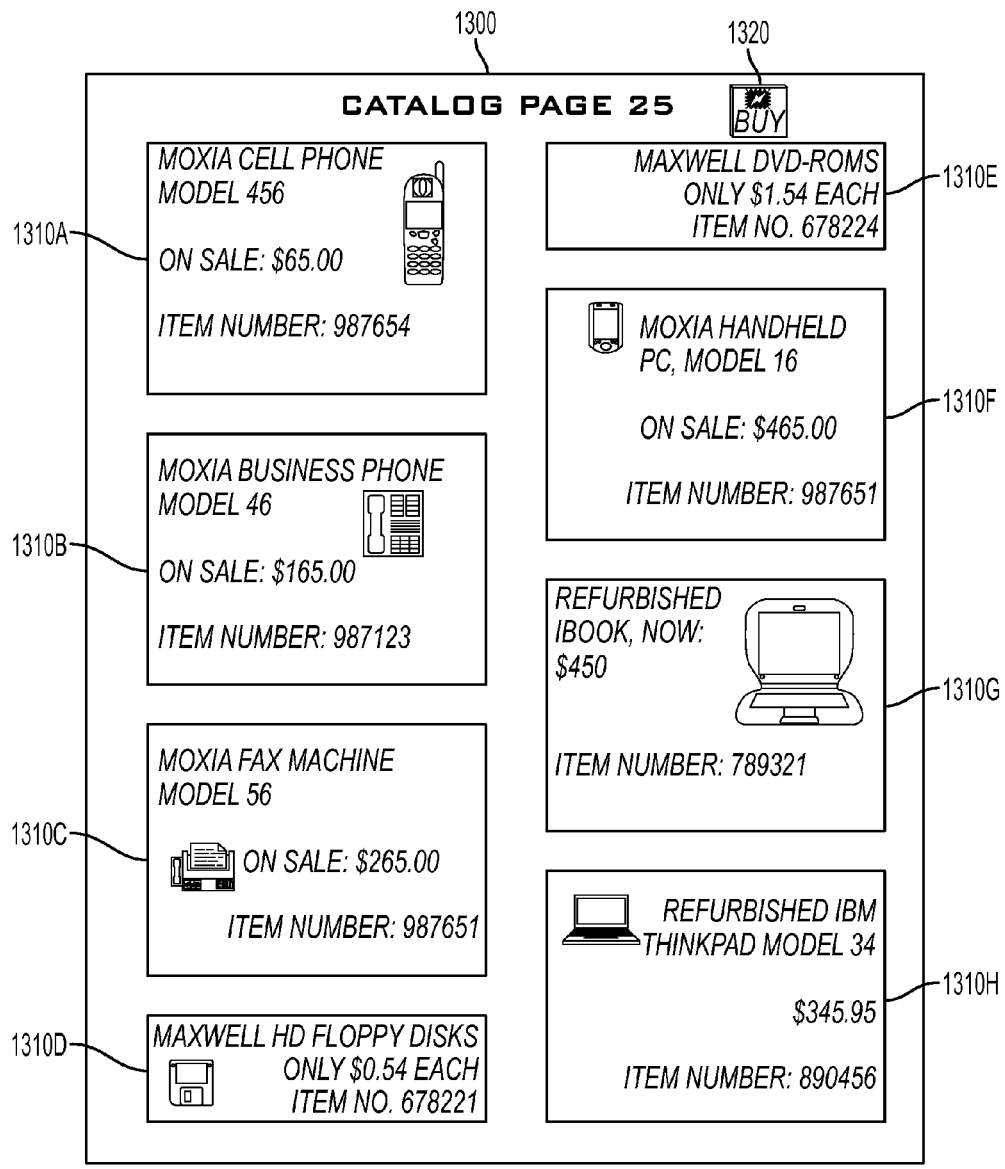
FIG. 13 illustrates an exemplary catalog interior page, in accordance with one embodiment.

FIGS. 12 and 13 illustrate a catalog as an exemplary rendered document 495 for use with various embodiments. Accordingly, FIG. 12 illustrates a catalog cover 1200 with an address label 1210 that includes a catalog number 1220 and a customer number 1230. In one embodiment, the customer number 1230 on the label 1210 may be used an identifier in purchase transactions with a vendor server 450 associated with the catalog 1200. The address label 1210 may also contain further information, such as a name and address of a recipient of the catalog.

FIG. 13 illustrates an interior page 1300 of the catalog 1200 with a number of items 1310A-H and a purchase symbol 1320. In alternative embodiments, further symbols may be used, for example a symbol to request special offers or sale items (not shown).

In one illustrative example of the operation of an embodiment, a user captures the catalog number 1220 (and possibly the customer number 1230) as context data using a handheld document data capture device such as scanner 302. The context data is processed at a document server 440 to locate an electronic counterpart of the catalog. Next, the user scans an item number, such an item number "789321" corresponding to item 1310G (a refurbished iBook computer). The item number scan identifies the item to be ordered within the electronic counterpart of the catalog. A vendor server 450 (generally corresponding to the catalog supplier) is notified of an order for item 1310G (a refurbished iBook computer with item number "789321"). By using the two stage (context and item) scanning, the number of ambiguous scans is greatly reduced. As the catalog provider is in control of the size of catalog identifier 1220 (context data) and item numbers, it is possible for the catalog provider to ensure unambiguous designations.

It will be appreciated that, in alternative embodiments, specific catalog numbers and item numbers need not be employed, but are simply used for illustrative purposes. Any human-readable information may be used to disambiguate between rendered documents and to correlate them with electronic counterparts of the same.

While FIGS. 12 and 13 illustrate a conventional catalog 1200 with printed pages 1300, in an alternative embodiment the catalog 1200 may actually be simplified to a minimal size, such as a postcard (or within a magazine, book, TV guide, letter and the like), thereby allowing a user to scan the address label 1210 and receive an electronically rendered (e.g., via e-mail, the web or even via a custom printed and mailed) version of the catalog 1200. In such an embodiment, the user may see a web page similar to the one shown in FIG. 16 and described below. By having a dynamically generated catalog presented to the user of the scanning device 302, it is possible for vendors to personalize the catalog to a particular user of a scanning device by selecting the items, prices and fulfillment requirements in a dynamic manner. As the scanning devices 302 enable this catalog personalization, the vendor may also elect to provide a personalized discount to users of scanning devices. For example, a valued customer (as determined by identifiers associated with the scanning device 302) may get a 10% discount for ordering from the personalized catalog.

In a further alternative embodiment, the scanning device 302 may be used in conjunction with an associated display, such as a display of a user device 420. Accordingly, FIGS. 14-15 illustrate such an embodiment where the display of a user device is used to assist in ordering items using a scanning device 302.

Figure 14:
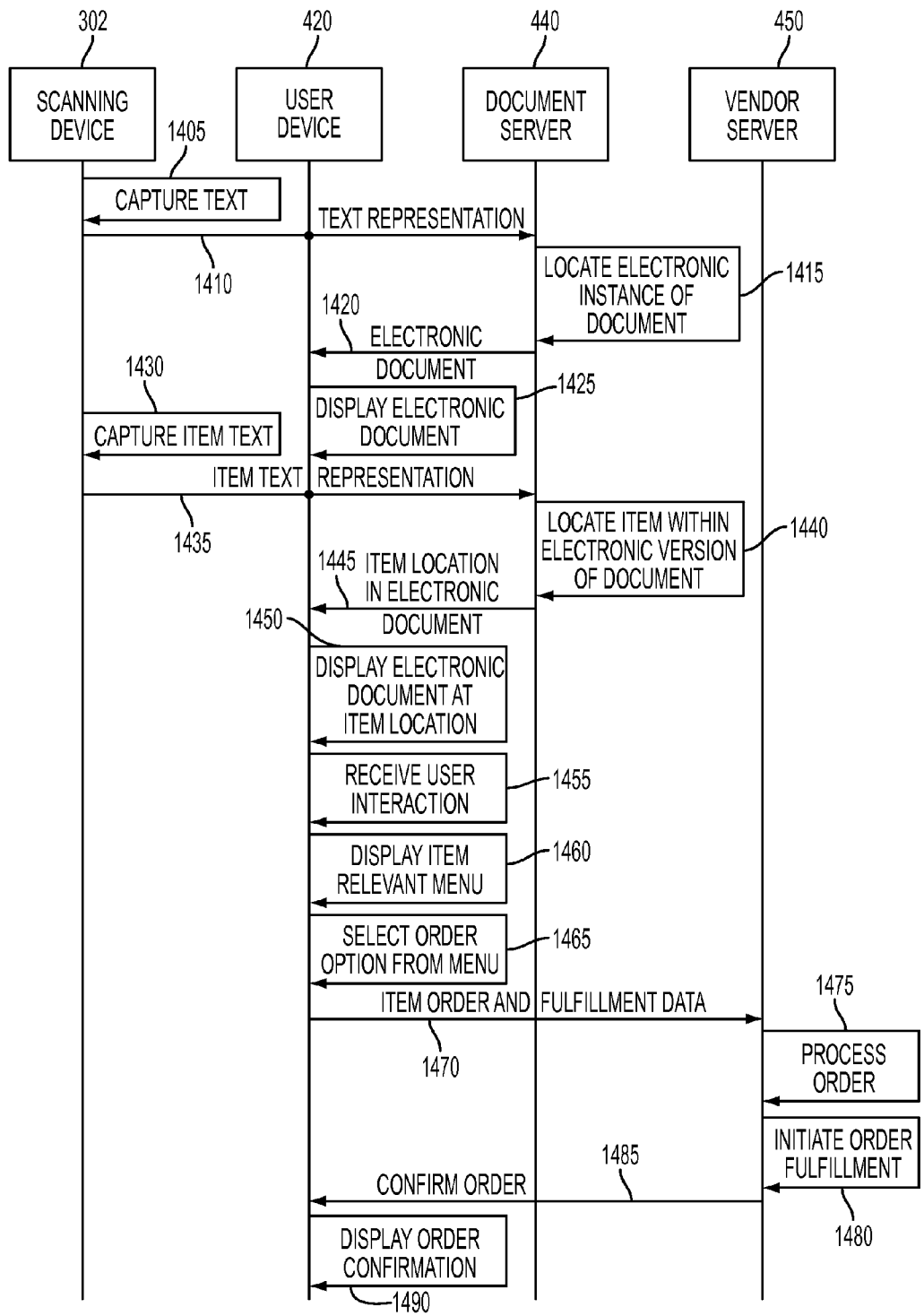
FIG. 14 illustrates an overview of an alternative protocol and methods for the various devices to interact with the scanning device, in accordance with one embodiment.
Figure 15:
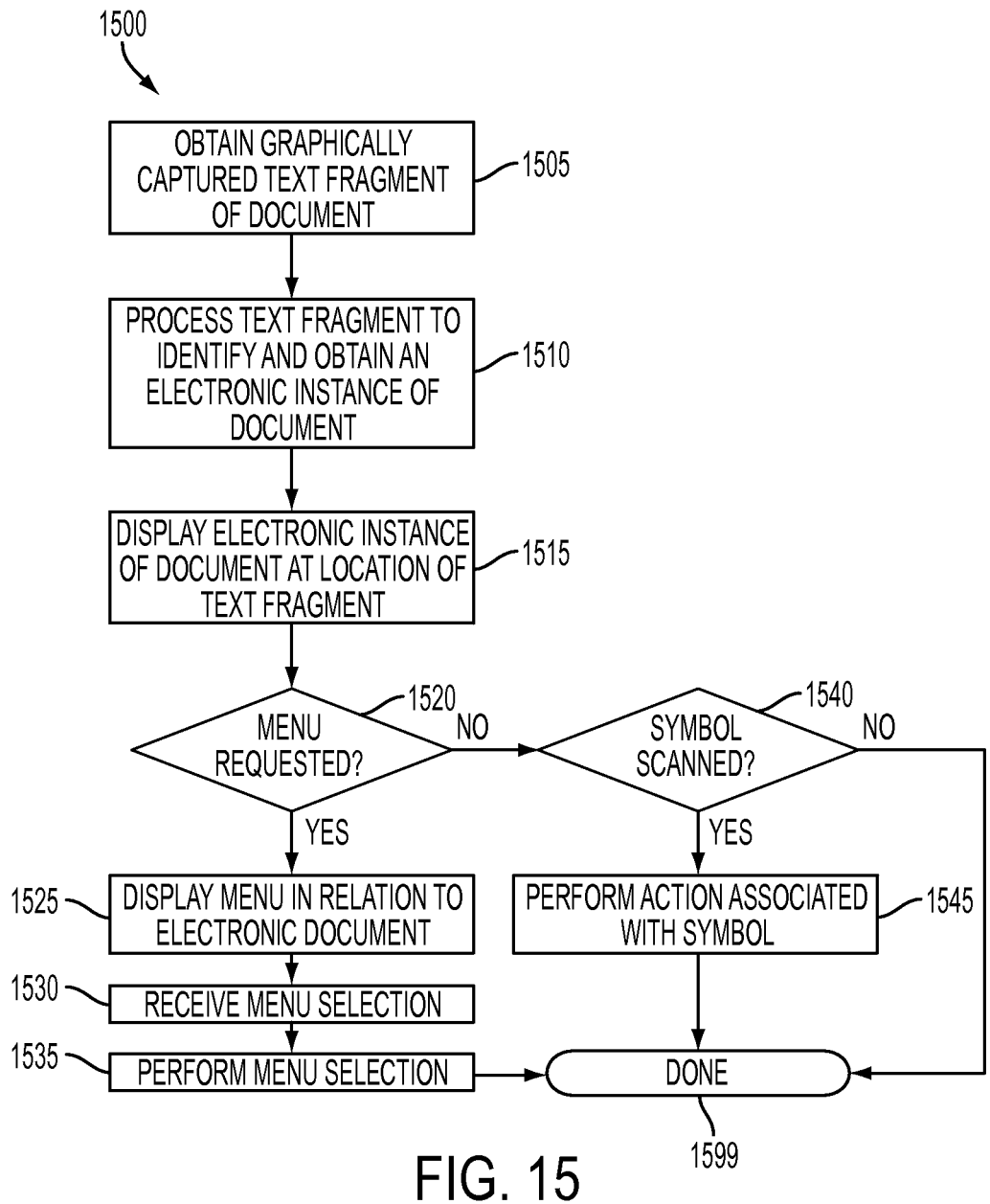
FIG. 15 illustrates the operational flow of relevant aspects of a process at the user device for an item order, in accordance with one embodiment.

FIG. 14 illustrates an item ordering transaction between a scanning device 302, user device 420, document server 440 and vendor server 450. In FIG. 14, the item ordering transaction begins with the scanning device 302 capturing 1405 a portion of a rendered document 495 as symbolic data (e.g., text). The capturing process may comprise conventional OCR or may employ alternative text recognition technologies such as those discussed in Section 11.

The captured text is sent 1410 to a document server 440 (possibly via a user device 420). The document server 440 locates 1415 an electronic counterpart of the rendered document (see for example FIG. 16). Next, an electronic version of the document is sent 1420 to the user device 420 and displayed 1425. Once the electronic counterpart of the rendered document is displayed, actions performed by the user in a paper version can be mirrored, interpreted, displayed, etc., in the displayed version. Thus, for example, as the user captures a section of text, highlighting of that same portion of text can appear concurrently in the displayed version of the document. Alternatively a symbol representing an order request—perhaps a small currency icon—can appear in the dynamically displayed version.

Item text is captured 1430 by the scanning device 302 and transmitted 1435 (possibly via the user device 420) to the document server 440. The document server 440 locates 1440 the item of the item text within the electronic counterpart of the rendered document. The item location is sent 1445 to the user device 420, thereby causing the user device to display 1450 the portion of the electronic counterpart of the rendered document. The user next interacts 1455 with the displayed electronic counterpart of the rendered document (e.g., via a keyboard, mouse or the like) to display 1460 an item-relevant menu. The user selects 1465 an order option from the menu. The order for the item including fulfillment data (possibly requested in at the user device 420) is sent 1470 to the vendor server 450. The vendor server 450 processes 1275 the order, initiates 1480 order fulfillment and sends 1485 an order confirmation back to the user device 420. The confirmation is displayed 1490 at the user device 420.

The communications described above and shown in FIG. 14 are merely one exemplary set of communications between the scanning device 302, user device 420, document server 440 and the vendor server 450. Other communications, both more and fewer, may be employed in various embodiments. Alternative embodiments may employ additional devices in conjunction with the communications shown in FIG. 14.

FIG. 15 illustrates a process within the user device 420 for a document transaction using an associated display in accordance with the teachings of FIGS. 13 and 14. The transaction process 1500 begins at block 1505 where a captured text fragment of a rendered document is obtained. In block 1510, the text fragment is processed to identify and obtain an electronic document corresponding to the document fragment. Next, in block 1515, the obtained electronic document is displayed. In decision block 1520 a determination is made whether a user requested a menu. If so, processing proceeds to block 1525 where a menu is displayed that is relevant to the currently displayed portion of the electronic document. As a user navigates the document, different menus may become relevant, e.g., as when different items are selected from within an electronic document). In block 1530, a menu selection is received. In block 1535, menu selection is performed in an appropriate manner. After which the transaction process ends in block 1599.

If, however, in decision block 1520 it was determined that a menu was not selected, then in decision block 1540 a determination is made whether a special symbol (e.g., the purchase symbol 1320, or the like) was scanned. If so, processing proceeds to block 1545 where an action associated with the symbol is performed. After which, or if no symbol was scanned, processing proceeds to block 1599 and the transaction process ends.

In some embodiments, the scanning of a special symbol (e.g., purchase symbol 1320) is a prefix to purchasing activity that "primes" the handheld document data capture device 302 to capture items to purchase. In some embodiments, the scanning device 302 is sensitive to predetermined gestures (see Section 14.1.3), which may be used to prime the scanning device 302 for purchasing, or may be used to confirm a purchase.

Figure 16:
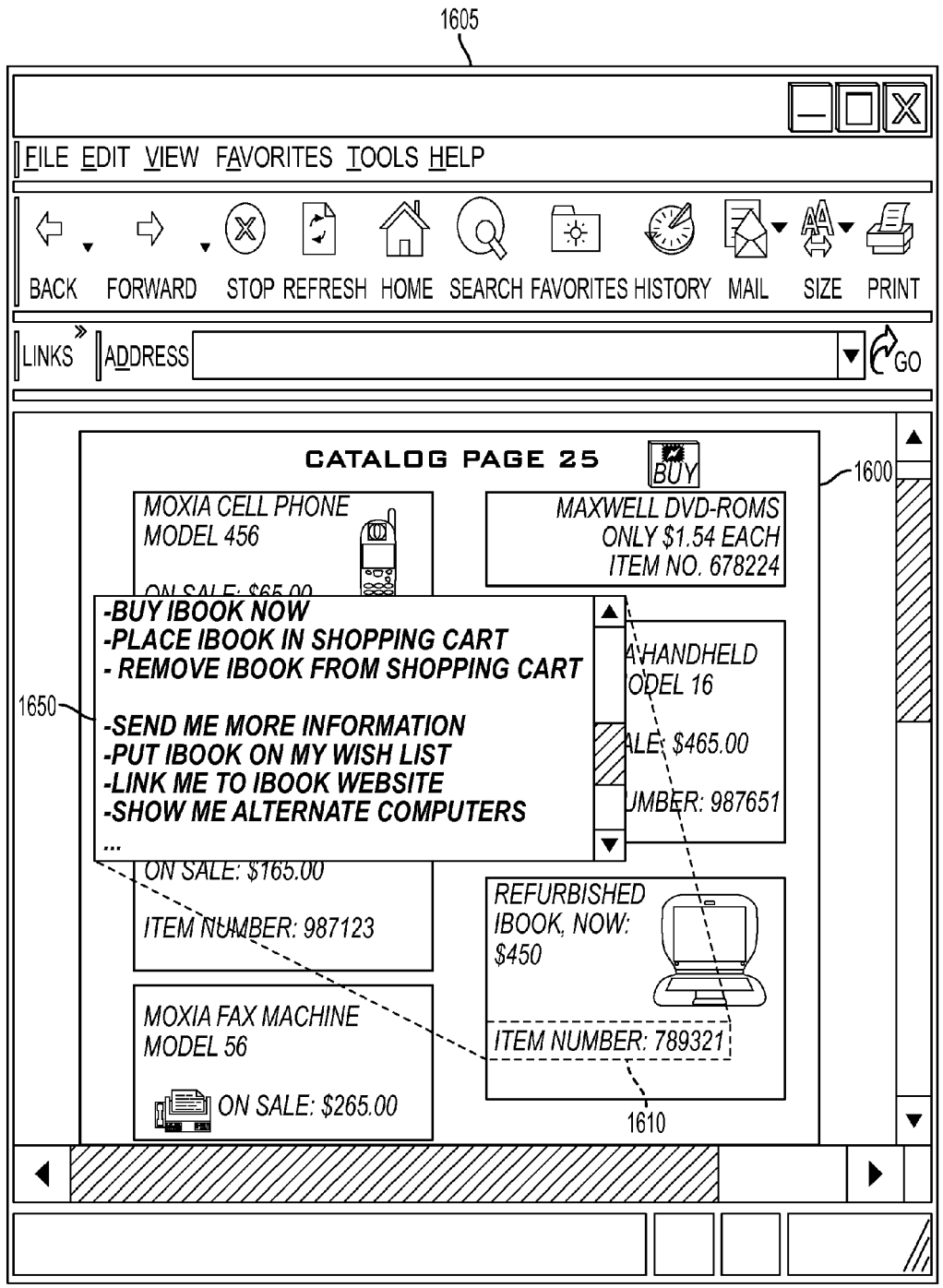
FIG. 16 illustrates an exemplary contextual menu of a web page corresponding to a catalog interior page, in accordance with one embodiment.

FIG. 16 illustrates an exemplary displayed electronic counterpart of a printed document. In this example, the electronic counterpart is a web page 1600 corresponding to the interior catalog page 1300 shown in FIG. 13. The web page 1600 is displayed within a browser window 1605 (e.g., in a browser of a user device 420) and includes a menu 1650 that is relevant to a selected item 1610. Note that the menu 1650 can include further options other than ordering a specific item. The menu 1650 may be used to indicate that an item should be added to a wish list, that similar/alternative items should be shown, that the item should be removed from an order, that further information (or the manufacturer's web site) is desired, or the like. One additional menu option (not shown) is that a user may be presented with the option to purchase the rendered document from which the menu is being presented.

In one exemplary embodiment, a special symbol (e.g., "$") is presented to a user in a rendered document, representing that an order activity (generally a software application for purchasing) may be activated by scanning the symbol. By scanning one or more items individually presented, the user can indicate his decision to make the purchase. In some embodiments, scanning an item multiple times (or scanning once and then indicating a quantity through another input method) may be used to indicate a purchase of multiple items. Orders can be confirmed via buttons or keypads on the handheld device 302, any associated display or host computer, via telephone, or by sending the user an e-mail requiring further action. The user's email account information can be determined by reference to the user's account and billing information.

In some embodiments, the user may be able to complete the purchase immediately by placing the order for an item with a single capture from the rendered document. One relatively safe way to insure that the user actually intended to make the purchase is to have a separate action that the user is required to perform to complete the purchase. This action might be to push a special button on the scanning device 302 or to scan a special object or phrase printed in the document (for example, a statement like "I agree to purchase"). Thus, in some embodiments, the user may be able to complete the purchase immediately by making two or more captures from the rendered document. The user may also identify himself (possibly via a username and/or password) and/or confirm a purchase by scanning a special code or mark printed on a card carried by the user. Other forms of authentication/verification may be employed in various embodiments, including, but not limited to biometric authentication, PIN entry in a keypad, challenge/response, cryptographic tokens and the like.

In many cases, it is helpful to know the location of the user. This would be useful, for example, when the user has access to a display device and wants their content delivered there. A label or other scanning-device-readable indicator (not shown) that identifies the specific display and or device may be available to the user. Scanning this label informs a document server 440 (or account server) of the user's location. In some cases the identifying label can be generated and displayed on a user device 420. Generally, only the user physically at the display device would then be able to scan this information, thereby providing an additional layer of security.

Conclusion

It will be appreciated by those skilled in the art that the above-described system may be straightforwardly adapted or extended in various ways. While the foregoing description makes reference to particular embodiments, the scope of the invention is defined solely by the claims that following and the elements recited therein.

We claim:

1. A computer-implemented method comprising:
   capturing a first image of at least a portion of a rendered document at a user device, wherein the captured first image comprises a scan of the rendered document;
   sending the first image of the at least the portion of the rendered document from the user device to a document server;
   in response to sending the first image, receiving an electronic counterpart of the rendered document at the user device from the document server;
   capturing a second image of at least a portion of an item at the user device;
   identifying the item in the electronic counterpart using the user device;
   generating an order using the user device for the identified item based on the electronic counterpart; and
   sending the order for the item from the user device.

2. The method of claim 1, further comprising:
   displaying a representation of the rendered document on a display device.

3. The method of claim 1, wherein the user device comprises an optical capture device.

4. The method of claim 1, wherein the order for the item comprises fulfillment data.

5. The method of claim 4, wherein the fulfillment data comprises data related to delivery of the item as part of placing the order.

6. The method of claim 4, wherein the fulfillment data comprises billing information.

7. The method of claim 1, further comprising priming a capture device to order at least one item.

8. The method of claim 7, wherein priming comprises capturing a predetermined symbol or phrase.

9. The method of claim 4, wherein the fulfillment data comprises a customer identifier.

10. The method of claim 1, further comprising:
    receiving a confirmation for the order for the item; and
    providing an indication of the confirmation for the order.

11. The method of claim 10, wherein receiving the confirmation comprises receiving a vendor confirmation.

12. The method of claim 1, wherein said rendered document is selected from the group consisting of: a magazine, a book, a catalog, a postcard, a dynamic display, a newspaper, an ad, a sign and a paper document.

13. The method of claim 1, wherein the rendered document is presented on a dynamic display.

14. An article of manufacture including a non-transitory computer-readable medium, having stored thereon program instructions that, if executed by a user device, cause the user device to perform operations comprising:
    receiving a first image of at least a portion of a rendered document, wherein the first image comprises a scan of the rendered document;
    sending the first image of the at least the portion of the rendered document to a document server;
    in response to sending the first image, receiving an electronic counterpart of the rendered document from a document server;
    capturing a second image of at least a portion of an item;
    identifying the item in the electronic counterpart;
    generating an order for the identified item based on the electronic counterpart; and
    sending the order for the item.

15. The article of manufacture of claim 14, wherein the order for the item comprises fulfillment data.

* * * * *

UNITED STATES PATENT AND TRADEMARK OFFICE
CERTIFICATE OF CORRECTION

PATENT NO. : 8,620,760 B2  Page 1 of 1
APPLICATION NO. : 12/902081
DATED : December 31, 2013
INVENTOR(S) : Martin T. King et al.

It is certified that error appears in the above-identified patent and that said Letters Patent is hereby corrected as shown below:

Title Page

On Page 2, Item (63) Column 1 (Related U.S. Application Data), Line 33, after "Apr. 23, 2004," insert -- Provisional application No. 60/571,381, filed on May 14, 2004, --, therefor.

On Page 2, Item (63) Column 2 (Related U.S. Application Data), Line 17, after "Sep. 27, 2004," insert -- Provisional application No. 60/613,361, filed on Sep. 27, 2004, --, therefor.

On Page 2, Item (63) Column 2 (Related U.S. Application Data), Line 30, delete "60/633,786" and insert -- 60/633,486 --, therefor.

On Page 6, Item (56) Column 2 (Other Publications), Line 40, delete "HyperTex" and insert -- HyperText --, therefor.

On Page 6, Item (56) Column 2 (Other Publications), Line 45, delete "Solution" and insert -- Solutions --, therefor.

On Page 6, Item (56) Column 2 (Other Publications), Line 60, delete "dasted" and insert -- dated --, therefor.

On Page 7, Item (56) Column 2 (Other Publications), Line 27, delete "Actiion" and insert -- Action --, therefor.

In the Specification

In Column 1, Line 12, delete "7,707,309,", and insert -- 7,707,039, --, therefor.

In Column 1, Line 38, delete "DOCUMENT", and insert -- DOCUMENT, --, therefor.

Signed and Sealed this
Twenty-seventh Day of May, 2014

Michelle K. Lee
*Deputy Director of the United States Patent and Trademark Office*